(12) United States Patent
Pelletier et al.

(10) Patent No.: US 12,307,638 B1
(45) Date of Patent: *May 20, 2025

(54) SYSTEMS AND METHODS FOR ASSESSING A PRESENCE OR ABSENCE OF CELESTIAL OBJECTS FROM A PLURALITY OF IMAGES OF A COSMIC SPACE ACQUIRED BY A PLURALITY OF IMAGING SATELLITES

(71) Applicant: NorthStar Earth & Space Inc., Montreal (CA)

(72) Inventors: Frederic Pelletier, Quebec (CA); Daniel O'Connell, Saint Lazarre (CA); Peter Klimas, Ottawa (CA); Jean-Claude Leclerc, Quebec (CA); Narendra Gollu, Montreal (CA); Pierre Tremblay, Quebec (CA); Ryan Comeau, Kelowna (CA); Noemi Giammichele, Montreal (CA); Priyatharsan Epoor Rajasekar, Luxembourg (LU)

(73) Assignee: NORTHSTAR EARTH & SPACE INC., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 19/018,267

(22) Filed: Jan. 13, 2025

Related U.S. Application Data

(63) Continuation of application No. 18/740,931, filed on Jun. 12, 2024, now Pat. No. 12,249,055.

(51) Int. Cl.
*G06T 5/92* (2024.01)
*G06T 7/80* (2017.01)

(52) U.S. Cl.
CPC . *G06T 5/92* (2024.01); *G06T 7/80* (2017.01)

(58) Field of Classification Search
CPC .................................. G06T 5/92; G06T 7/80
See application file for complete search history.

(56) References Cited

U.S. PATENT DOCUMENTS

| | | | |
|---|---|---|---|
| 6,252,627 B1* | 6/2001 | Frame .................. | H04N 25/713 348/311 |
| 11,828,598 B1* | 11/2023 | Mastrangelo .......... | G06V 20/17 |

(Continued)

OTHER PUBLICATIONS

Hagerty, "A high fidelity approach to data simulation for space situational awareness missions, advanced maui optical space surveillance technologies conference," (2016).

(Continued)

*Primary Examiner* — Molly Wilburn
(74) *Attorney, Agent, or Firm* — Greenberg Traurig, LLP

(57) ABSTRACT

A system includes a plurality of satellites orbiting around a celestial body in a plurality of orbital planes. Each satellite includes an imaging device having a field of view (FOV) to capture an image of a sky that includes celestial image features of resident space object (RSO), stars, and/or planets. The satellite processor is configured to input the image data for each image into a pre-processing software pipeline to generate for each image a contrast-enhanced image data replica of each image, and an enhanced image data replica of each image, to receive from an output of a known-unknown RSO split data processing pipeline, a determination that a candidate RSO is a known RSO stored in an RSO catalog, or an unknown RSO, and to assign to the candidate RSO based on the determination, an RSO ID of the known RSO listed in the RSO catalog, or a new RSO ID.

24 Claims, 41 Drawing Sheets

(56) References Cited

U.S. PATENT DOCUMENTS

| | | |
|---|---|---|
| 12,249,055 B1* | 3/2025 | Pelletier .................... G06T 7/80 |
| 2007/0150128 A1 | 6/2007 | Fowell |
| 2008/0046138 A1 | 2/2008 | Fowell |
| 2012/0261514 A1 | 10/2012 | Boone |
| 2013/0124079 A1 | 5/2013 | Olivier |
| 2013/0292517 A1 | 11/2013 | Briskman |
| 2016/0305773 A1 | 10/2016 | Farah |
| 2017/0061625 A1* | 3/2017 | Estrada .................... G06N 3/04 |
| 2017/0131096 A1* | 5/2017 | Karlov ..................... G01C 1/10 |
| 2018/0346153 A1 | 12/2018 | Kaplan |
| 2024/0150044 A1 | 5/2024 | Vance |
| 2024/0150045 A1 | 5/2024 | Stricklan |

OTHER PUBLICATIONS

Clark, "Simulation of RSO Images for Space Situation Awareness (SSA) Using Parallel Processing," (2021).

Allworth, "Development of a high fidelity simulator for Generalized photometric based space object classification using machine learning," 70th Int'l Astronautical Congress (2019).

Jordan, "Quasi Real-Time Autonomous Satellite Detection and Orbit Estimation," (2023).

Helferty, "Performance Analysis of Satellite Tracking Algorithms in Low SNR Environments," Advanced Maui Optical and Space Surveillance Technologies Conference (2023).

Tremblay, "Pixel-wise real-time advanced calibration method for thermal infrared cameras," 3rd Int'l Symposium on Structural Health Monitoring and Nondestructive Testing Nov. 25-26, 2020, Quebeq, Canada, vol. 25(12) (2020).

* cited by examiner

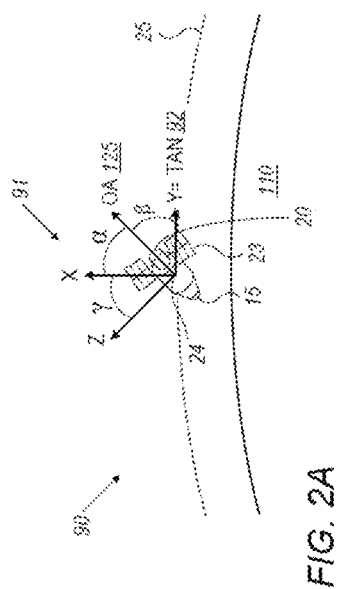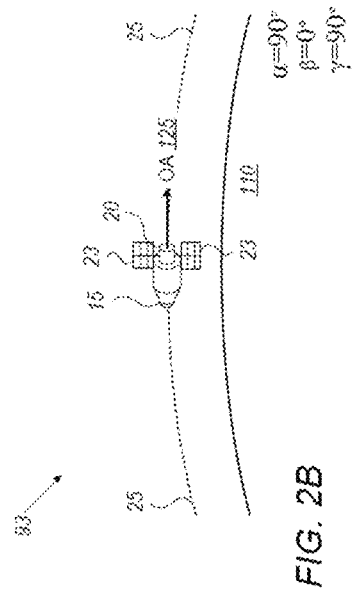
FIG. 2A
FIG. 2B

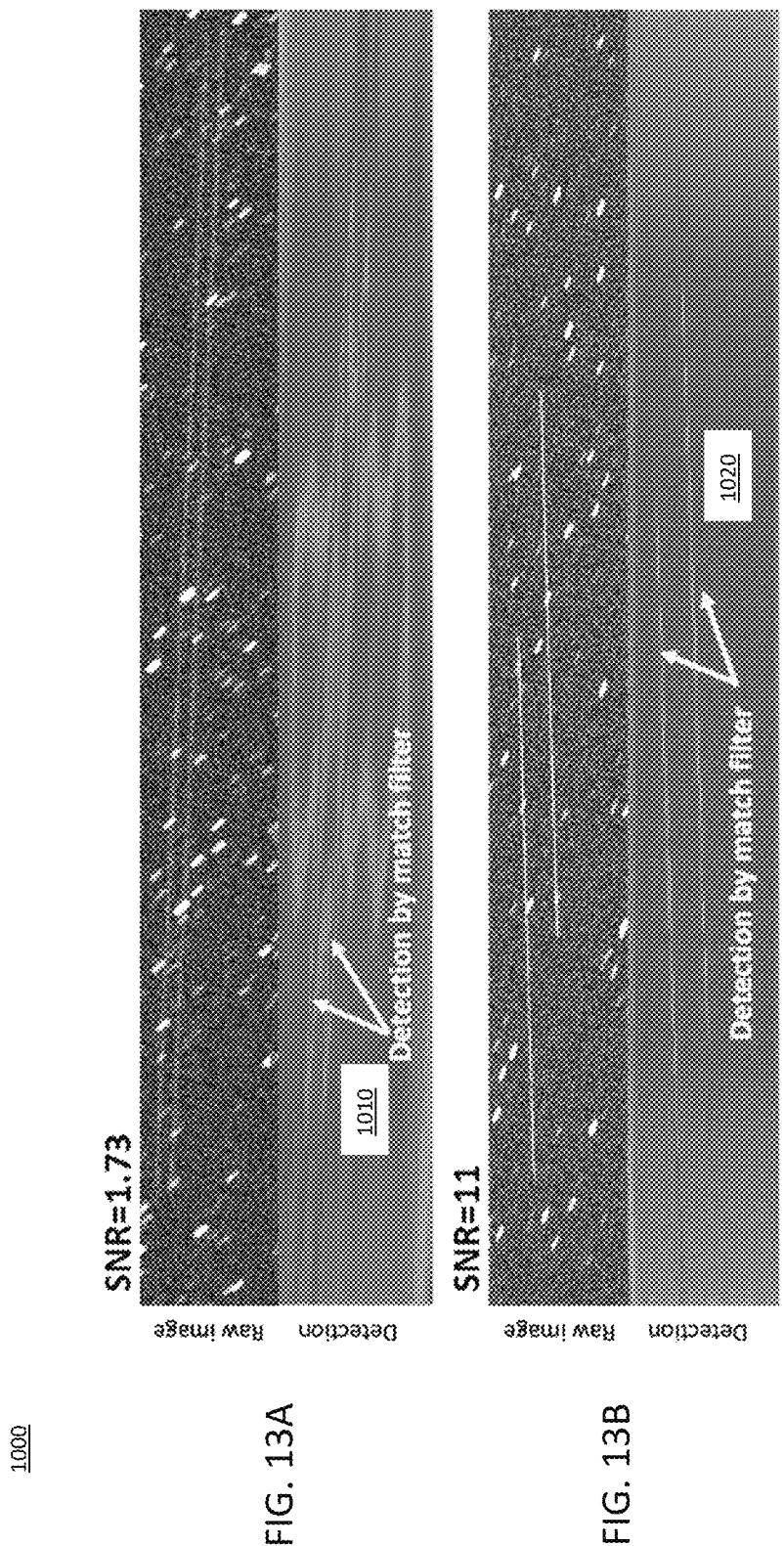

| | Symbol | Unit | Part | |
|---|---|---|---|---|
| Defective pixel status | $B_p$ | – | map | Validity of the pixel value |
| Count offset | $C_{off_p}$ | DL | map | Electronic offset (count level at zero integration time) |
| Non-linear function | $f(x)$ | – | scalar | Function to model charge leakage of the sensor |
| Time-constant at reference flux and reference temperature | $\tau_{00_p}$ | s | map | Related to the integration time value for which charge leakage is significant |
| Reference flux | $F_0$ | DL/s | scalar | Reference count flux level at which the time constant is calculated |
| Exponent | $\alpha_p$ | – | map | Characterise the count flux exponential sensitivity of the time constant |
| Reference temperature | $T_0$ | °C | scalar | Reference sensor temperature at which the time constant is calculated |
| Temperature difference to halve time constant | $\Delta T_\tau$ | °C | scalar (or map) | Characterise the temperature exponential sensitivity of the time constant |

| | | | Part II | |
|---|---|---|---|---|
| Reference count flux offset | $F_{off_p}$ | DL/s | map | Dark count flux, i.e. count flux present without any light incident on the sensor |
| Reference temperature | $T_0$ | °C | scalar | Reference sensor temperature at which the count flux offset is calculated |
| Temperature difference to double count flux offset | $\Delta T_F$ | °C | scalar | Characterise the temperature exponential sensitivity of the count flux offset |
| Electronic gain | $G_p$ | DL/e⁻ | map | Characterise how the accumulated electrons by the sensor are converted into a digital signal |

| name | symbol | units | type | description |
|---|---|---|---|---|
| Opto-electronic gain | $K_p$ | e⁻/ph | map | Characterise how the incident light (photons) is converted into accumulated electrons in the sensor wells |
| Area of entrance pupil | $A_{ep}$ | $m^2$ | scalar | Size of the optics capturing the incident light |

FIG. 21

| name | symbol | units | type | description |
|---|---|---|---|---|
| Horizontal width of the profile | $\sigma_{x,p}$ | px | map | Characterise the horizontal spread of the image of a point-wise object |
| Vertical width of the profile | $\sigma_{y,p}$ | px | map | Characterise the vertical spread of the image of a point-wise object |
| Profile covariance | $\sigma^2_{xy,p}$ | px² | map | Characterise how the elliptical image of a point-wise object is rotated in the image plane |

| name | symbol | units | type | description |
|---|---|---|---|---|
| Horizontal distortion coefficient | $\Delta x_{d,p}$ | px | map | Characterise how the image of a point-wise object in shifted horizontally relative to its expected position |
| Vertical distortion coefficient | $\Delta y_{d,p}$ | px | map | Characterise how the image of a point-wise object in shifted vertically relative to its expected position |
| Horizontal instantaneous field-of-view | $IFOV_x$ | rad | scalar | Angular size of a single pixel |
| Vertical instantaneous field-of-view | $IFOV_y$ | rad | scalar | Angular size of a single pixel |

Receiving 1930 from an output of a known-unknown RSO split data processing pipeline, a determination, based at least in part on temporal behavior of the at least one streak associated with the at least one candidate RSO in successive images in the plurality of images generated by the plurality of imaging devices that the at least one candidate RSO is the at least one known RSO stored in the RSO repository, or at least one unknown RSO absent from the RSO repository; where the known-unknown RSO split data processing pipeline includes a known object processing pipeline that outputs the determination using the contrast-enhanced image data replica of each image in the plurality of images, and an unknown object processing pipeline that outputs the determination by inputting the enhanced image data replica of each image in the plurality of images into at least one machine learning model trained to: group the object features into tracks based on the temporal behavior of the objects features in the successive images, determine a likelihood of the tracks being associated with at least one particular candidate RSO, and relay detection coordinates of the tracks into the known object processing pipeline to assess whether a particular candidate RSO from the at least one particular candidate RSO is a particular known RSO registered in the RSO repository

Assigning 1940 based on the determination, one of: at least one RSO ID of the at least one known RSO listed in the RSO repository to the at least one candidate RSO based on the determination that the at least one candidate RSO is the at least one known RSO, or at least one new RSO ID to the at least one candidate RSO for storage in the RSO repository based on the determination that the at least one candidate RSO is the at least one unknown RSO

FIG. 24 (cont'd)

SYSTEMS AND METHODS FOR ASSESSING A PRESENCE OR ABSENCE OF CELESTIAL OBJECTS FROM A PLURALITY OF IMAGES OF A COSMIC SPACE ACQUIRED BY A PLURALITY OF IMAGING SATELLITES

FIELD OF THE DISCLOSURE

The field of the disclosure relates to astronomical imaging. More particularly, the field of the disclosure relates to systems for generating and processing a plurality of celestial image features from a plurality of images of a sky and methods of use thereof.

BACKGROUND OF THE DISCLOSURE

Satellites in orbit around the Earth may enable technologies such as inter-continental communication, precision navigation, weather forecasting, Earth imaging, and astronomical observations to name a few. However, with the number of these orbiting satellites rapidly approaching 10,000, these satellites may create space debris when decommissioned subjecting the other satellites in orbit to possible space debris collisions. Currently, there may be over 35,000 space debris objects greater than 10 cm and over 1,000,000 space debris objects between 1 cm and 10 cm. Furthermore, space is becoming viewed ever more widely as a contested area that is subject to hostile actions of one nation/entity against another nation/entity's space assets, requiring constant monitoring to help mitigate the negative consequences of such activity.

SUMMARY

In some embodiments, the present disclosure provides an exemplary technically improved computer-based system that may include the components of at least one non-transitory memory configured to store computer code; and at least one centralized computer processor of at least one centralized computer of a central computing processing arrangement; where the at least one centralized computer processor may be configured to execute the computer code that causes the at least one centralized computer processor to: receive image data of each image from a plurality of images acquired by a plurality of imaging devices coupled to a plurality of satellites in orbit around a celestial body in at least one orbital plane; where the image data of each image from the plurality of images may include object features associated with at least one other celestial body, at least one resident space object (RSO), or any combination thereof located within a field of view (FOV) of the plurality of imaging devices that image at a predefined image acquisition rate, a volume of a sky as the FOV of at least one imaging device from the plurality of imaging devices on each satellite moves in one of the at least one orbital plane; where the object features may include at least one streak associated with the at least one RSO; input the image data for each image into a pre-processing software pipeline to generate for each image: a contrast-enhanced image data replica of each image, and an enhanced image data replica of each image; where the contrast-enhanced image data replica of each image may include an increased contrast of the object features in each image to improve a correlation determination between candidate RSO feature data of the object features associated with at least one candidate RSO in each image and known RSO feature data of the object features associated with at least one known RSO stored in an RSO catalog; receive from an output of a known-unknown RSO split data processing pipeline, a determination, based at least in part on temporal behavior of the at least one streak associated with the at least one candidate RSO in successive images in the plurality of images generated by the plurality of imaging devices that the at least one candidate RSO is: the at least one known RSO stored in the RSO catalog, or at least one unknown RSO absent from the RSO catalog; where the known-unknown RSO split data processing pipeline may include: a known object processing pipeline that outputs the determination using the contrast-enhanced image data replica of each image in the plurality of images, and an unknown object processing pipeline that outputs the determination by inputting the enhanced image data replica of each image in the plurality of images into at least one machine learning model trained to: group the object features into tracks based on the temporal behavior of the objects features in the successive images, determine a likelihood of the tracks being associated with at least one particular candidate RSO, and relay detection coordinates of the tracks into the known object processing pipeline to assess whether a particular candidate RSO from the at least one candidate RSO is a particular known RSO registered in the RSO catalog; and assign based on the determination, one of: at least one RSO ID of the at least one known RSO listed in the RSO catalog to the at least one candidate RSO based on the determination that the at least one candidate RSO is the at least one known RSO, or at least one new RSO ID to the at least one candidate RSO for storage in the RSO catalog based on the determination that the at least one candidate RSO is the at least one unknown RSO.

In some embodiments, the present disclosure provides an exemplary technically improved computer-based method that may include the steps of receiving, by at least one centralized computer processor of at least one centralized computer of a central computing processing arrangement, image data of each image from a plurality of images acquired by a plurality of imaging devices coupled to a plurality of satellites in orbit around a celestial body in at least one orbital plane; where the image data of each image from the plurality of images may include object features associated with at least one other celestial body, at least one resident space object (RSO), or any combination thereof located within a field of view (FOV) of the plurality of imaging devices that image at a predefined image acquisition rate, a volume of a sky as the FOV of at least one imaging device from the plurality of imaging devices on each satellite moves in one of the at least one orbital plane; where the object features may include at least one streak associated with the at least one RSO; inputting, by the at least one centralized computer processor, the image data for each image into a pre-processing software pipeline to generate for each image a contrast-enhanced image data replica of each image, and an enhanced image data replica of each image; where the contrast-enhanced image data replica of each image may include an increased contrast of the object features in each image to improve a correlation determination between candidate RSO feature data of the object features associated with at least one candidate RSO in each image and known RSO feature data of the object features associated with at least one known RSO stored in an RSO catalog; receiving, by the at least one centralized computer processor, from an output of a known-unknown RSO split data processing pipeline, a determination, based at least in part on temporal behavior of the at least one streak associated with the at least one candidate RSO in successive images in the plurality of images generated by the plurality of imaging devices that the at least one candidate RSO is: the at least one known RSO stored in the RSO catalog, or at least one unknown RSO absent from the RSO catalog; where the known-unknown RSO split data processing pipeline may include: a known object processing pipeline that outputs the determination using the contrast-enhanced image data replica of each image in the plurality of images, and an unknown object processing pipeline that outputs the determination by inputting the enhanced image data replica of each image in the plurality of images into at least one machine learning model trained to: group the object features into tracks based on the temporal behavior of the objects features in the successive images, determine a likelihood of the tracks being associated with at least one particular candidate RSO, and relay detection coordinates of the tracks into the known object processing pipeline to assess whether a particular candidate RSO from the at least one candidate RSO is a particular known RSO registered in the RSO catalog; and assigning, by the at least one centralized computer processor, based on the determination, one of: at least one RSO ID of the at least one known RSO listed in the RSO catalog to the at least one candidate RSO based on the determination that the at least one candidate RSO is the at least one known RSO, or at least one new RSO ID to the at least one candidate RSO for storage in the RSO catalog based on the determination that the at least one candidate RSO is the at least one unknown RSO.

BRIEF DESCRIPTION OF THE FIGURES

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

FIGS. 1A-33 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Figure 1A:
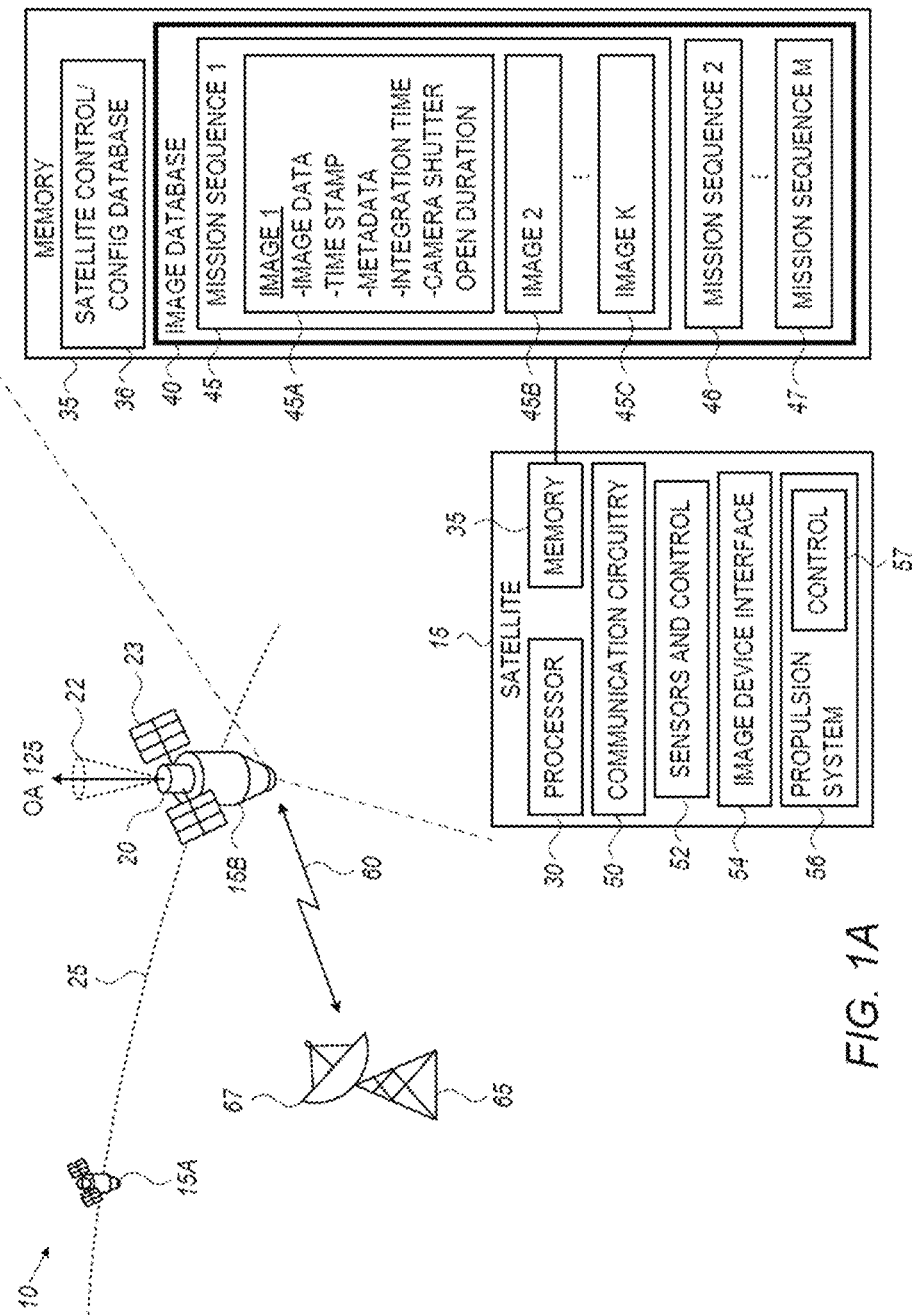

As more and more satellites are deployed into orbit about the Earth, there is a higher probability of collisions between space debris and important satellites. Velocities of space debris in orbit about a celestial body such as the Earth may be so high that even the smallest pieces of space debris may collide with important satellites and cause significant, if not catastrophic damage. Thus, as the number of a plurality of resident space objects (RSO) in orbit about the Earth grows, there is a need in the art to detect, identify and map the plurality of RSOs in space for RSO identification, RSO orbital determination, predictive RSO conjunction analysis, and RSO collision assessment.

A resident space object (RSO) may be a natural or artificial object that orbits another body. RSOs may be active and/or inactive and/or natural and/or man-made. For example, RSOs may broadly include, but are not limited to asteroids, comets, meteoroids, (active and/or inactive) satellites, rockets, and/or other space debris such as for example but not limited to rocket upper stages, debris from collisions and/or explosions, fragments of paint and/or other materials, and/or micrometeoroids. Collisions between RSOs may generate even more debris, which may further increase a risk of collisions.

Space situational awareness (SSA) may refer to the practice of tracking and/or monitoring RSOs to identify potential hazards and to support safe space operations particularly for government and/or commercial space activities. The number of RSOs in orbit has been increasing in recent years, due to the growing number of space launches, which has made SSA increasingly important. RSOs may be tracked using a variety of ground-based and/or space-based sensors. The data from these sensors may be used to create catalogs of RSOs, which may be used by SSA organizations to identify potential hazards and/or to support safe space operations so as to mitigate the risks posed by RSOs. This risk mitigation may include but is not limited to developing new technologies to track and/or remove RSOs from orbit, as well as developing international standards and regulations for space operations.

Embodiments of the present disclosure herein provide systems and methods for generating and processing a plurality of celestial image features from a plurality of images of a sky from which a mapping of the plurality of resident space objects (RSO) in orbit around a celestial body such as the Earth, another planet, moon, star, asteroid, or other body or any combination thereof, may be based. A constellation of low-cost space based optical sensor payloads (e.g., imaging cameras), and/or other sensor payloads, deployed on a plurality of satellites in a respective plurality of orbital planes around the Earth may be used to capture images of celestial bodies in outer space about the Earth.

In some embodiments, a coverage of a portion of the entire sky around the Earth may be imaged using a number of imaging cameras mounted on respective satellites respectively in orbit along a plurality of predefined orbital planes around the Earth such as but not limited to circular orbital planes. As each satellite moves along its orbit, its imaging camera may acquire images of outer space at predefined acquisition time intervals. The acquired images may include celestial feature images of a plurality of resident space objects (RSO) and/or a plurality of other celestial bodies such as planets and/or stars. The number of satellites travelling along the plurality of orbital planes and/or the number and orientation of the orbital planes may determine the amount of coverage of the portion of the entire sky around the Earth that the image data from the optical payload on each of the plurality of satellites may capture as will be disclosed in the following Figures.

It should be noted that the embodiments disclosed herein may generally be used for imaging RSOs in orbit around any celestial body, or celestial reference body. The term "other celestial bodies" may refer to planets and/or stars with reference to the celestial body such as the Earth, for example.

In some embodiments, once the image data of the plurality of images may be captured by images cameras coupled to the plurality of satellites in orbit around the Earth, for example, but facing away from the surface of the Earth to image outer space, the image data from the plurality of images may be transmitted to and processed by any of the following: a centralized computer on at a ground station on Earth, a plurality of computers at various different locations, a plurality of computers on any of the plurality of satellites or any combination thereof that may be all communicative coupled to each other.

It should be noted that the embodiments disclosed herein are directed to capturing image data of a plurality of images that are acquired by the constellation of a plurality of low-cost space based optical sensors (e.g., imaging devices), and/or other sensor payloads, on a respective plurality of satellites in multiple orbital planes about the Earth. The images may include any of a plurality of RSOs in orbit around the Earth that may move within the field of view of the imaging device. Any of the plurality of other celestial bodies such as planets and/or stars that may also be captured in the field of view. Hence the imaging device may generate images of moving RSOs and/or other moving celestial bodies (e.g., stars and/or planets) as celestial image feature streaks within the frame. Image features of detected objects in the image may include a point or a streak. The point in the image may be indicative of an object, for example, that exhibits little motion in the FOV during the imaging acquisition time. As the point indicative of a detected moving body in space such as an RSO that moves in the FOV of the imaging device within the imaging acquisition time window, a streak may be formed. Distant stars may exhibit virtually the same orientation and length of streak, as the relative motion may be due only to the motion of the sensor itself. The lengths and/or orientations of the streaks of RSO's may vary, where the length of the streak may be indicative of the orbital velocity of the RSOs relative to the imaging sensors and/or other moving celestial bodies. The plurality of images captured during an acquisition time interval (e.g., hourly, daily, weekly, monthly, or by any other interval) may cover all orbital regimes of the plurality of RSOs.

Stated differently, a streak may include one or more RSO traces in an image frame and it may lead to an observation when measured. A track may be a combination of streaks of the same RSO from multiple image frames, which may be used to extract an RSO orbit when the tracks are processed.

Note that the terms streak and streaklets may be used interchangeably herein. A trace or streak trace may be a plurality of streaks associated with a particular RSO and/or other particular celestial features, such as stars, for example, detected in successive images that were acquired at predefined acquisition time intervals by the at least one imaging device.

In some embodiments, the plurality of images may be sequentially captured in predefined acquisition time intervals as a continually imaging framing system such that each next image may include new features as well as substantially the same features as the previous image. The predefined acquisition time interval may be chosen so as to define the frame-to-frame image feature coverage. As a non-limiting example, a frame-to-frame feature coverage of 90% may include 90% of the same celestial image features in an initial and next image frame and 10% new celestial image features. In this manner, a celestial image feature mapping may be generated for the plurality of images of the plurality of RSOs and/or other celestial bodies.

In some embodiments, for each detected space-based image, an observation may be generated. At a given time instant and a given location in space, big data analytics, machine learning models and/or advanced algorithms may be applied to the acquired celestial image features from the image data to determine which particular RSO may be at a particular location in space at a particular time for RSO identification (known and/or unknown RSO), RSO orbital determination, predictive RSO conjunction analysis, and RSO collision assessment. The celestial image feature mapping may be used to continuously update this data and predict the presence of unknown and/or new RSOs in space.

In some embodiments, the image data from the plurality of images acquired by a particular imaging device on a particular satellite may be transmitted periodically to a centralized computer for processing. The centralized computer may be a ground-based centralized computer (e.g., base station) and/or one or more distributed satellite computers and/or a particular satellite computer designated as the centralized processing computer. Thus, the plurality of images acquired by the plurality of satellites in orbit around the Earth may be used by the centralized computer in the generation of the celestial image features (which may also be in the form of a map and/or catalog) as well as the subsequent processing of the image celestial image feature mapping using the big data analytics, machine learning models and/or advanced algorithms.

Figure 1B:
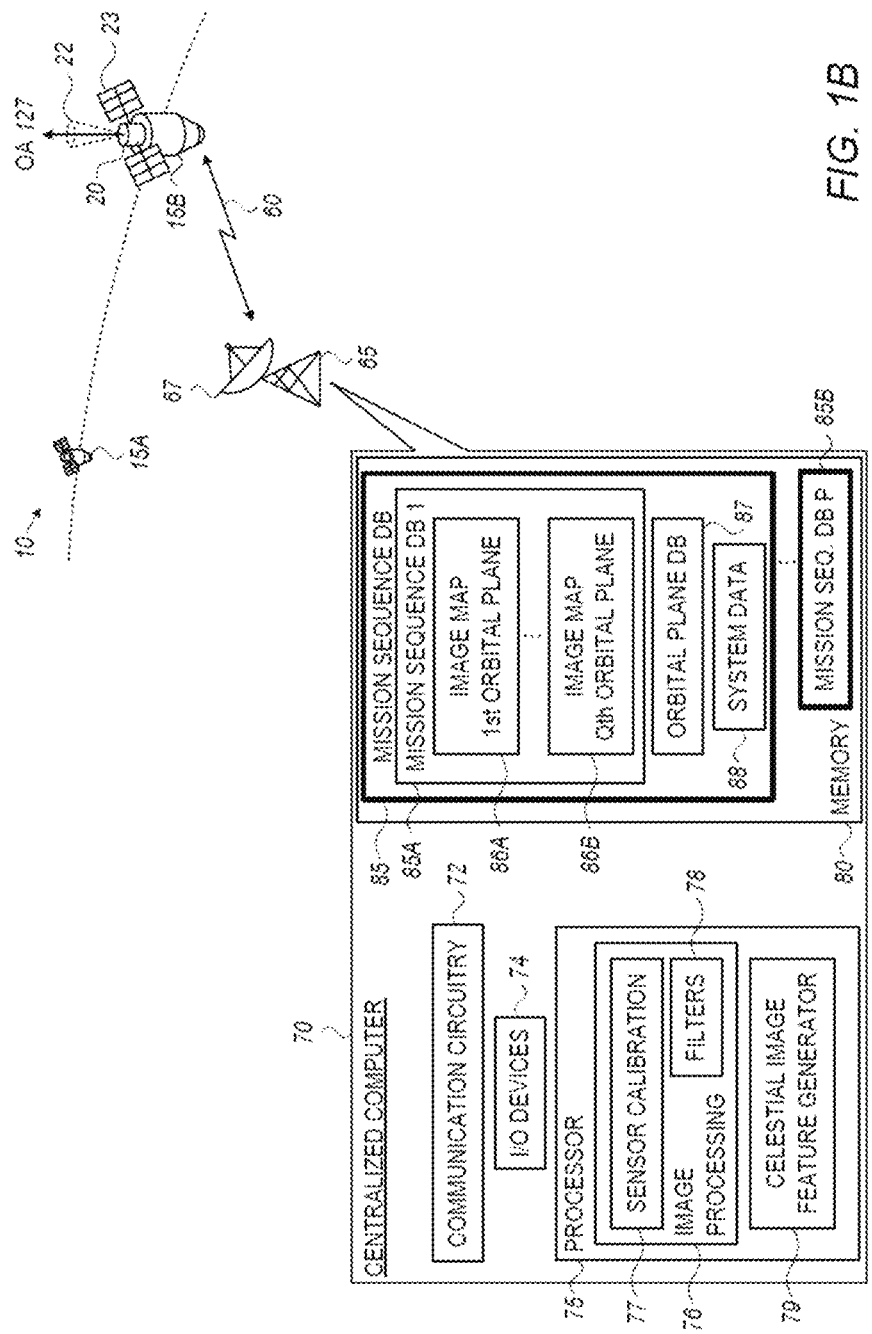

FIGS. 1A-1B are schematic diagrams of a system 10 for generating a plurality of celestial image features from a plurality of images of a sky in accordance with one or more embodiments of the present disclosure. The system 10 may include a plurality of satellites 15 denoted as 15A and 15B travelling on an orbital plane 25. Each satellite 15 may include at least one imaging camera 20 with a field of view (FOV) 22 with an optical axis (OA) 125 oriented in the middle of the FOV 22 pointing into the sky (e.g., outer space).

In some embodiments, the FOV 22 may be conical shaped.

In some embodiments, the satellites 15A and 15B may have solar panels 23 to power the satellite.

In some embodiments, each satellite 15 may include a computing system that may further include at least one satellite processor 30, at least one non-transitory computer memory 35, at least one communication circuitry 50, at least one sensor and control module 52 that may include at least one sensors and control circuitry for controlling at least one imaging optical arrangement, at least one imaging device data interface 54 (e.g., application programming interface (API) routines) for receiving image data from the plurality of sensors, and at least one propulsion system 56 including thrusters, for example, for moving the satellite through space, and at least one controller 57 that is configured to control the at least one propulsion system 56.

In some embodiments, different satellite configurational data may be stored within at least one satellite control and configuration database 36. The at least one satellite processor 30 may be specifically configured to fetch the satellite configurational data when needed.

In some embodiments, the satellite configurational data for imaging outer space may include but is not limited to (1) orbital data of the satellite for determining its altitude, inclination, local time of ascending node, orbital state vector and/or eccentricity. This information may be used for planning observations and for predicting the satellite's position over time. (2) The attitude data of the satellite for determining its orientation in space. This information may be used for pointing the satellite's instruments at specific targets. (3) The instrument configuration data that may include information about the different instrument modes of operation, filters, and other settings. This information may be used for processing the data collected by the instrument. (4) Calibration data may be used to correct for any artifacts in the instrument's measurements. This information may be used for obtaining accurate and reliable data.

In some embodiments, there may be other satellite configuration data that may be relevant to imaging outer space. For example, some satellites may carry additional instruments that can be used to support imaging operations, such as for example star trackers and/or gyroscopes.

In some embodiments, an orbital plane of an object such as the satellite 15 may be the plane in which it orbits around another object. The orbital plane may be defined by three parameters: (1) Inclination: The angle between the orbital plane and a reference plane. The reference plane may typically be, for example, the ecliptic plane for objects orbiting the Sun, or the equatorial plane of the central body for objects orbiting a planet or moon. (2) Longitude of the ascending node: The angle between the reference plane and the line where the orbital plane may cross the reference plane from south to north. LTAN may be a parameter used in orbital mechanics that describes the time of day at which a satellite in a sun-synchronous orbit (SSO) may cross the equator from south to north. SSOs may be designed to keep the satellite at the same local solar time as it passes over any given point on Earth so as to allow for consistent lighting conditions such as for imaging. Examples of LTAN for SSO satellites may be (but not limited to) 10:30 and 13:30 (1:30 PM) because of good lighting conditions and minimization of atmospheric drag. (3) Argument of periapsis: The angle between the line of nodes (the line connecting the ascending and descending nodes) and the major axis of the ellipse.

These parameters may be used to describe the orbital plane of any object.

The orbital plane of an object may be visualized as a large, flat disk. The object itself may orbit around the central body (e.g., the Earth) within this plane. The inclination of the orbital plane may determine how much the plane may be tilted relative to the reference plane. The longitude of the ascending node may determine where the orbital plane may cross the reference plane from south to north. The argument of periapsis may determine where the object may be closest to the central body within its orbit. Orbital planes may be used to predict the motion of objects in space. For example, knowing the orbital planes of two objects may be used to predict when the two objects may collide or when one object may occult the other object.

Orbital plane eccentricity is a measure of how much an orbit deviates from a perfect circle. A circular orbit has an eccentricity of 0, while a more elliptical orbit has a non-zero eccentricity up to, but not equal to, 1. True anomaly is the angle between the periapsis of an orbit and the current position of the orbiting body. The periapsis is the point in the orbit where the orbiting body is closest to the central body.

In some embodiments, during a data collection session, which may be also referred to herein as a mission sequence, or a data collection sequence, image data may be outputted from the at least one imaging device 20 and stored in at least one image database 40 in a plurality of M mission sequence sub-databases where M is an integer.

In some embodiments, the at least one image database 40 may store the image data of k images where k is an integer acquired at predefined time acquisition intervals as the at least one satellite 15 and the at least one imaging camera 20 move along at least one predefined orbital plane 25. The image data records of the k images may be denoted image data record 1 45A, image data record 2 45B, . . . and image data record K 45C.

In some embodiments, each image data record 45A, 45B, and 45C for each acquired image may include celestial feature metadata such as but not limited to image data, an acquisition time stamp data of the image data acquisition, satellite system data, a sensor integration time data of the plurality of sensors, and/or a camera shutter open duration data.

In some embodiments, the image data may be in an image data format that may include, but not limited to, raw data image, a flexible transport image system (FITS) format, a tagged image file format (TIFF), a joint photographic experts group (JPEG) format, a portable network graphics (PNG) format, a hierarchical data format version 5 (HDF5) and/or raw data formats. The raw data formats may include proprietary and/or specialized formats.

In some embodiments, the image data may be in a video data format that may include but not limited to raw video data, MPEG-4 video compression format, H.264 (also known as AVC) highly efficient video compression format, H.265 (HEVC-high efficiency video coding) format, audio video interleave (AVI) format, Quicktime (MOV) format, other proprietary formats with specialized compression and/or data storage methods, and/or raw video data formats in an uncompressed and/or lightly processed format.

In some embodiments, the satellites 15A and 15B may communicate 60 with a centralized computer 70 as shown in FIG. 1B so as to transmit the image data from a mission sequence to the centralized computer 70. The centralized computer 70 may include at least one centralized computing processor 75, input and/or output (I/O) devices 74, at least one centralized computing communication circuitry, and at least one centralized computing non-transitory memory 80.

In some embodiments, the at least one centralized computing non-transitory memory 80 may be configured to store a mission sequence database (DB) 85 that may include data from a plurality of P missions with the image data that is received from each of the plurality of satellites, where P is an integer. The P mission sequence databases may be denoted MISSION SEQUENCE DB 1 85A . . . MISSION SEQUENCE DB P 85B. Each of the P mission sequence databases may include a plurality of image map records with each image map record that includes image data of images taken by satellites along the same orbital plane that capture images of substantially the same portion of outer space.

For example, in the exemplary embodiment shown in FIG. 1B, MISSION SEQUENCE 1 DB 85A may include an orbital plane database (DB) 87 with orbital plane data, system data 88, and image maps from a plurality of Q orbital planes where Q is an integer denoted as IMAGE MAP $1^{st}$ ORBITAL PLANE 86A . . . IMAGE MAP $Q^{th}$ ORBITAL PLANE 86B.

In some embodiments, the at least one mission sequence database (DB) 85 stored in the at least one centralized computing non-transitory memory 80 may be arranged in any suitable manner and not limited to the exemplary embodiment shown in FIG. 1B. For example, the mission sequence database (DB) 85 may be partitioned to separate databases that store image data from each satellite in orbit around the Earth independent of mission.

In some embodiments, the centralized computer 70 may be a ground-based base station 65 with a base station computer (Earth-based computer) 70 for processing the image data acquired by a downlink via a base station antenna 67.

In some embodiments, the centralized computer 70 may include at least one particular satellite processor designated from a plurality of satellite processors 30 where the data is not transmitted to Earth but processed in space. Each of the plurality of satellite processors 30 may transmit the image data to the at least one designated satellite processor designated as the centralized computer 70 for processing.

In some embodiments, satellite ground station 65 or ground-based base station may be a facility on Earth that may communicate with the satellites 15 in space. The ground stations may be used to send and receive data (uplink and downlink, respectively), including voice, video, and telemetry data. Ground stations may be also used to track and control satellites. Ground stations may include a variety of equipment such as for example, but not limited to an antenna that may be used to transmit and receive radio signals from satellites. The antenna may be in a variety of sizes and shapes, and types, all of which may depend on the frequency of the signals that they may be designed to handle. Receivers and/or transmitter and/or accompanying circuitry that may be used to convert radio signals and data therein into electrical signals for signal processing. Signal processing equipment may be used for amplifying, filtering, and/or modulating/demodulating the transmitted and/or received radio signals.

In some embodiments, the ground stations 65 in the context herein may be used for spacecraft tracking and control for tracking the location and orientation of satellites as described herein to send them commands and/or receive data. The spacecraft tracking and control may be used for maintaining the satellites in orbit and for ensuring that they are operating properly. Ground stations may be located all over the world. Some ground stations may be owned and/or operated by government agencies, military and/or private companies.

In some embodiments, the transmission of data between any of the plurality of satellites 15 and the centralized computer 70 in a ground station may be via an uplink and a downlink. The uplink may be the transmission of data from the ground station to the satellite. The downlink may be the transmission of data from the satellite to the ground station.

In some embodiments, the antenna 67 may be a parabolic antenna. The parabolic antenna may focus radio waves into a narrow beam, which allows for long-distance communication between the ground station 65 and any of the plurality of satellites 15.

In some embodiments, communications satellites may use the uplink and/or downlink to transmit voice, data, and video signals. Observation satellites such as disclosed herein may use the downlink to transmit images and other data from the space-based images. Navigation satellites may use the downlink to transmit positioning and timing information to users on the ground.

In some embodiments, the at least one centralized computing processor 75 may execute a number of software modules: an image processing module 76 that may be configured to apply big data analytics, machine learning models and/or advanced algorithms to the acquired image data. The filtering 78 module may apply matched filters to the image data streaks collected by the imaging devices 20 on each of the satellites 15. The image data streaks may include, but are not limited to raw, calibrated, and/or corrected image data streaks. The corrected image data streaks may include, for example, a background correction. The parameters of the match filter may be tuned with data based on observed RSOs having position information such as data from a global navigation satellite system (GNSS) (e.g., GPS, GLONASS, Beidou, Galileo, among others or any combination thereof). In other embodiments, the GNSS data may be used to train the machine learning and/or AI models for processing of the plurality of celestial image features.

In some embodiments, the software modules shown in the centralized computer 70 of FIG. 1B may be executed by a central computing processing arrangement that may include a plurality of computing processors of a plurality of computers (e.g., different computing machines) that may be distributed across different physical locations, or all located at one location.

In some embodiments, the software modules shown in the centralized computer 70 of FIG. 1B may be executed by a central computing processing arrangement that may include at least one centralized computing processor of at least one centralized computer.

It should be noted that the term "central computing processing arrangement" may refer to any suitable arrangement of processing devices, computers, computing machines, etc., that may be at a single location or distributed over multiple physical locations so as to perform the functions described herein.

In some embodiments, central computing processing arrangement may use load balancing techniques to optimize the computational efficiency between different computers, computing devices and/or computing machines in processing the image data and/or celestial feature metadata associated with each of the plurality of images.

In some embodiments, a celestial image feature generator module 79 may use the images acquired from the different satellites to generate a plurality of celestial image features such as streaks and/or star patterns captured in these images.

In some embodiments, the celestial image feature generator module 79 may be configured to extract the celestial image features by 1) correlating partial signals (based on a preset defocusing parameter) and specific general orbit, but without known a priori RSO knowledge, and 2) changing detection by overlapping two (or more) subsequent frames based on the overlap and identifying obvious changes.

In some embodiments, the celestial image feature generator 79 may identify at least 1000 celestial image features in the plurality of images. In some embodiments, the celestial image feature generator 79 may identify at least 10,000 celestial image features in the plurality of images. In some embodiments, the celestial image feature generator 79 may identify at least 100,000 celestial image features in the plurality of images. In some embodiments, the celestial image feature generator 79 may identify at least 1,000,000 celestial image features in the plurality of images. In some embodiments, the celestial image feature generator 79 may identify at least 10,000,000 celestial image features in the plurality of images.

In some embodiments, the celestial image feature generator module 79 may use all of the images acquired from the different satellites to generate a celestial image feature image mapping based on a desired format and/or schema for arranging all of the space-based images for an easy and seamless integration with RSO calibration and/or detection algorithms.

In some embodiments, RSOs identified in the image map may be compared with data stored in a resident space object (RSO) repository database that may include information about known RSOs. The RSO repositories may be used by a variety of organizations, including space agencies, military agencies, satellite operators, and researchers. Space agencies may use RSO repositories to track the movement of RSOs and to assess the risk of collisions. Satellite operators may use RSO repositories to avoid collisions with other satellites. Researchers may use RSO repositories to study the population of RSOs and to develop ways to mitigate the risks posed by RSOs.

In some embodiments, any or all of the RSO catalog databases may be updated with the generated celestial image features based on celestial feature metadata of each image from the plurality of images and/or processed celestial image features data.

In some embodiments, the updating of data in RSO database repositories acquired using the embodiments disclosed herein may be crucial for managing the risks posed by RSOs. By tracking the movement of RSOs and assessing the risk of collisions, RSO repositories may help to ensure the safety of satellites and astronauts. RSO repositories may improve the safety of satellites and astronauts by tracking the movement of RSOs and assessing the risk of collisions. RSO repositories may help to reduce the costs associated with space operations by helping satellite operators to avoid collisions with other satellites. RSO repositories may help researchers to better understand the population of RSOs and to develop ways to mitigate the risks posed by RSOs.

In some embodiments, a satellite orbit may be the path that a satellite may take around a planet or other celestial object. Satellite orbits may be determined by the gravitational pull of the planet or other celestial object, as well as the speed and direction at which the satellite may be launched. There are many different types of satellite orbits, but the most common may include:

Low Earth orbit (LEO): LEO satellites may orbit the Earth at an altitude of between 160 and 2,000 kilometers. LEO satellites may often be used for communications, navigation, and remote sensing.

Medium Earth orbit (MEO): MEO satellites may orbit the Earth at an altitude of between 2,000 and 35,786 kilometers. MEO satellites may often be used for GNSS and communications.

Geosynchronous Earth orbit (GEO): GEO satellites orbit the Earth at an altitude of 35,786 kilometers, which is the altitude at which the satellite's angular rate along its orbit is the same as the Earth's rotation rate. Accordingly, GEO satellites may stay over the same spot on the Earth's surface. GEO satellites may be often used for weather forecasting, communications, and television broadcasting.

A cislunar orbit may refer to an orbit in the region between the Earth and the orbit of the moon.

Satellite orbits may also be classified by their inclination, which is the angle between the satellite's orbital plane and the Earth's equatorial plane. Satellites with an inclination of 0 degrees orbit may be in the same plane as the Earth's equator, while satellites with an inclination of 90 degrees may orbit directly over the Earth's poles.

Satellite orbits may also be classified by their eccentricity, which may be a measure of how elliptical an orbit is. A perfectly circular orbit may have an eccentricity of 0, while a highly elliptical orbit may have an eccentricity of close to 1. Generally, orbits for which eccentricity is greater than 0.1 may be categorized as highly elliptical.

Note that the above description of satellites in orbit (e.g., the sensor-based satellites) may also be applied to RSOs in orbit around the Earth or a celestial body.

FIGS. 2A-2D are schematic diagrams of the satellite 15 orbiting a celestial body 110 with different orientations for imaging outer space in accordance with one or more embodiments of the present disclosure.

In some embodiments, as the schematic diagram 90 shown in FIG. 2A, the satellite 15 may be orbiting around the celestial body 110 such as the Earth in an orbital plane 25. A Cartesian coordinate system 91 with orthogonal XYZ axes with an origin 24 on a body of the satellite 15 is shown in FIG. 2A. The origin 24 may be placed in any suitable position on the body of the satellite 15. The satellite 15 may move along the orbital plane 25 travelling with any orbital velocity where the component of a tangential orbital velocity vector (TAN) 92 (tangential to the orbital plane 25) may be coincident with the Y axis, for example. In this coordinate scheme, the vector coincident with the optical axis 125 of the imaging device 20 may form an angle α with the X-axis, an angle β with the Y-axis, and an angle γ with the Z-axis. Stated differently, the optical axis 125 of the imaging camera 20 may be configured to image a portion of the sky pointing at any arbitrary angle (e.g., a predefined pointing angle) relative to the origin 24 on the body of the satellite 15 along the orbital plane 25.

Note that the terms imaging device, imaging camera, and camera may be used interchangeably herein.

In some embodiments, as the schematic diagram 92 shown in FIG. 2B, the satellite 15 may be orbiting around the celestial body 110 where the imaging camera 20 may be aft or forward imaging so as to image the portion of the sky substantially in the direction of tangential orbital velocity vector (TAN) 92 such that α=90°, β=0°, and γ=90°.

Figure 2C:
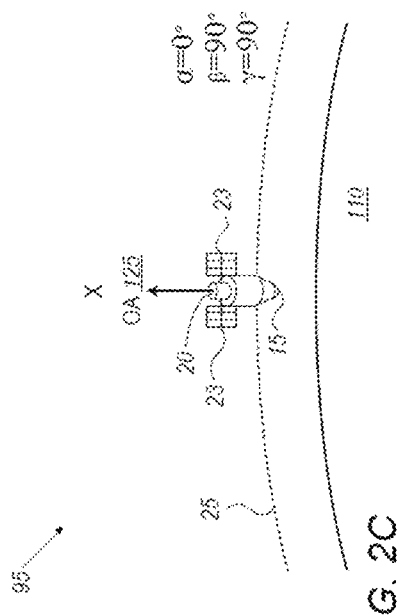

In some embodiments, as the schematic diagram 95 shown in FIG. 2C, the satellite 15 may be orbiting around the celestial body 110 where the imaging camera 20 may be side pointing so as to image the portion of the sky substantially perpendicular to the direction of tangential orbital velocity vector (TAN) 92 and opposite to the celestial body such that α=0°, β=90°, and γ=90°.

Figure 2D:
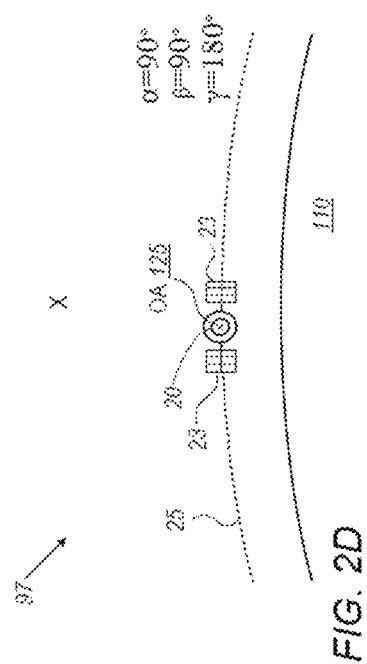

In some embodiments, as the schematic diagram 97 shown in FIG. 2D, the satellite 15 may be orbiting around the celestial body 110 where the imaging camera 20 may be boresight so as to image the portion of the sky substantially in the direction perpendicular to the orbital plane 25 (e.g., α=90°, β=90°, and γ=180°). In the case shown in FIG. 2D, the optical axis 125 is pointing the Z-direction outward from the plane of the page. In other embodiments, the optical axis 125 may be pointing in the Z-direction into the plane of the page α=90°, β=90°, and γ=0°

Note that the embodiments shown in FIGS. 2A-2D with the exemplary coordinate system 91 are merely for visual and conceptual clarity and not by way of limitation of the embodiments disclosed herein. The coordinate system 91 is merely used to illustrate that the optical axis 125 may image the portion of the sky in any arbitrary predefined pointing angle (direction) relative to the direction of the orbital velocity of the satellite 15 and the origin 24 on the body of the satellite 15. Any suitable coordinate system may be used.

For sake of clarity, the orientation of the satellite 15 is shown in the FIGS. 1A-1B, 2D-2E, and 3-8 herein in the boresight orientation of FIG. 2C but it is to be understood that in each of these figures, the optical axis 125 may be in any predefined orientation with respect to the motion of the satellite.

Figure 2E:
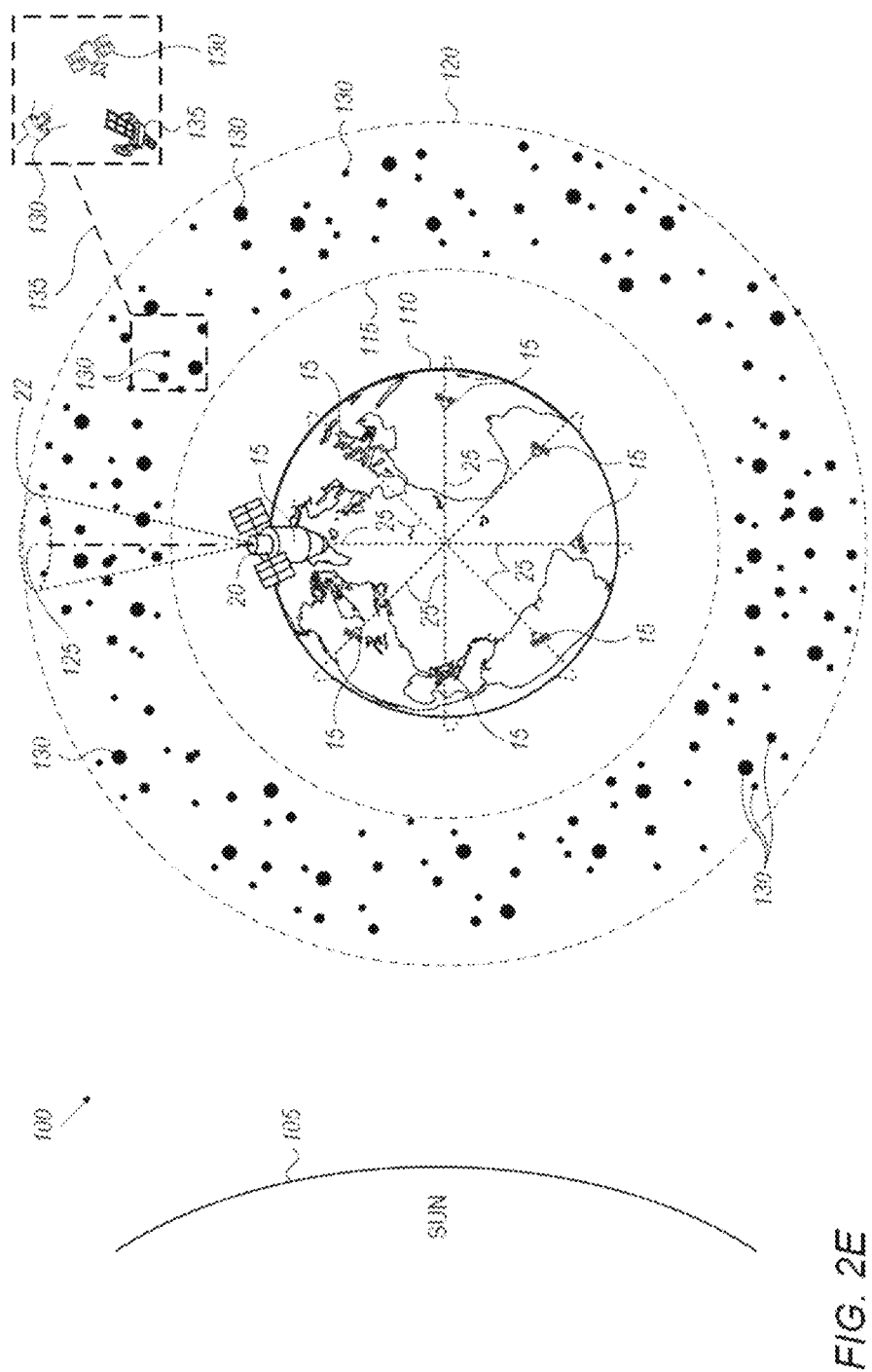

FIG. 2E is a schematic diagram 100 of a plurality of satellites 15 and a plurality of resident space objects (RSO) 130 in an orbit about a celestial body 110 in accordance with one or more embodiments of the present disclosure. The celestial body 110 may be the Earth for example, which may be illuminated by a sun 105. The plurality of satellites 15 may be configured, but not limited to orbit the celestial body 110 in four orbital planes 25, for the exemplary embodiment of FIG. 2E, that may be respectively oriented 45 degrees from one another in FIG. 2E.

Furthermore, the plurality of RSOs 130 may orbit the Earth from a start of a low Earth orbit (LEO) region 115 at about 160 km above the Earth to an end of geosynchronous (GEO) orbit region 120 or 35,786 km above the Earth. Note that the plurality of RSO 130 may be located within two concentric spheres of RSOs 130 bounded by the start of the LEO orbital region 115 and the GEO orbital region 120 distance as shown in FIG. 2E. The plurality of RSO 130 although shown as black dots may be, for example, satellites as shown in an enlarged inset 135.

The embodiment shown in FIG. 2E is merely for visual and conceptual clarity and not by limitation of the embodiments disclosed herein. Some of the plurality of RSOs may be closer to the Earth and less than LEO orbital region 115, and/or larger than GEO orbital region 120 (e.g., cislunar region outside of GEO orbital region). Note that cislunar may refer to any region between the Earth and the orbit of the moon. Nevertheless, the at least one imaging device 20 may capture any RSOs entering the FOV 22.

In some embodiments, the field of view (FOV) 22 of the at least one imaging device 20 of an optical imaging system may be the angular extent of the observable world that may be seen at any given moment. The FOV may be described by the physical area which can be imaged, such as a horizontal or vertical field of view in mm, or alternatively, an angular field of view specified in degrees.

In some embodiments, the FOV 22 of the optical imaging system may be determined by a number of factors, including but not limited to the focal length of the lens, the size of the image sensor, and/or the aperture of the system. A lens with a shorter focal length may have a wider FOV than a lens with a longer focal length. A larger image sensor may also have a wider FOV than a smaller image sensor (see FIGS. 4 and 5).

In some embodiments, the field of view (FOV) 22 having an optical axis 125 of the at least one imaging device 20 may be configured to image celestial objects falling within the field of view 22 such as any of the plurality of RSO 130 from a distance from the Earth ranging from the LEO orbital region 115 through GEO orbital region 120 into outer space.

In some embodiments, the space situational awareness (SSA) satellite optical payload (e.g., the at least one imaging device 20) may have the optical axis 125 of the FOV 22 configured to image a portion of the sky pointing at any arbitrary angle (e.g., the pointing angle as shown in FIG. 2A) relative to the origin 24 on the body of the satellite 15 along the orbital plane 25.

In some embodiments, the FOV 22 may have, for example, a shape of a ±1 deg cone or pyramid relative to the optical axis 125 for performance optimization.

In some embodiments, the FOV 22 may have, for example, a shape of a ±2 deg cone or pyramid relative to the optical axis 125 for performance optimization.

In some embodiments, the FOV 22 may have, for example, a shape of a ±3 deg cone or pyramid relative to the optical axis 125 for performance optimization.

In some embodiments, the FOV 22 may have, for example, a shape of a ±4 deg cone or pyramid relative to the optical axis 125 for performance optimization.

In some embodiments, the FOV 22 may have, for example, a shape of a ±5 deg cone or pyramid relative to the optical axis 125 for performance optimization.

In some embodiments, the FOV 22 may have, for example, a shape of a ±6 deg cone or pyramid relative to the optical axis 125 for performance optimization.

In some embodiments, the FOV 22 may have, for example, a shape of a ±7 deg cone or pyramid relative to the optical axis 125 for performance optimization.

In some embodiments, the FOV 22 may have, for example, a shape of a ±8 deg cone or pyramid relative to the optical axis 125 for performance optimization.

In some embodiments, the FOV 22 may have, for example, a shape of a ±9 deg cone or pyramid relative to the optical axis 125 for performance optimization.

In some embodiments, the FOV 22 may have, for example, a shape of a ±10 deg cone or pyramid relative to the optical axis 125 for performance optimization.

In some embodiments, the FOV 22 may have, for example, a shape of a ±15 deg cone or pyramid relative to the optical axis 125 for performance optimization.

In some embodiments, the FOV 22 may have, for example, a shape of a ±20 deg cone or pyramid relative to the optical axis 125 for performance optimization.

In some embodiments, the FOV 22 may have, for example, a shape of a ±25 deg cone or pyramid relative to the optical axis 125 for performance optimization.

In some embodiments, the FOV 22 may have, for example, a shape of a ±30 deg cone or pyramid relative to the optical axis 125 for performance optimization.

In some embodiments, the FOV 22 may have, for example, a shape of a ±35 deg cone or pyramid relative to the optical axis 125 for performance optimization.

In some embodiments, the FOV 22 may have, for example, a shape of a ±40 deg cone or pyramid relative to the optical axis 125 for performance optimization.

In some embodiments, the at least one imaging device 20 may be mounted on a motorized gimbal on the satellite 15. The motorized gimbal may be a device that uses motors to stabilize the at least one imaging device 20. The at least one imaging device 20 on a satellite might be mounted on a motorized gimbal so as: (1) To compensate for the motion of the satellite. Satellites may be constantly moving, and this motion may cause the at least one imaging device 20 to vibrate or shake. A motorized gimbal may be used to compensate for this motion and keep the imaging device stable. (2) To point the imaging device at specific targets (e.g., for changing the pointing angle of the at least one imaging device 20). Since satellites may be used to image a wide variety of targets, from the Earth's surface to distant galaxies, the motorized gimbal may be used to point the at least one imaging device 20 at specific targets, regardless of the satellite's orientation, (3) To track moving targets since some satellites may be used to track moving targets, such as aircraft or ships. A motorized gimbal may be used to keep the imaging device pointed at the moving target, even if the satellite may be moving in a different direction.

In some embodiments, the FOV 22 may be at a predefined orientation relative to a tangential component of the orbital velocity of the satellite 15 as shown previously in FIG. 2A. As the satellite 15 with at least one imaging device 20 moves along a given orbital plane 25, the field of view 22 also moves along the orbital plane 25 based on the orbital velocity of the satellite 15. The at least one imaging device 20 may be configured to acquire a plurality of images at predefined acquisition time intervals such as for example, but not limited to every 1 second. In this manner, each image will have a significant overlapping of features from the previous image where the overlapping coverage may be dependent on the orbital velocity and/or the predefined acquisition time intervals and/or the size of the FOV 22.

Note that there may be different coordinate systems for describing resident space objects (RSOs). For example, different organizations and applications may use different coordinate systems, based on their specific needs. Some of the most common space coordinate systems used for describing the position and/or location of RSOs in space may include:

Equatorial coordinate system: The equatorial coordinate system is a celestial coordinate system that may use the Earth's rotation axis as its reference point. It may be used to locate objects in the sky and is defined by two angles: right ascension (RA) and declination (Dec), which may also be known as RADEC. RA may be the angle measured eastward along the celestial equator from the vernal equinox to the object's hour circle, and Dec may be the angle measured north or south from the celestial equator to the object. The equatorial coordinate system may be a global coordinate system that may be used to locate objects anywhere in the sky. It may also be relatively easy to use since the RA and Dec coordinates (RADEC) of an object may be measured directly with a telescope or other astronomical instrument. This coordinate system may also refer to an Earth-Centered Inertial (ECI) coordinate system as described below.

Geocentric coordinate system (GCS): The GCS is a global coordinate system that may use the Earth's center as its origin. It may be commonly used for navigation and tracking purposes. The GCS may be defined by three coordinates: latitude, longitude, and altitude. Latitude may be the angle measured north or south from the Earth's equator, longitude may be the angle measured east or west from the prime meridian, and altitude may be the distance above the Earth's surface. The GCS may be used to describe the positions of RSOs relative to the Earth's surface.

Earth-Centered Inertial (ECI) coordinate system: The ECI coordinate system is a non-rotating coordinate system that may be also centered on the Earth. It may be commonly used for spacecraft orbit determination and propagation. The ECI coordinate system may be defined by three coordinates: X, Y, and Z. The X-axis may point towards the vernal equinox, the Y-axis may point towards the North Pole, and the Z-axis may point towards the center of the Earth. The ECI coordinate system may be used to describe the positions of RSOs relative to the Earth's center and the Sun.

Topocentric coordinate system: The topocentric coordinate system is a local coordinate system that may use a specific point on the Earth's surface as its origin. It may be commonly used for tracking and targeting RSOs. The topocentric coordinate system may be defined by three coordinates: azimuth, elevation, and slant range. Azimuth may be the angle measured clockwise from north to the object, elevation may be the angle measured above the horizon, and slant range may be the distance between the observer and the object. The topocentric coordinate system may be used to describe the positions of RSOs relative to a specific ground station or other observer.

The embodiments of the present disclosure may use and/or reference the Equatorial coordinate system as will be further described hereinbelow. However, this is not by way of limitation of the embodiments disclosed herein. Any suitable coordinate system may be used to map and/or track RSOs in the sky.

In some embodiments, a sun-synchronous orbit (SSO) may be a nearly polar orbit around a planet, in which the satellite may pass over any given point of the planet's surface at the same local mean solar time. Stated differently, it may be an orbit arranged so that the satellite may precess through one complete revolution each year, so as to maintain the same relationship with the Sun.

Sun-synchronous orbits may be achieved by having the osculating orbital plane precess (rotate) approximately one degree eastward each day with respect to the celestial sphere to as match with the Earth's movement around the Sun. As a result, the satellite's orbital plane may rotate once a year, so as to keep the satellite in the same relative position with respect to the Sun.

The main advantages of sun-synchronous orbits may include: (1) Reduced solar glare: Sun-synchronous orbits may be typically chosen so that the satellite may always be in sunlight, but the Sun may be at a low angle in the sky. This may reduce the amount of solar glare on the satellite's imaging sensors, which may improve the quality of the data. (2) Reduced thermal variations: Sun-synchronous orbits may help to reduce the amount of thermal variation that the satellite experiences. Since the satellite may always be in the same relative position with respect to the Sun, it may receive a consistent amount of sunlight so as to improve the performance of the satellite's instruments. Thus, sun-synchronous orbits may provide consistent lighting and thermal conditions, which may improve the quality and accuracy of the data collected as further described hereinbelow. (3) Enhance power management of the spacecraft from constant illumination of the solar panels 23.

Figure 2F:
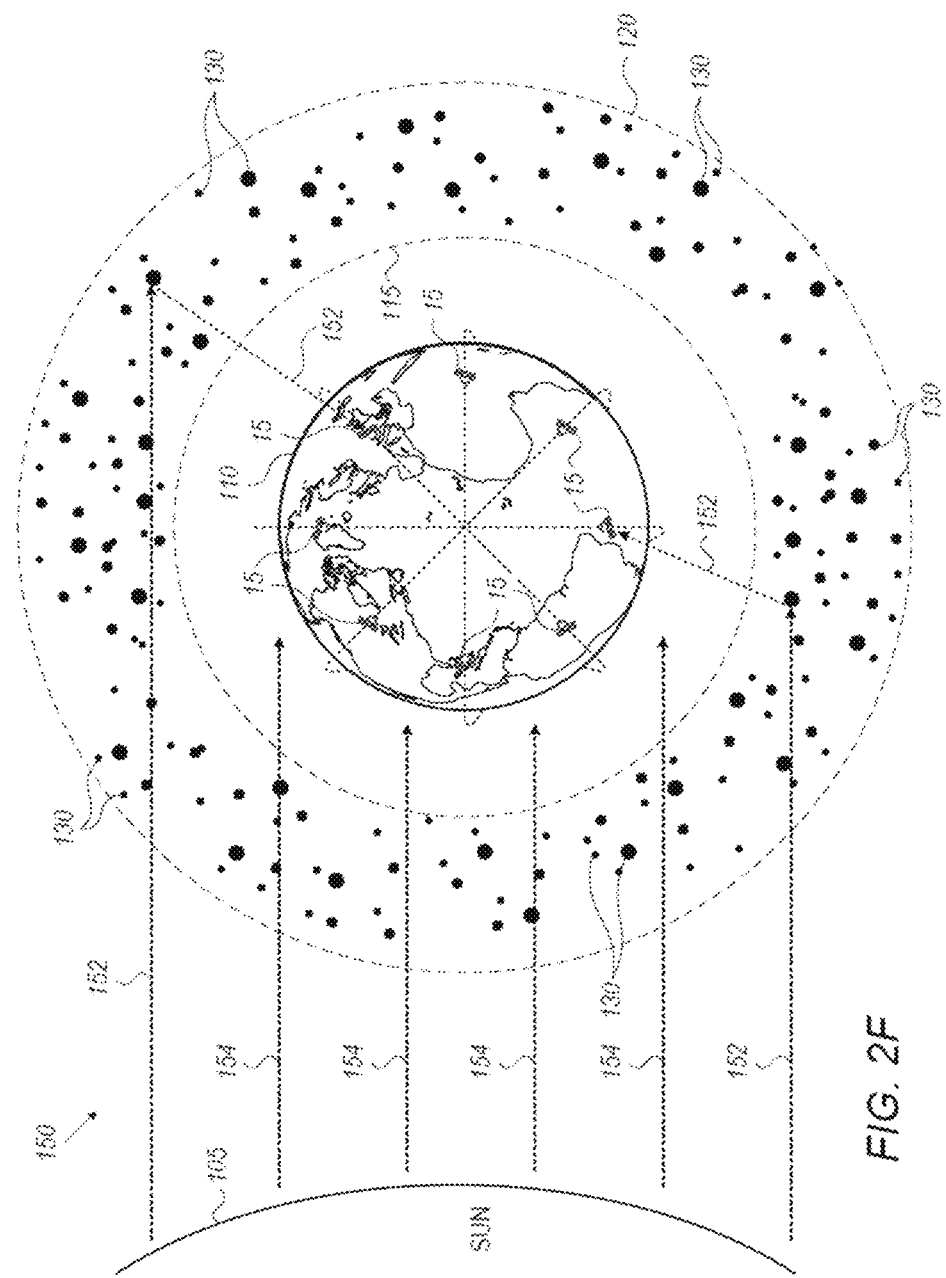

FIG. 2F is a schematic diagram 150 of the plurality of resident space objects (RSO) 130 in orbit about the celestial body 110 and illuminated by the sun 105 in accordance with one or more embodiments of the present disclosure. Even though the FOV 22 of the at least one imaging device 20 may be pointing to any of the plurality of RSOs 130, an effective detection of these RSOs in the at least one imaging device 20 is dependent of the interception of sunlight (e.g., rays 152 of sunlight) that strikes a particular RSO and may be reflected into the FOV 22 of the at least one imaging device 20. In other embodiments, the effective detection of these RSOs 130 in the at least one imaging device 20 may be dependent on a detection of a self-emission of infrared radiation. In the exemplary embodiment shown in FIG. 2F, sunlight rays 152 strike an RSO that reflects the light into the camera of one of the plurality of satellites 15 as shown toward the top and bottom of FIG. 2F. Similarly, the Celestial body 110 may block sunlight rays 154 from the sun 105 from illuminating some of the plurality of RSOs 130 on the right side of the FIG. 2F in the exemplary embodiment. Accordingly, even though a particular RSO may be in a particular position in space (e.g., known particular right ascension and declination coordinates), if no light illuminates the particular RSO at the particular position (e.g., due to Earth shadowing), the presence of the particular RSO at the particular position may not be detectable by the at least one imaging device 20.

In some embodiments, the plurality of orbital planes may be sun-synchronous orbital planes.

Figure 2G:
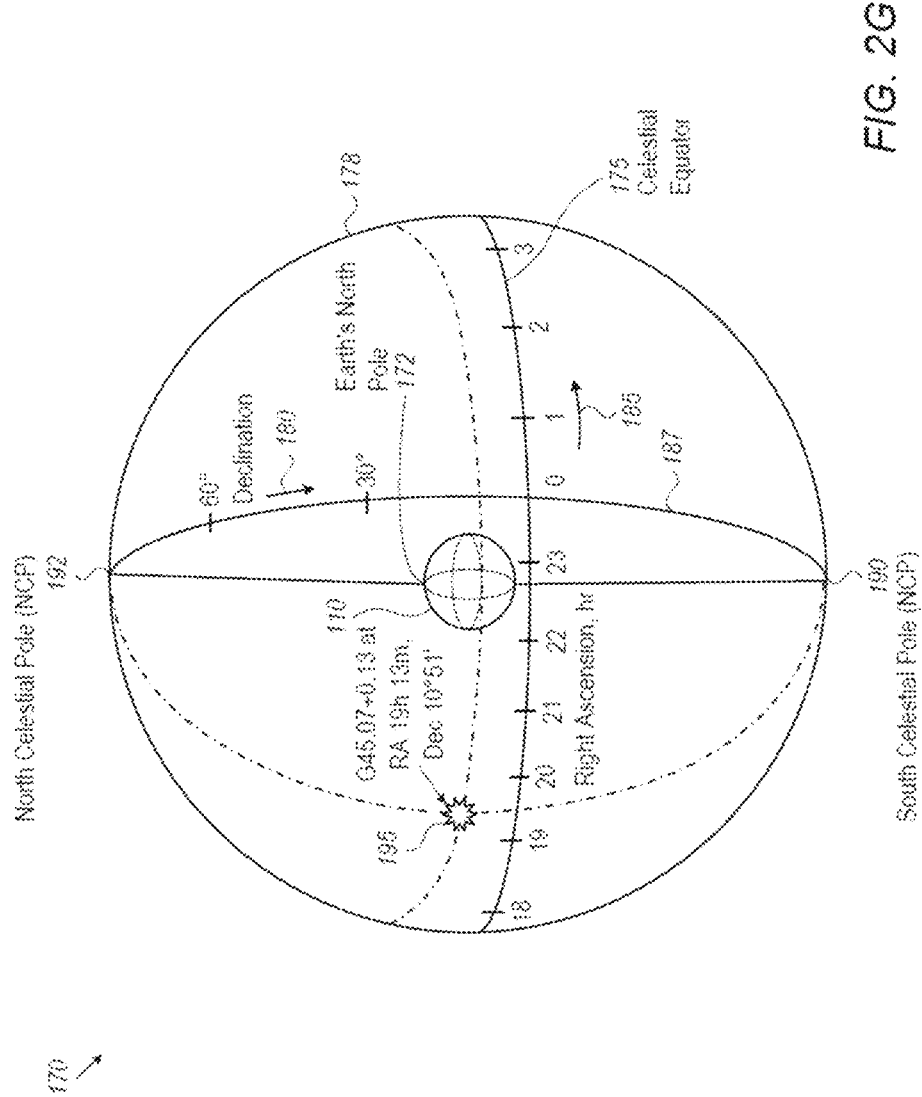

FIG. 2G is a schematic diagram illustrating locational representation object tracking in space in accordance with one or more embodiments of the present disclosure. The exemplary embodiment shown uses the Celestial body 110 with the Earth's North pole 172 as a reference for a celestial sphere 178 surrounding the Celestial body 110. The celestial sphere 178 may include a celestial equator 175, a north celestial pole (NCP) 192, and a south celestial pole (SCP) 190. Declination (DEC) 180 may be the distance (North/South) from the celestial equator 175 that may be expressed in degrees. Similarly, right ascension (RA) 185 may be the distance (East/West) from a Vernal Equinox 187 that may be expressed in hours/minutes/seconds. The points of the celestial sphere 178 may be used to describe a position of any celestial body in space. Coordinates of an exemplary RSO 195 may be shown for visual clarity. Note that the orbital radius or a distance measurement from the Celestial body 110 to the RSO 195 may be further needed to characterize the orbital distance from the Celestial body 110 and/or the satellite 15.

It should be noted for the sake of clarity that an imaging coverage of the entire sky, or all of outer space, may refer to acquiring images covering the entire range of right ascension and declination values in space. However, imaging the entire sky may not be needed since the RSOs at some point in time may be on an orbital path that may be captured by the satellite imaging system. Hence, a portion of the sky may be imaged to determine the plurality of RSOs which may include both known and unknown RSOs. A database of known RSOs may be used to predict the expected location of each known RSO in the sky at a given time and within the portion of the sky to be imaged. In addition, based on orbit dynamics, all "unknown" RSOs may be foreseen to be observed in the satellite constellations as described in the embodiments disclosed herein.

In some embodiments, imaging cameras deployed on a predetermined number of satellites on a predetermined number of orbital planes (e.g., satellite constellation) may be used to provide the desired imaging coverage to image both known RSOs and unknown RSOs. That is, the satellite constellation may be configured to image a predetermined subset of the entire range of right ascension and declination values in space that may still cover the entire RSO population within a predetermined time of the mission sequence and where, in this predetermined subset of the entire range of right ascension and declination values, every RSO's path may cross the system's field of view (e.g., at least one FOV 22).

In some embodiments, based on the number of satellites in orbit for collecting the image data of the RSO population, the mission sequence to collect the image data may have a duration of at least one hour (but not limited to 1 hour to 24 hours), at least one day (but not limited to 1-7 days), at least one week (but not limited to 1-4 weeks), at least one month (but not limited to 1-12 months, at least one year (but not limited to 1-10 years), at least one decade, and so on.

Figure 3:
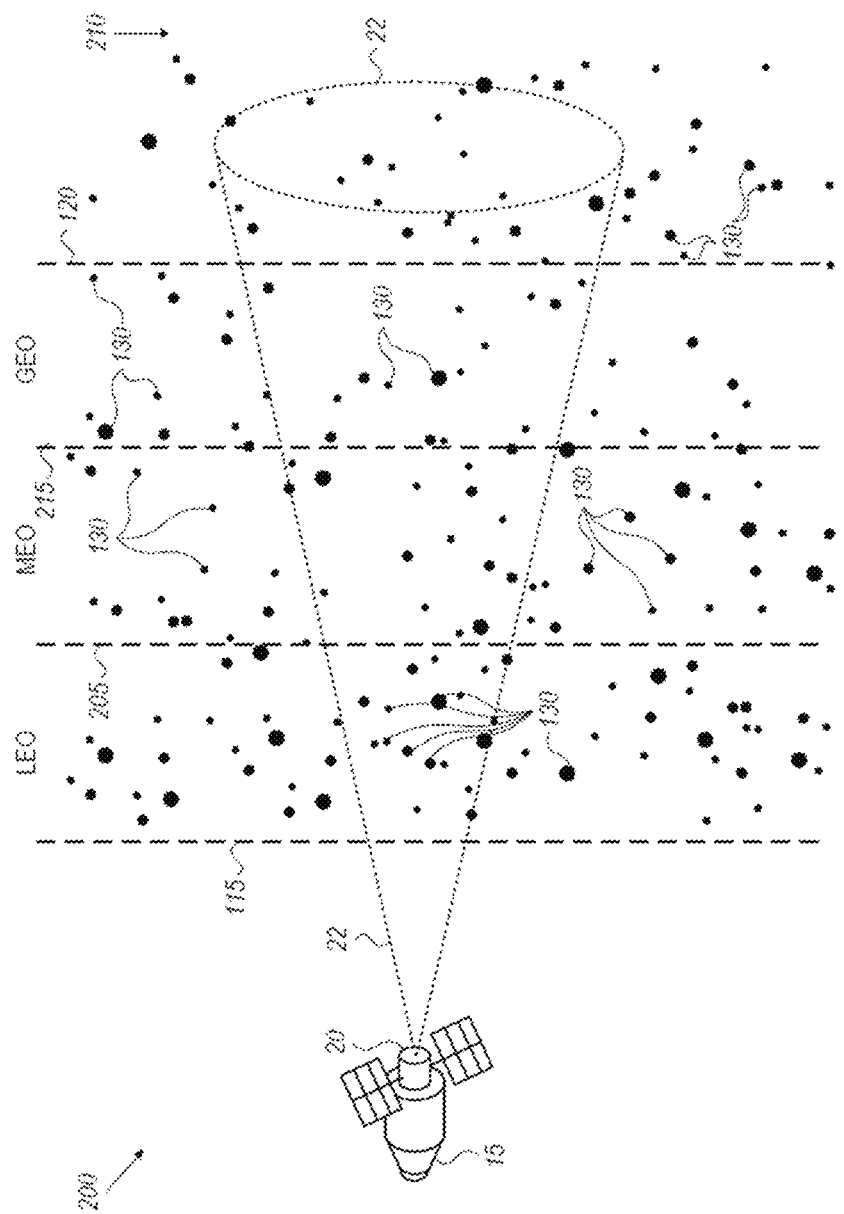

FIG. 3 is a schematic diagram 200 of the satellite 15 with the at least one imaging device 20 that is imaging the plurality of RSOs 130 in accordance with one or more embodiments of the present disclosure. The at least one imaging device 20 may image the RSOs 130 captured within the FOV 22 from the start of the LEO orbital region 115 distance from Earth to the start of medium Earth orbital region (MEO) 205 to the start of the GEO orbital region 215 to the end of GEO orbital region 120 to cislunar 210 distances from the Celestial body 110. The at least one imaging device 20 may include at least one imaging optical arrangement that focus the light captured from any of the RSOs in the FOV 22 onto sensors in the at least one imaging device 20.

Figure 4:
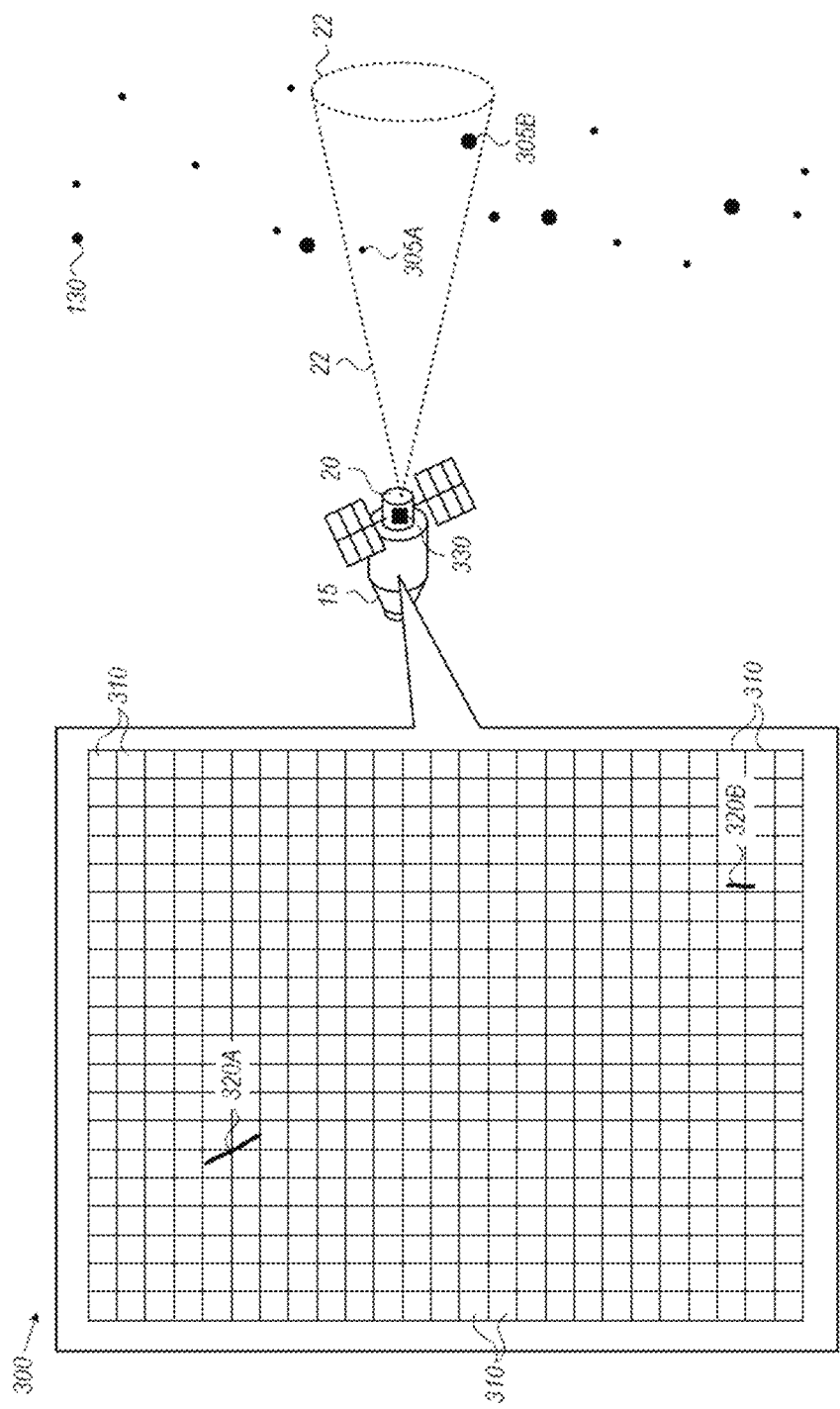

FIG. 4 is a schematic diagram of at least one sensor array 300 of a plurality of sensors 310 in the at least one imaging device 20 in accordance with one or more embodiments of the present disclosure. The at least one imaging device 20 may include at least one imaging optical arrangement 330 that may further include but are not limited to optical lenses, optical filters, optical mirrors, polarizers, collimators, or any combination thereof. The at least one imaging optical arrangement 330 may focus the image in the field of view onto a sensor array in the at least one imaging device 20. The at least one imaging optical arrangement 330 may be controlled by the satellite processor 30 via the imaging device optics control circuitry 52. The satellite processor 30 may be configured via the imaging device interface circuitry 54 to receive image data from the at least one imaging device 20.

In some embodiments, the at least one sensor array 300 may represent a plurality of pixels by having the plurality of sensors 310 arranged in a regular grid. Each sensor in the array may be represented by a small square and may be responsible for detecting light from a specific point in the image. The brightness of each pixel in the image may be determined by the amount of light detected by the corresponding sensor in the sensor array. The number of sensors in an array may determine the resolution of the image so a higher resolution image may have more pixels to capture more detail.

In some embodiments, the plurality of sensors 310 may be configured to define a plurality of pixels to detect light through the at least one imaging optics and to generate image data of the image within the FOV 22. In the exemplary embodiment shown in FIG. 4, the at least one imaging device 20 may capture an image of two celestial image features from the light reflected from two RSOs denoted 305A and 305B in the FOV 22. The at least one imaging optical arrangement 330 may focus the reflected light from RSOs 305A and 305B onto the plurality of sensors 310. Since the RSOs 305A and 305B may be moving with very high orbital velocities, the light captured by the imaging optical arrangement 330 over a number of pixels from the plurality of pixels during the predefined image acquisition time (e.g., the frame-to-frame acquisition time). Note that RSO 305A is closer to the satellite 15 and thus, travels faster through the FOV 22 than RSO 305B, which generates a longer streak than RSO 305B. For example, the image of RSO 305A may be detected as a streak 320A encompassing two pixels as shown on FIG. 4. Similarly, the image of RSO 305B may be detected as a streak 320B encompassing 1.5 pixels as shown on FIG. 4.

In some embodiments, the angle of the streak on the at least one sensor array 300 may be indicative of the relative direction that the RSO and/or the other celestial body may be moving within the FOV 22. Similarly, the length of the streak may be indicative of the velocity of the RSO and/or the other celestial body moving within the FOV 22.

In some embodiments, satellite optical imaging sensors in imaging device 20 for an optical sensor array in a satellite camera may include, for example, but are not limited to charge-coupled devices (CCDs) or complementary metal-oxide-semiconductor (CMOS) sensors.

In some embodiments, CCDs may be image sensors that use an array of photosensitive cells to convert light into electrical signals. CCDs may be known for their high sensitivity and image quality.

In some embodiments, CMOS sensors may be image sensors that use an array of transistors to convert light into electrical signals. CMOS sensors may be less expensive to manufacture than CCDs, but they may also be less sensitive and produce lower image quality.

In some embodiments, the type of sensor that may be used in a satellite camera depends on the specific needs of the camera. For example, a satellite camera that may need to collect high-resolution images of the Earth's surface may use a CCD sensor. A satellite camera that needs to be low-cost and lightweight may likely use a CMOS sensor.

In some embodiments, some examples of satellite optical imaging sensors for an optical sensor array in a satellite camera may include panchromatic sensors, multispectral sensors, and hyperspectral sensors.

In some embodiments, panchromatic sensors may capture images in black and white.

Panchromatic sensors may typically be used for high-resolution imaging applications, such as mapping and surveillance.

In some embodiments, multispectral sensors may capture images in multiple wavelengths of light. Multispectral sensors may typically be used for remote sensing applications, such as monitoring vegetation and land use.

In some embodiments, hyperspectral sensors may capture images in hundreds of bands of one or more regions of the electromagnetic spectrum. Hyperspectral sensors may typically be used for scientific research applications, such as studying minerals and gases.

In some embodiments, infrared sensors may capture images in infrared wavelength ranges. For example, short wavelength infrared (SWIR) sensors may operate in the 1.4-3 µm wavelength range. Mid-wavelength infrared (MWIR) sensors may operate in the 3-8 µm wavelength range. Long wavelength infrared (LWIR) sensors may operate in the 8-15 µm wavelength range.

In some embodiments, the plurality of sensors may detect light having a light intensity above a predefined detection threshold. The predefined detection threshold may depend on the type of sensor used in the array.

Figure 5:
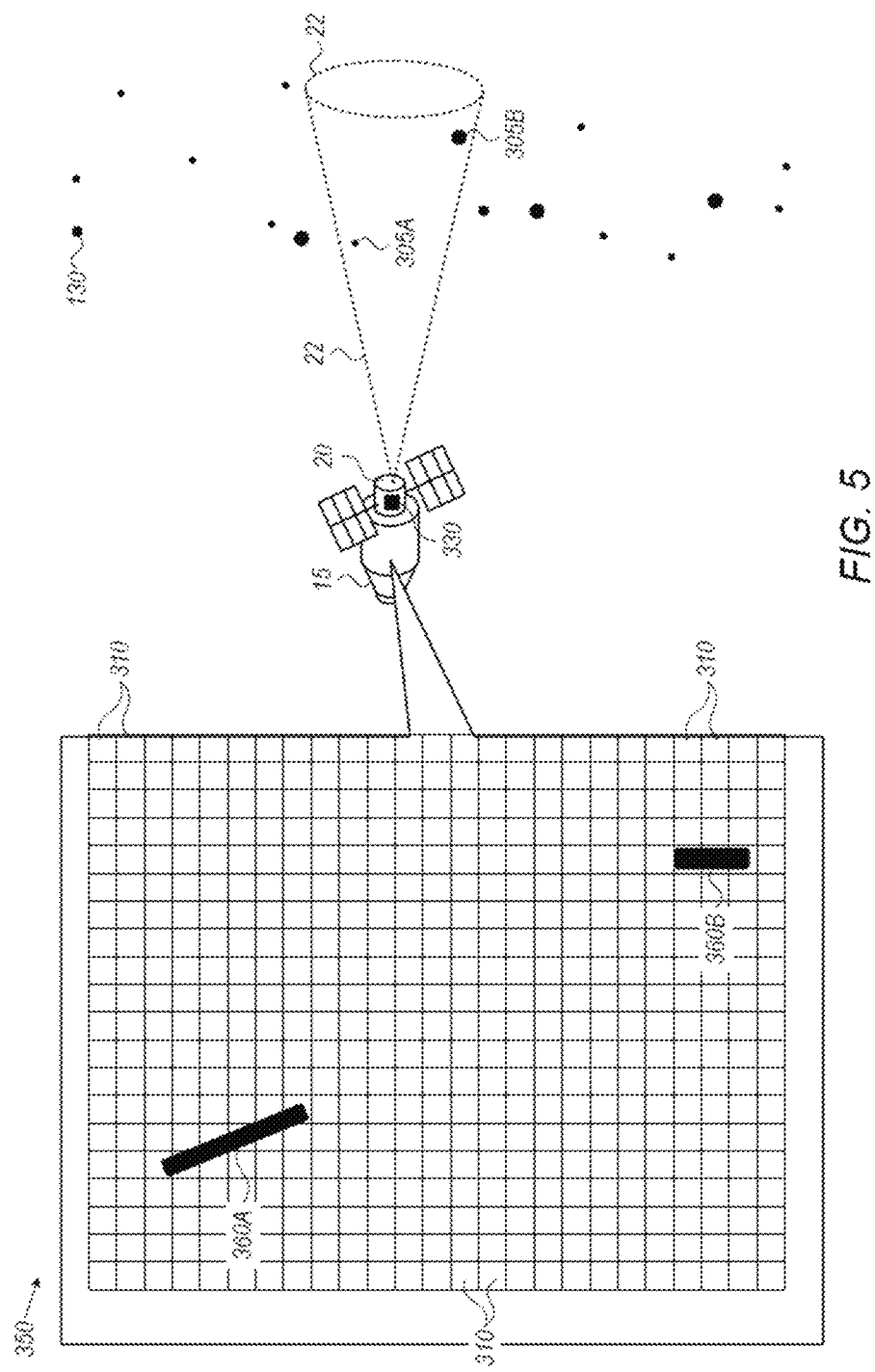

FIG. 5 is a schematic diagram of a sensor array 350 of the plurality of sensors 310 in the at least one imaging device 20 in accordance with one or more embodiments of the present disclosure. The celestial image features may be used in part to determine the position and/or velocity of the imaged RSOs and/or other celestial bodies in the FOV 22 captured in the sky. The data retrieved in each of the images may be used in advanced algorithms to identify the RSO and to determine the orbit of the RSO around the Earth. However, to improve the positional detection accuracy for use in the algorithms, the image of the celestial image features may be acquired when the imaging optical arrangement 330 may be defocused.

In some embodiments, the imaging optical arrangement 330 may be used to increase the accuracy of the celestial image features by defocusing the imaging optical arrangement 330 by the control circuitry 52 with a preset defocusing parameter. The defocusing spreads the image of each celestial image feature over a preset number of pixels in the plurality of pixels based on the preset defocusing parameter. Thus, in comparing the embodiments of FIG. 4 to the embodiments of FIG. 5, the image of RSO 305A may be detected as a defocused streak 360A encompassing about 5 pixels as shown on FIG. 5. Similarly, the image of RSO 305B may be detected as a defocused streak 360B encompassing 2.5 pixels as shown on FIG. 5. Again, the longer defocused streak 360A corresponding to RSO 305A is due to the apparent orbital speed being larger than RSO 305B.

In some embodiments, the matched filters 78 may be applied to streaks caused by moving RSOs to improve detection in the image data and/or pre-processed image data. The image data streaks may include, but are not limited to raw, calibrated, and/or corrected image data streaks. The corrected image data streaks may include, for example, a background correction.

In some embodiments, for the type of sensors used, the preset defocusing parameter may cause the image to spread over a predetermined number of additional pixels, such as for example, but not limited to 2 to 3 additional pixels, for example, for detection sensitivity improvement. In other embodiments, the preset defocusing parameter may cause the image to spread over a predetermined number of additional pixels, such as for example, but not limited to 4 to 9 additional pixels, for example, for detection sensitivity improvement.

In some embodiments, the preset defocusing parameter may be kept constant over a mission sequence. In other embodiments, the preset defocusing parameter may be changed by the satellite processor 30 during a mission sequence.

In some embodiments, the plurality of sensors may be calibrated for various environmental conditions and to account for the effect of different environmental conditions on the detection using preset defocusing parameters. For example, when the temperature changes, the detected RSO streaks and/or the detected stars patterns may shift. The application of at least one calibration parameter to the plurality of sensors may be used to correct for these changing environmental-based detection impairments.

In some embodiments, the at least one calibration parameter may be kept constant over a mission sequence. In other embodiments, the at least one calibration parameter may be changed during a mission sequence.

In some embodiments, other calibrations for satellite optical imaging sensors for an optical sensor array in a satellite camera may include but are not limited to radiometric calibration, spectral calibration, geometric calibration, line of sight calibration, and/or flat field calibration.

In some embodiments, radiometric calibration may be used to ensure that the sensor is accurately measuring the intensity of light. This may be done by comparing the sensor's output to a known source of light.

In some embodiments, spectral calibration may be used to ensure that the sensor is accurately measuring the wavelength of light. This may be done by comparing the sensor's output to a known source of light with a known spectrum.

In some embodiments, geometric calibration may be used to ensure that the sensor is accurately measuring the position of objects in the scene. This may be done by comparing the sensor's output to a known imaging scene with a known geometry.

In some embodiments, line of sight calibration may be used to ensure that the sensor may be pointing in the correct direction. This may be done by comparing the sensor's output to a known scene with known geometry.

In some embodiments, flat field calibration may be used to correct for any non-uniformity in the sensor's response. This may be done by imaging a uniform scene and then using the image to create a correction map.

In some embodiments, these calibrations may typically be performed before the satellite is launched and/or may periodically be performed throughout the satellite's mission.

In some embodiments, the calibrations may be performed using a variety of methods, which may include ground-based calibration facilities, on-board calibration systems, and/or in-flight calibration procedures. These methods may include, for example, cross-camera calibration, where for a constellation of plurality of cameras (e.g., sensors) coupled to a respective plurality of satellites, one sensor may be calibrated with respect to the other sensors in order to assess the inter-camera biases. This may be done by considering sequential time-based acquired images of a known scene imaged using each of the plurality of sensors implement cross-camera calibration. In other embodiments, calibration validation may be implemented using images of one or more stars captured in the FOV. The calibration residuals may be saved for each image, acting as a continuous and real-time quality control metric as will be described hereinbelow.

In some embodiments, a camera clock via an image timestamp may be calibrated using location and time data provided by at least one GNSS satellite. A precise location of a GNSS satellite may be determined from the image. The central computing processor may be used to compare this position as a function of time to determine a time bias between the camera clock and the GNSS clock. Additionally, or alternatively, the camera clock may be calibrated using one or more other objects having known positions at known times, such as, e.g., the International Space State, a weather satellite, or any other space object having publicly and/or privately available time and position data to compare to the image timestamp and location determined from the image.

In some embodiments, the satellite optics may be preset with the preset defocusing parameter. Thus, the embodiment shown in FIG. 4 is merely for conceptual clarity in explaining the defocusing embodiment of FIG. 5 and not representative of the acquired images used for analyses. The acquired images used for position and orbital analyses of the orbiting resident space objects may include the defocused streaks for improved RSO detection as shown in FIG. 5.

Figure 6:
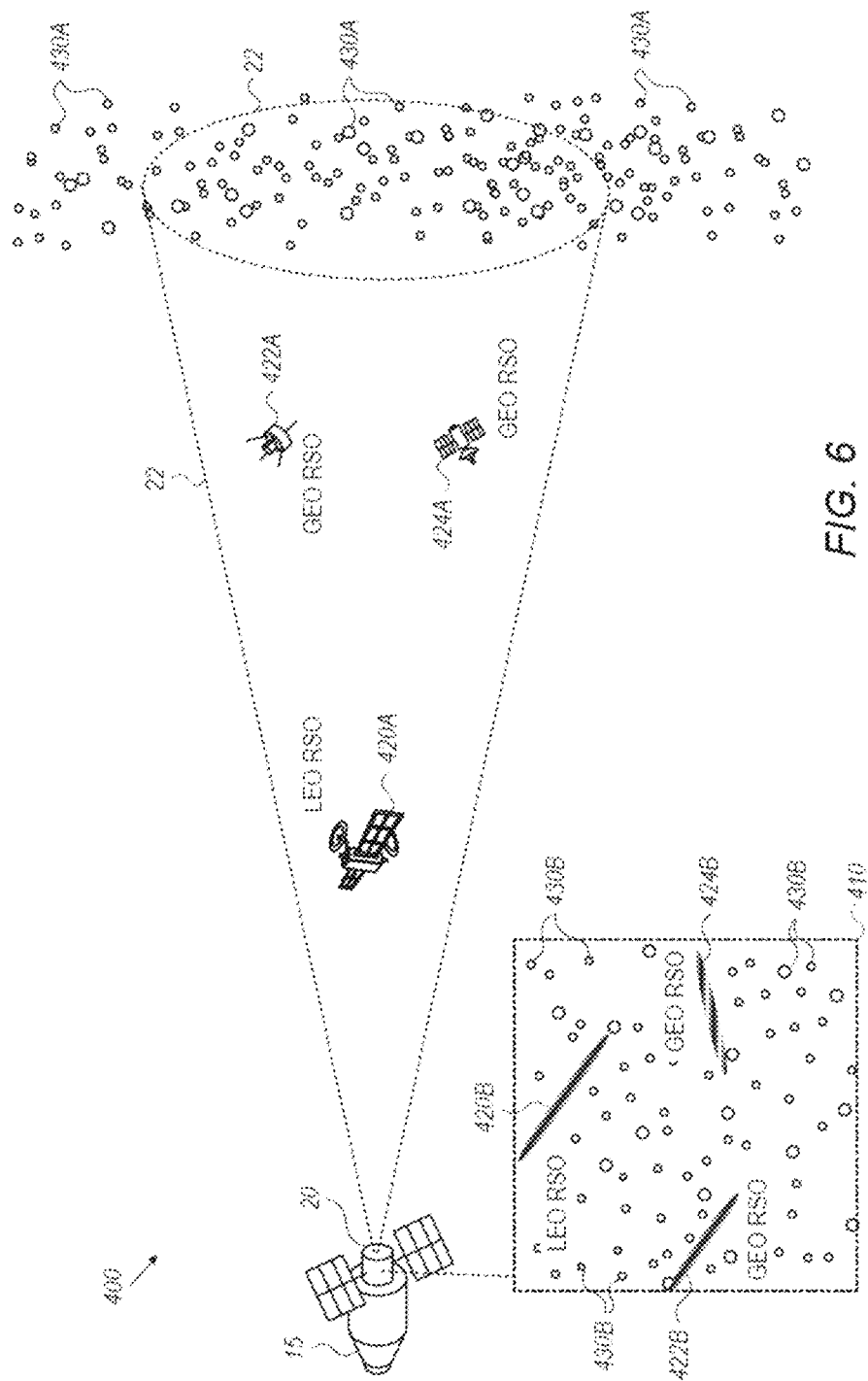

FIG. 6 is a schematic diagram of an acquired image 410 with celestial image features corresponding to imaged RSOs and stars in outer space in accordance with one or more embodiments of the present disclosure. The at least one imaging device 20 of the satellite 15 may image a LEO RSO 420A, a first GEO RSO 422A, a second GEO RSO 424A and a plurality of stars 430A with the FOV 22. Note that in contrast to FIG. 3 regarding the scale of distances from the satellite 15 to the object of interest, the plurality of stars 430A are far outside of the solar system. The at least one satellite processor may generate image data forming the image 410 with the celestial features: the LEO RSO celestial feature (streak) 420B, the first GEO RSO celestial feature 422B, the second GEO RSO celestial feature 424B, and star celestial features 430B. Note that the streak of the LEO RSO celestial feature may be longer than that of the GEO RSO celestial feature since the LEO RSO 420A is closer to the at least one imaging device 20 than the GEO RSOs (422A and 424A) and moving faster through the FOV 22 relative to the GEO RSOs.

Note that the plurality of stars 430A may be moving at large velocities but due to the distances from the plurality of the stars 430A to the at least one imaging device 20, the streaking of respective plurality of star celestial image features 430B may be less pronounced than the much closer RSOs (e.g., the LEO RSO 420A, the first GEO RSO 422A, and the second GEO RSO 424A).

In some embodiments, the detected light in the at least one imaging device 20 may be reflected from or generated by the at least one other celestial body, the at least one RSO, or any combination thereof to the imaging optical arrangement 330 within the FOV 22 from a minimum to a maximum distance away from each satellite. The minimum distance may be RSOs located within the LEO orbital region 115 (e.g., a portion of the LEO orbital region 115 nearest the imaging optical arrangement 330 within the cone of the FOV 22). The maximum distance may be the distance to stars far outside of the solar system.

In some embodiments, the detected light captured in the FOV 22 may be from the at least one RSO that may be located at a minimum distance from the start of the LEO orbital region 115 and into a cislunar 210 region (maximum) distance away from each satellite 15. In some embodiments, the minimum and the maximum distance may be relative to the Earth such as for example, where the minimum and the maximum distance may follow the radial vector from the center of the Earth.

In some embodiments, the detected light captured in the FOV 22 may be from the at least one other celestial body that may be located from the minimum distance away from each satellite 15 at the start of the LEO orbital region 115 and to a maximum distance outside of the solar system. The detected light from the at least one celestial body may include detected streaks from a plurality of stars and/or planets. This may be used to detect particular stars from the plurality of stars spatially arranged in specific star constellations.

In some embodiments, the advanced algorithms to identify the RSO at particular locations in space may use the shape and/or position of star celestial features from imaged star constellations that may be captured in the image data of the acquired image 410.

Figure 7:
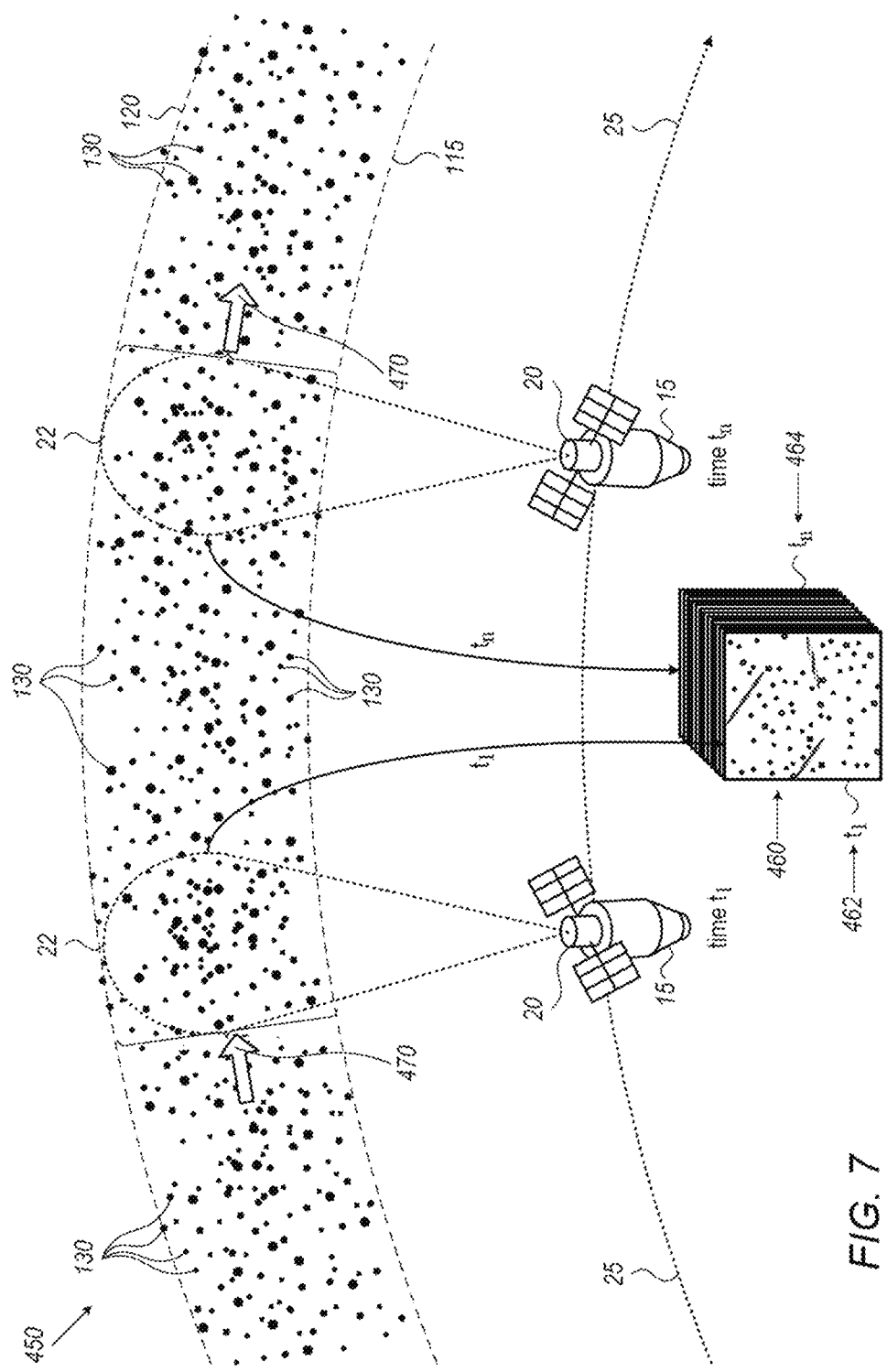

FIG. 7 is schematic diagram of the at least one imaging device 20 on the satellite 15 generating a plurality of images of RSOs 130 in accordance with one or more embodiments of the present disclosure. As the at least one imaging device 20 acquires an image of the sky at predefined acquisition time intervals, image data within the FOV 22 may be acquired as the satellite moves in the orbital plane 25 at a time $t_1$ to time $t_n$ where n is any integer, and $t_n$-$t_{n1}$ is the predefined acquisition time intervals such as for example, but not limited to 1 second or one frame per second.

In some embodiments, a single satellite such as the satellite 15 in the orbital plane may acquire a plurality of images 460. For example, an image 462 from the at least one imaging device 20 of the satellite 20 may be acquired at a position along the orbital plane 25 at time $t1_1$ and similarly an image 464 from the at least one imaging device 20 of the satellite 20 may be acquired at a position along the orbital plane 25 at time $t_n$. In effect, the FOV 22 sweeps in an arc as the satellite 15 moves in the orbital plane 25 and generates a plurality of images of celestial image features of orbiting RSOs 130 within the FOV 22 from the LEO orbital region 115 to the GEO orbital region 120 as shown in FIG. 7. Thus, the FOV 22 may collect celestial image features representative of RSOs 130 within a three-dimensional imaging volume 470 in space (shown as a two-dimensional projection in FIG. 7) generated by the FOV 22 as it moves in a circle along the orbital plane 25, and images of RSOs located between but not limited to the concentric circles bounded from the beginning of the LEO orbital region 115 to the end of the GEO orbital region 120 within that volume. Note that a portion of the three-dimensional imaging volume 470 is shown in FIG. 7 between times $t_1$ and $t_n$. However, the three-dimensional imaging volume 470 will be concentric-like in shape once a full orbit is complete.

In some embodiments, the at least one imaging device 20 may also capture other celestial bodies outside these concentric circles such as planets and/or stars (not shown in FIG. 7).

In some embodiments, the frame-to-frame feature coverage and degree of overlap in the captured celestial image features between images taken at $t_n$ and $t_{n-1}$ may be used in determining the optimal predefined acquisition time intervals. Conversely, the predefined acquisition time interval may determine the desired frame-to-frame feature coverage.

As a non-limiting example, suppose a 90% overlap of celestial image features taken between successive images at time $t_n$ and time $t_{n-1}$ is desired, 90% of the celestial image features from the image frame at time $t_n$ will appear in the image frame at time $t_{n-1}$. Stated differently, 90% of the same celestial image features may be observed between images taken at $t_n$ and $t_{n-1}$ in addition to any new captured celestial image features.

Thus, for the case as shown in FIG. 7, a single satellite 15 may generate image data for the plurality of images 460 with a predefined acquisition time interval. The image data for the plurality of images may be stored, for example, in the image database 40. However, the RSOs, each in its own orbit about the Earth that may be captured in the plurality of images 460 may be limited to the three-dimensional imaging volume 470 in space depending on the area of the FOV 22.

Furthermore, in addition to the satellite in motion along the orbital plane 25, each of the RSOs 130 may also be in orbit in its own orbital plane that is not typically contiguous with the orbital plane 25 of the imaging satellite. Accordingly, the FOV 22 may capture a few images of a particular RSO as a streak cutting across the three-dimensional imaging volume 470 in the few images when the particular RSO cuts into the three-dimensional imaging volume 470 instantaneously in the time that the at least one imaging device 20 on the satellite 15 acquires the image of the particular RSO. These effects are mitigated when increasing the imaging coverage of the RSO to include the entire sky.

In some embodiments, increasing the imaging coverage of RSOs to cover a larger portion of the entire sky (e.g., where the entire sky may refer to all values of RA and DEC) may be done by: (1) increasing the size of the FOV 22, (2) more satellites on the same orbital plane will increase the celestial image features of the RSOs but over the same three-dimensional imaging volume 470, and/or (3) increasing the number of satellites over a plurality of orbital planes, each orbital plane with its unique three-dimensional imaging volume 470.

Figure 8:
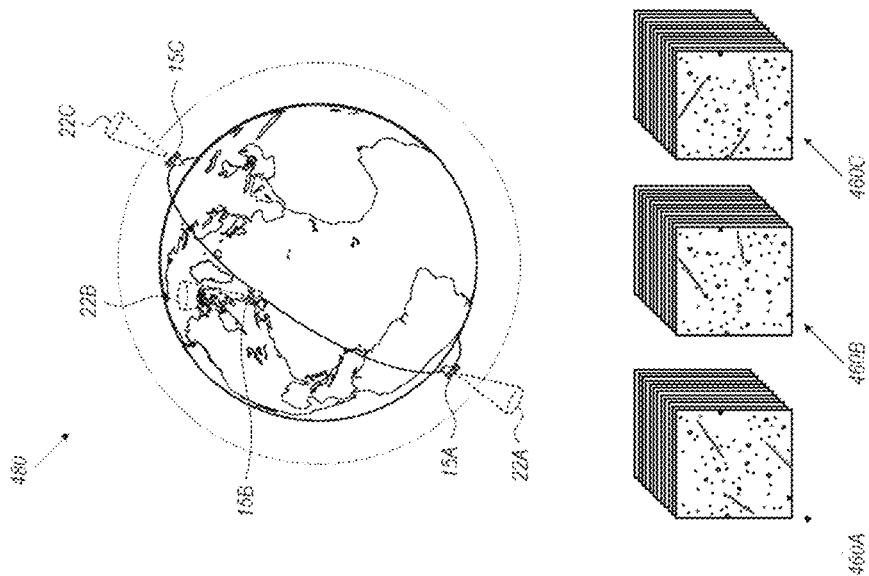

FIG. 8 is schematic diagram of three imaging devices on three satellites 15A, 15B, and 15C respectively generating a plurality of images 460A, 460B, and 460C in accordance with one or more embodiments of the present disclosure. Note that the three satellites 15A, 15B, and 15C may be along the same orbital plane 25. But as the RSOs move across the three-dimensional imaging volume 470 at different times, the image data from the plurality of images 460A, 460B, and 460C will capture the same space but at different times. Thus, a different set of RSOs from the plurality of RSOs 130 may be captured at the different times.

In some embodiments, extending the exemplary embodiments shown in FIG. 8 which shows imaging devices with three fields of view 22A, 22B, and 22C on three satellites on one orbital plane to a plurality of satellites on a plurality of orbital planes such as shown in FIGS. 2A and 2B will provide a coverage of RSOs for imaging in a portion of the entire sky. Stated differently, a plurality of three-dimensional imaging volumes (e.g., three-dimensional imaging volume 470 from a single satellite) from the plurality of satellites may merge together to provide more images of a larger portion of the sky in which the RSOs may be expected to be present.

In some embodiments, a particular mission sequence may be targeted to acquire image data with a desired coverage of RSOs in various orbit types about the Earth anywhere within the LEO orbital region to cislunar regions. Since the RSOs travel in different orbits and may be located in different places in at different times in space in those different orbits, a few imaging cameras on a few satellites may achieve the desired coverage to capture the RSOs over a long period of time, or a larger number of satellites orbiting the Earth in various orbital planes may be used to achieve coverage of the RSOs in a shorter period of time (e.g., shorter temporal coverage). Eventually, a particular RSO will cross the coverage span of a particular satellite constellation.

Stated differently using a non-limiting example, in some embodiments, for a predetermined number of RSOs to be captured, three satellites in one orbital plane may take much longer time to image the predetermined number of RSOs than 24 satellites in eight orbital planes, for example. The latter constellation of 24 satellites has a shorter temporal coverage than the three-satellite constellation. In other embodiments, the eight orbital planes for the non-limiting example may be respectively oriented to each other at two hours in clock angle hours, for example.

In some embodiments, each orbital plane may deliver high fidelity space situational awareness information services to a plurality of customers and/or users. The satellite constellation on a single orbital plane may have failure redundancy since if one satellite fails, there are still other functioning satellites on the same orbital plane to cover the same three-dimensional imaging volume.

In some embodiments, subscription services may be provided to the plurality of customers and/or users to provide a continuous mapping and monitoring in space such as for example, but not limited to LEO to GEO monitoring.

In some embodiments, each satellite may include a broadband optical payload in that the plurality of sensors may be configured to not only operate in visible light frequencies but also in infrared frequencies to detect RSOs particularly when the at least one imaging device 20 may be on an orbital plane where part of the orbit may be pointing to the sun 105.

In some embodiments, the plurality of sensors and/or the optical frontend circuitry may be configured to handle multiple frequency ranges for optimizing RSO detection.

Figure 9:
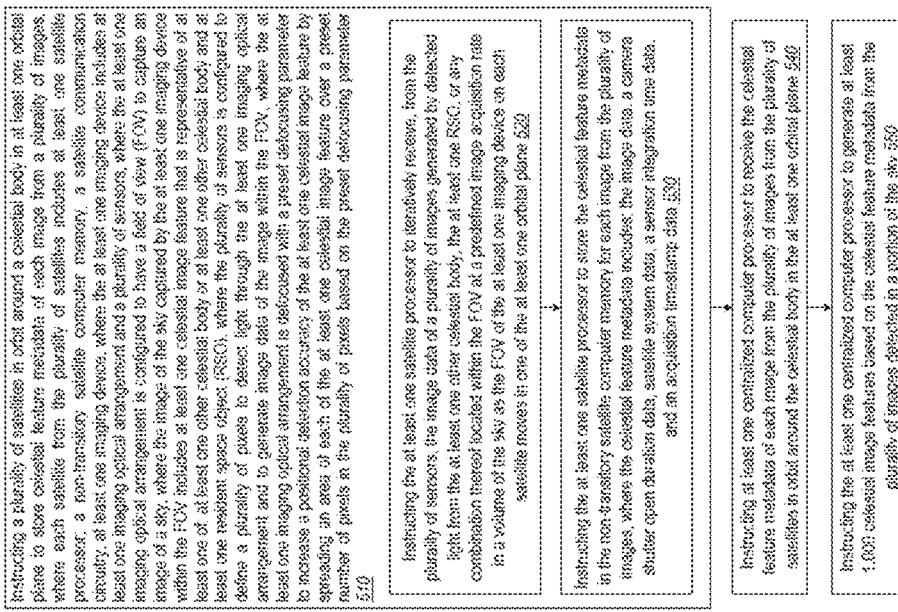

FIG. 9 is a flowchart of an illustrative, non-limiting computer-based method 500 for generating a plurality of celestial image features from a plurality of images of a sky in accordance with one or more embodiments of the present disclosure. The method 500 may be performed by the at least one satellite processor 30 of the satellite 15 and/or by the processor 70 of the centralized computer 70. Both of these processing unit may work separately or in tandem to use the image data collected by the plurality of satellites 15 and to generate an image map of celestial features by the celestial image feature generator 79.

The method 500 may include instructing 510 instructing a plurality of satellites in orbit around a celestial body in at least one orbital plane to store celestial feature metadata of each image from a plurality of images, where each satellite from the plurality of satellites includes at least one satellite processor; a non-transitory satellite computer memory, a satellite communication circuitry, at least one imaging device, where the at least one imaging device includes at least one imaging optical arrangement and a plurality of sensors, where the at least one imaging optical arrangement is configured to have a field of view (FOV) to capture an image of a sky, where the image of the sky captured by the at least one imaging device within the FOV includes at least one celestial image feature that is representative of at least one of: at least one other celestial body or at least one other celestial body and at least one resident space object (RSO), where the plurality of sensors is configured to define a plurality of pixels to detect light through the at least one imaging optical arrangement and to generate image data of the image within the FOV, where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter.

The method 500 may include instructing 520 at least one satellite processor to iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane.

The method 500 may include instructing 530 the at least one satellite processor to store the celestial feature metadata in the non-transitory satellite computer memory for each image from the plurality of images, where the celestial feature metadata includes: the image data, a camera shutter open duration data, satellite system data, a sensor integration time data, and an acquisition timestamp data.

The method 500 may include instructing 540 at least one centralized computer processor to receive the celestial feature metadata of each image from the plurality of images from the plurality of satellites in orbit around the celestial body in the at least one orbital plane.

The method 500 may include instructing 550 the at least one centralized computer processor to generate at least 1,000 celestial image features based on the celestial feature metadata from the plurality of images detected in a portion of the sky.

Figure 10:
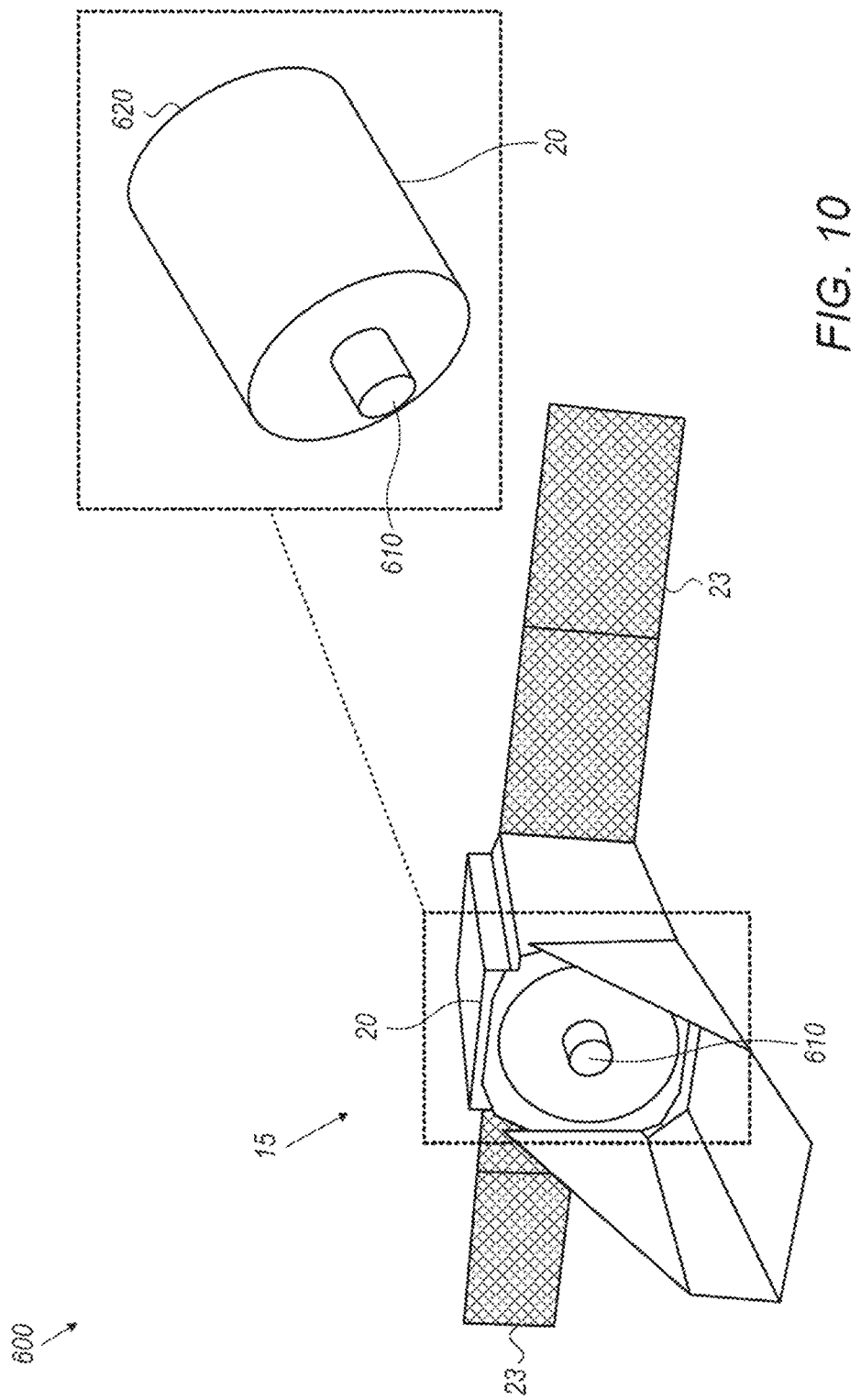

FIG. 10 is a diagram 600 of an exemplary satellite 15 in accordance with one or more embodiments of the present disclosure. The satellite 15 may have at least one deployable baffle, at least one low light visible (VIS) optical system and/or at least one near infrared (NIR) optical system and at least one high bandwidth Ku band downlink (e.g., the communication circuitry 50). In other embodiments, the communication circuitry 50 may be bidirectional with downlink and uplink.

In some embodiments, the ground network and spacecraft operation may be managed by a single operational system with numerous ground stations worldwide and a cloud-based operation deployment.

In some embodiments, the satellite 15 may include, for example, at least one imaging device 20 (e.g., the payload) may include the at least one sensors and control circuitry 52 in a sensor head 610 and at least one optical front-end circuitry 620 (e.g., the communication circuitry 50 and/or imaging device interface 54).

In some embodiments, the satellite payload instrument may have a primary optical diameter of 235 mm, an instantaneous field of view (e.g., FOV 22) of 37.88 μrad, a pixel size between any of the sensors 310 (e.g., pixels) of 10 μm, and a sensor full well (e.g., no. of electrons per pixel) of 14000 e$^-$.

In some embodiments, the payload data downlink may be in the Ku-band frequency range.

In some embodiments, a satellite control system (SCS) implemented by the at least one satellite processor 30 and/or the at least one centralized computer processor 75 may control the attitude, orbit, and/or payload of a satellite. SCSs may ensure that satellites operate correctly and efficiently.

In some embodiments, SCSs typically may include but are not limited to the following components: (1) a plurality of positional sensors may be used to collect data about the satellite's attitude, orbit, and/or payload. This data may be used by the SCS to make decisions about how to control the satellite. (2) A plurality of actuators may be used to control the satellite's attitude, orbit, and/or payload. Actuators may typically include thrusters, reaction wheels, and/or magnetic torquers. (3) At least one computer (e.g., the at least one satellite processor 30 and/or the at least one centralized computer processor 75) for processing the data from the sensors and transmitting commands to the actuators.

In some embodiments, SCSs may be ground-based or on-board the satellite.

In some embodiments, ground based SCSs may communicate with satellites via radio waves or lasers.

In some embodiments, on-board SCSs may be more autonomous than ground based SCSs but may not need to rely on communication with the ground.

In some embodiments, the satellite may include a GNSS to facilitate the use of GNSS technology such as to track the position and velocity of a satellite. GNSS receivers are typically used on satellites for the following purposes for navigation. This may be used for satellites that need to maintain a specific position in space, such as communications satellites and Earth observation satellites.

In some embodiments, GNSS receivers may be used to synchronize the clocks on satellites. This is important for satellites to accurately communicate with each other, such as navigation satellites and remote sensing satellites. Furthermore, a camera clock implemented on imaging device 20, for example, generating a camera clock timestamp for each image may be correlated to a GNSS clock output on a GNSS satellite. In this manner, an accurate correlation between the GNSS clock (normally slower clock than the camera clock) and the camera clock (normally faster clock than GNSS clock) may be maintained.

In some embodiments, GNSS receivers may be used to determine the attitude of a satellite, which is its orientation in space. This may be used for satellites that need to point their instruments at specific targets, such as Earth observation satellites and scientific satellites.

In some embodiments, GNSS receivers on satellites may need to operate in a harsh environment and to provide very accurate positioning and timing information.

In some embodiments, GNSS receivers may typically be mounted on the outside of the satellite (such on a motorized gimbal) and may be pointed at the sky. This may allow the GNSS receiver to receive signals from all of the GNSS satellites that are in view. The GNSS receiver then uses these signals to calculate the satellite's position and velocity.

In some embodiments, any of the plurality of satellites 15 may include an onboard satellite propulsion system that may use thrusters to change the velocity and/or orientation of the satellite in space.

In some embodiments, propulsion systems may allow the satellite to maintain a specific orbit, maneuver to new orbits, and/or point their instruments at specific targets. In other embodiments, any of the plurality of satellites may include a chemical propulsion system and/or an electric propulsion system.

In some embodiments, chemical propulsion systems may use chemical reactions to produce thrust. Chemical propulsion systems may be more powerful than electric propulsion systems but may also be less efficient and have less propellant capacity.

In some embodiments, electric propulsion systems may use electricity to accelerate ions or plasma to produce thrust. Electric propulsion systems may be less powerful than chemical propulsion systems, but they may be more efficient and have more propellant capacity.

In some embodiments, the type of onboard satellite propulsion system that may be used depends on the specific needs of the satellite. For example, a satellite that may need to maintain a high-altitude orbit may likely use an electric propulsion system, since electric propulsion systems may be more efficient and have more propellant capacity. Conversely, a satellite that may need to perform rapid maneuvers may use a chemical propulsion system, since chemical propulsion systems are more powerful.

In some embodiments, different types of onboard satellite propulsion systems may include for example but not limited to chemical propulsion systems that use monopropellant systems and/or bipropellant systems.

In some embodiments, monopropellant systems may use a single propellant, such as hydrazine, to produce thrust. Monopropellant systems may be simple and reliable, but they are less efficient than other types of chemical propulsion systems. Bipropellant systems may use two propellants, such as hydrazine and nitrogen tetroxide, to produce thrust.

Bipropellant systems are more efficient than monopropellant systems, but they may be more complex and less reliable.

In some embodiments, electric propulsion systems may include electrothermal propulsion systems, electrostatic propulsion systems, and/or electromagnetic propulsion systems.

In some embodiments, electrothermal propulsion systems may use electricity to heat a propellant, which then expands through a nozzle to produce thrust. Electrothermal propulsion systems may be relatively simple and reliable, but they may also be less efficient than other types of electric propulsion systems.

In some embodiments, electrostatic propulsion systems may use electricity to accelerate ions to produce thrust. Electrostatic propulsion systems may be very efficient, but they may also be less powerful than other types of electric propulsion systems.

In some embodiments, electromagnetic propulsion systems may use electricity to accelerate plasma to produce thrust. Electromagnetic propulsion systems may be very powerful and efficient, but they may also be complex and expensive.

In some embodiments, any of the satellites from the plurality of satellites may include two main types of satellite power modules: solar power modules and nuclear power modules.

In some embodiments, solar power modules may use solar cells to convert sunlight into electricity. Solar power modules may be the most common type of power module used on satellites, as they are lightweight, reliable, and have a long lifespan.

In some embodiments, nuclear power modules may use nuclear reactors to generate electricity. Nuclear power modules may be used on satellites that require high levels of power, such as communications satellites and scientific satellites.

In some embodiments, solar power modules such as the solar panels 23 may be further divided into two types: rigid solar arrays and flexible solar arrays.

In some embodiments, rigid solar arrays may include rigid solar panels that are mounted on the satellite. Rigid solar arrays may typically be more efficient than flexible solar arrays, but they may also be heavier and less flexible.

In some embodiments, flexible solar arrays may include thin, flexible solar panels that may be mounted on the satellite in a variety of ways. Flexible solar arrays may be less efficient than rigid solar arrays, but they may also be lighter and more flexible.

The system elements shown in FIGS. 1A and 1B disclosed herein may be implemented in software or firmware or a combination of them or as instructions stored on a machine-readable medium, which may be read and executed by one or more processors such as any of the plurality of satellite processors 30 and/or the at least one centralized computer processor 75. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth (e.g., any of the plurality of satellite processors 30 and/or the at least one centralized computer processor 75). In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.). This may be implemented by any of the software modules to perform the functions disclosed herein and executed by any of the plurality of satellite processors 30 and/or the at least one centralized computer processor 75.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19)

JavaFX Mobile; (20) Microsoft DirectX; (21).NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure such as for example the image data of from the plurality of images 460 may be configured to securely store and/or transmit data (such as the acquired image data 45A) by utilizing one or more of encryption techniques (e.g., private/public key pair, lossless encryption, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). Thus, the image data collected from any of the plurality of satellites 15 may be encrypted and transmitted to the centralized computer 70 such as the ground base station and decrypted by the at least one processor 75.

In some embodiments, the raw image data may be encrypted by any of the plurality of satellite processors and decrypted by the at least one centralized computer processor 75.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications for implementing the functions of the system for generating an image map of a plurality of resident space objects in orbit around a celestial body as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

In some embodiments, exemplary inventive computer-based systems/platforms, exemplary inventive computer-based devices, and/or exemplary inventive computer-based components of the present disclosure may be configured to handle numerous concurrent users or customer subscribers that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, at least one database of exemplary databases 40 and 85 may be any type of database, including a database managed by a database management system (DBMS). In some embodiments, an exemplary DBMS-managed database may be specifically programmed as an engine that controls organization, storage, management, and/or retrieval of data in the respective database for implementing the functions of the system for generating an image map of a plurality of resident space objects in orbit around a celestial body. In some embodiments, the exemplary DBMS-managed database may be specifically programmed to provide the ability to query, backup and replicate, enforce rules, provide security, compute, perform change and access logging, and/or automate optimization for implementing the functions of the system for generating an image map of a plurality of resident space objects in orbit around a celestial body. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary inventive computer-based systems/platforms, the exemplary inventive computer-based devices, and/or the exemplary inventive computer-based components of the present disclosure may be specifically configured to operate in a cloud computing/ architecture such as, but not limiting to: infrastructure a service (IaaS), platform as a service (PaaS), and/or software as a service (SaaS).

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques for implementing the functions of the big data analytics, machine learning models and/or advanced algorithms (e.g., the celestial image feature generator 79 and/or related algorithms) that may be applied to the acquired image data in the celestial image feature mapping chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
 i) Define Neural Network architecture/model,
 ii) Transfer the input data to the exemplary neural network model,
 iii) Train the exemplary model incrementally,
 iv) determine the accuracy for a specific number of timesteps,
 v) apply the exemplary trained model to process the newly received input data,
 vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a system may include a plurality of satellites in orbit around a celestial body in at least one orbital plane. Each satellite from the plurality of satellites may include: at least one satellite processor; a non-transitory satellite computer memory; a satellite communication circuitry; at least one imaging device including: at least one imaging optical arrangement and a plurality of sensors; where the at least one imaging optical arrangement may be configured to have a field of view (FOV) to capture an image of a sky; where the image of the sky captured by the at least one imaging device within the FOV may include: at least one celestial image feature that is representative of at least one of: at least one other celestial body or at least one other celestial body and at least one resident space object (RSO); where the plurality of sensors may be configured to define a plurality of pixels to detect light through the at least one imaging optical arrangement and to generate image data of the image within the FOV; where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter; where the at least one satellite processor may be configured to: iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane; store celestial feature metadata in the non-transitory satellite computer memory for each image from the plurality of images; where the celestial feature metadata may include: the image data, a camera shutter open duration data, satellite system data, a sensor integration time data, and an acquisition timestamp data; and a central computing processing system that may include at least one centralized computing processor of at least one centralized computer; where the at least one centralized computing processor may be configured to: receive the celestial feature metadata of each image from the plurality of images from the plurality of satellites in orbit around the celestial body in the at least one orbital plane; and generate at least 1,000 celestial image features based on the celestial feature metadata from the plurality of images detected in a portion of the sky.

In some embodiments, the at least one celestial image feature may include at least one streak representative of the at least one other celestial body, the at least one resident space object (RSO) or any combination thereof.

In some embodiments, a length of the at least one streak may be based on a velocity of the at least one other celestial body, the at least one resident space object (RSO) or any combination thereof.

In some embodiments, an optical axis of the FOV may be positioned to point into space at a predefined pointing angle with respect to a tangential component of a satellite orbital velocity of each satellite. (e.g., angle α, angle β, and angle γ as shown in FIG. 2A)

In some embodiments, the at least one centralized computing processor may be configured to generate a catalog of the at least 1,000 celestial image features.

In some embodiments, the at least one centralized computing processor may be configured to generate an image map of the at least 1,000 celestial image features.

In some embodiments, each satellite from the plurality of satellites may further include an imaging device optics control circuitry for controlling for controlling the at least one imaging optical arrangement of the at least one imaging device, and an imaging device interface circuitry for receiving image data from the at least one imaging device.

In some embodiments, the at least one orbital plane may include at least one sun-synchronous orbital plane.

In some embodiments, the at least one centralized computer may be a base station computer.

In some embodiments, the celestial body may be Earth.

In some embodiments, the at least one centralized computing processor of the at least one centralized computer may include at least one particular satellite processor from the plurality of satellites.

In some embodiments, the at least one satellite processor may be configured to apply at least one sensor calibration parameter to the plurality of sensors.

In some embodiments, a method may include instructing a plurality of satellites in orbit around a celestial body in at least one orbital plane to store celestial feature metadata of each image from a plurality of images; where each satellite from the plurality of satellites may include: at least one satellite processor; a non-transitory satellite computer memory; a satellite communication circuitry; at least one imaging device including: at least one imaging optical arrangement and a plurality of sensors; where the at least one imaging optical arrangement may be configured to have a field of view (FOV) to capture an image of a sky; where the image of the sky captured by the at least one imaging device within the FOV may include: at least one celestial image feature that is representative of at least one of: at least one other celestial body or at least one other celestial body and at least one resident space object (RSO); where the plurality of sensors may be configured to define a plurality of pixels to detect light through the at least one imaging optical arrangement and to generate image data of the image within the FOV; where the at least one imaging optical arrangement is defocused with a preset defocusing parameter to increase a positional detection accuracy of the at least one celestial image feature by spreading an area of each of the at least one celestial image feature over a preset number of pixels in the plurality of pixels based on the preset defocusing parameter; instructing the at least one satellite processor to iteratively receive, from the plurality of sensors, the image data of a plurality of images generated by detected light from the at least one other celestial body, the at least one RSO, or any combination thereof located within the FOV at a predefined image acquisition rate in a volume of the sky as the FOV of the at least one imaging device on each satellite moves in one of the at least one orbital plane; instructing the at least one satellite processor to store the celestial feature metadata in the non-transitory satellite computer memory for each image from the plurality of images; where the celestial feature metadata may include: the image data, a camera shutter open duration data, satellite system data, a sensor integration time data, and an acquisition timestamp data; instructing at least one centralized computer processor of at least one centralized computer to receive the celestial feature metadata of each image from the plurality of images from the plurality of satellites in orbit around the celestial body in the at least one orbital plane; and instructing the at least one centralized computer processor to generate at least 1,000 celestial image features based on the celestial feature metadata from the plurality of images detected in a portion of the sky.

In some embodiments, the at least one celestial image feature may include at least one streak representative of the at least one other celestial body, the at least one resident space object (RSO) or any combination thereof.

In some embodiments, a length of the at least one streak may be based on a velocity of the at least one other celestial body, the at least one resident space object (RSO) or any combination thereof.

In some embodiments, an optical axis of the FOV may be positioned to point into space at a predefined pointing angle with respect to a tangential component of a satellite orbital velocity of each satellite. (e.g., angle α, angle β, and angle γ as shown in FIG. 2A)

In some embodiments, the method may include instructing the at least one centralized computing processor to generate a catalog of the at least 1,000 celestial image features.

In some embodiments, the method may include instructing the at least one centralized computing processor to generate an image map of the at least 1,000 celestial image features.

In some embodiments, the method may further include: instructing the at least one satellite processor to control through an imaging device optics control circuitry, the at least one imaging optical arrangement of the at least one imaging device; and instructing the at least one satellite processor to receive through an imaging device interface circuitry, image data from the at least one imaging device.

In some embodiments, the at least one orbital plane may include at least one sun-synchronous orbital plane.

In some embodiments, the at least one centralized computer may be a base station computer.

In some embodiments, the celestial body may be Earth.

In some embodiments, the at least one centralized computing processor of the at least one centralized computer may include at least one particular satellite processor from the plurality of satellites.

In some embodiments, the at least one satellite processor may be configured to apply at least one sensor calibration parameter to the plurality of sensors.

In some embodiments, the method may further include instructing the at least one satellite processor to apply at least one sensor calibration parameter to the plurality of sensors.

Figure 11:
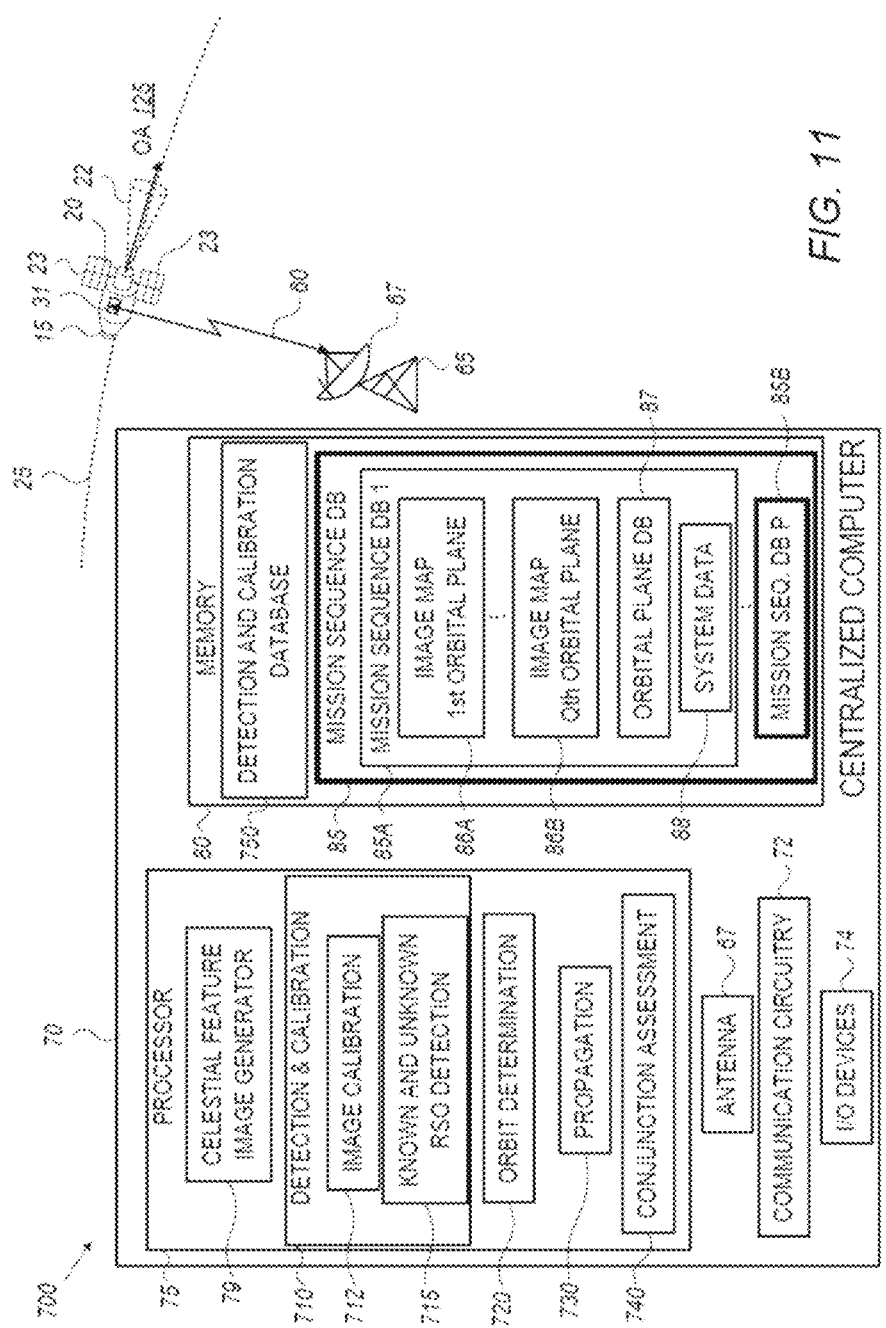

FIG. 11 is a schematic diagram of a system 700 for calibrating spacecraft captured images and detecting resident space objects in accordance with one or more embodiments of the present disclosure. The system 700 may include a centralized computer 70 configured to communicate 60 with any of at least one imaging camera 20 coupled to a plurality of satellites 15. A plurality of cameras may travel on a plurality of orbital planes 25. Each satellite 15 may include at least one imaging camera 20 from the plurality of imaging cameras 20 with a field of view (FOV) 22 with an optical axis (OA) 125 oriented in the middle of the FOV 22 pointing into the sky (e.g., outer space). The optical axis 125 may be configured to point into outer space at any given angle relative to the orbital velocity of the satellite. Each satellite may be powered, for example, by solar panels 23. Note that the elements shown in FIG. 11 are substantially the same as in FIG. 1 described hereinabove. However, FIG. 11 illustrates that the processor 70 may be configured to implement a number of processing data pipelines by executing by software modules as described herein below for processing the plurality of images acquired by the imaging camera coupled to the plurality of satellites.

In some embodiments, the at least one centralized computing processor 75 may execute a number of software modules such as the celestial feature image generator 71 (from FIG. 1), a detection and calibration module 710, an orbit determination module 720, a propagation module 730, and a conjunction assessment module 740 all of which will be discussed at length hereinbelow. Note that the top-level modules, such as the detection and calibration module 710 as shown in FIG. 11, may internally process data though a number of sub-modules and/or data pipelines that will be shown in later figures hereinbelow.

In some embodiments, the detection and calibration module 710 may include two sub-modules: an image calibration sub-module 712 and a known and unknown RSO detection sub-module 715. The image calibration sub-module 712 may be configured to calibrate the captured images of resident space objects to correct for sensor and/or optical impairments. The image calibration sub-module 712 may be based on pixel array (e.g., pixel-by-pixel) processing by applying a radiometric calibration scheme to transform the pixel array values to remove the optical and/or sensor impairments. Input data inputted to and/or outputted from the detection and calibration module 710 may be stored in a detection and calibration database 750 in the at least one non-transitory memory 80.

In some embodiments, the known and unknown RSO detection sub-module 715 may detect RSO from image features of objects such as streaks in the image data of the plurality of images using first set of algorithms (e.g., a first data processing pipeline) if the streaks are for known RSOs and a second set of algorithms (e.g., a second data processing pipeline) if the streaks are unknown.

Figure 12A:
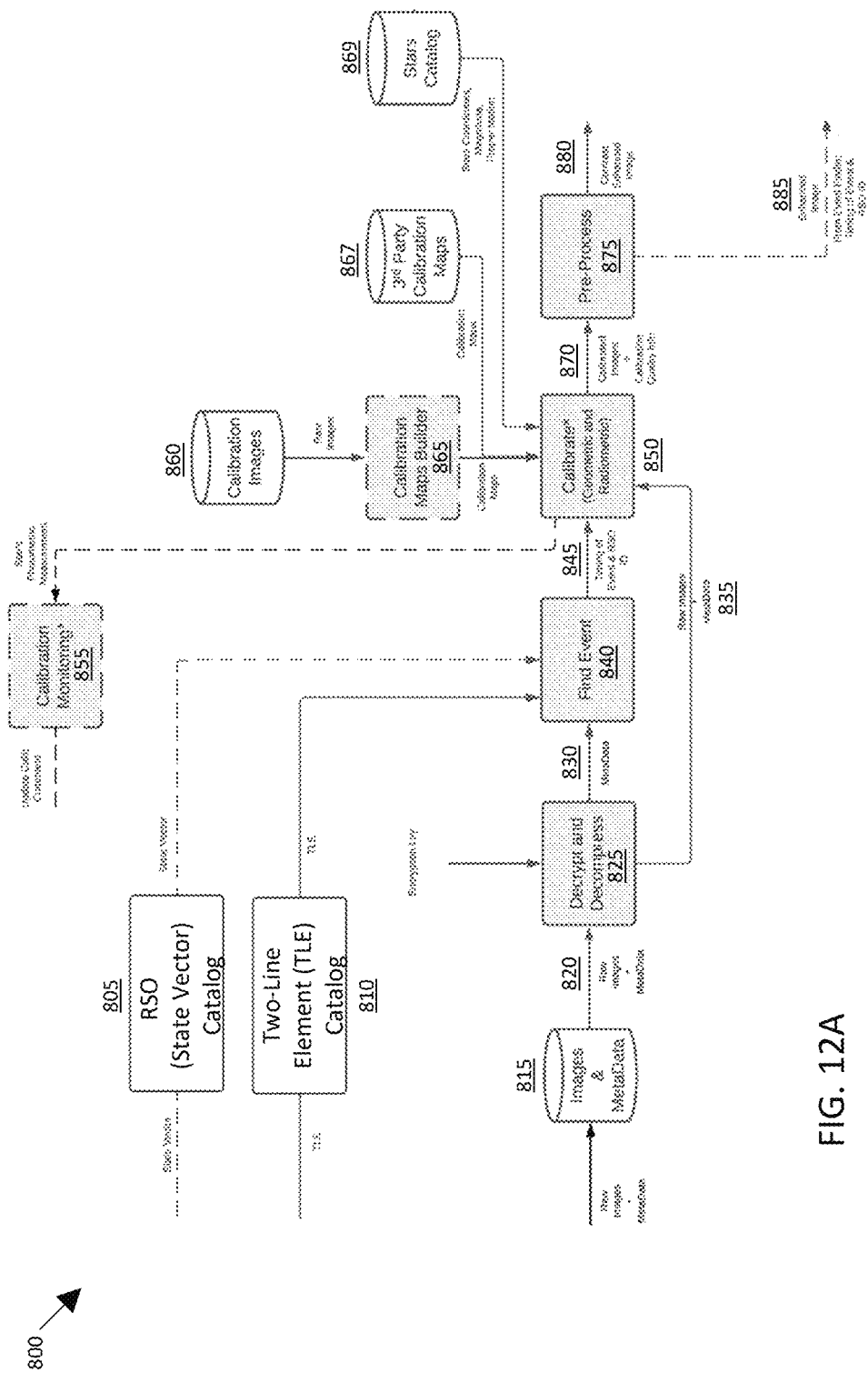
Figure 12B:
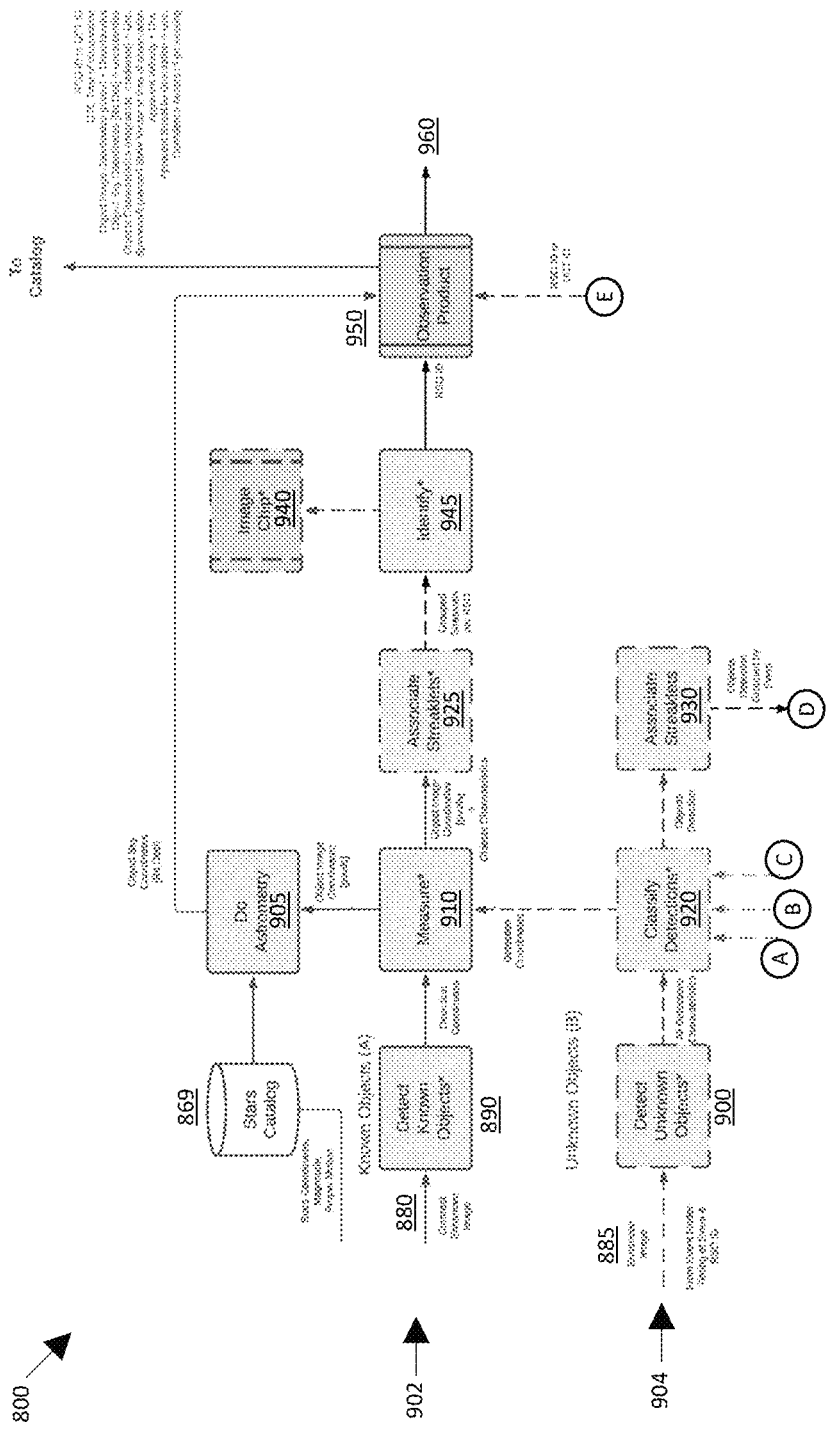
Figure 12C:
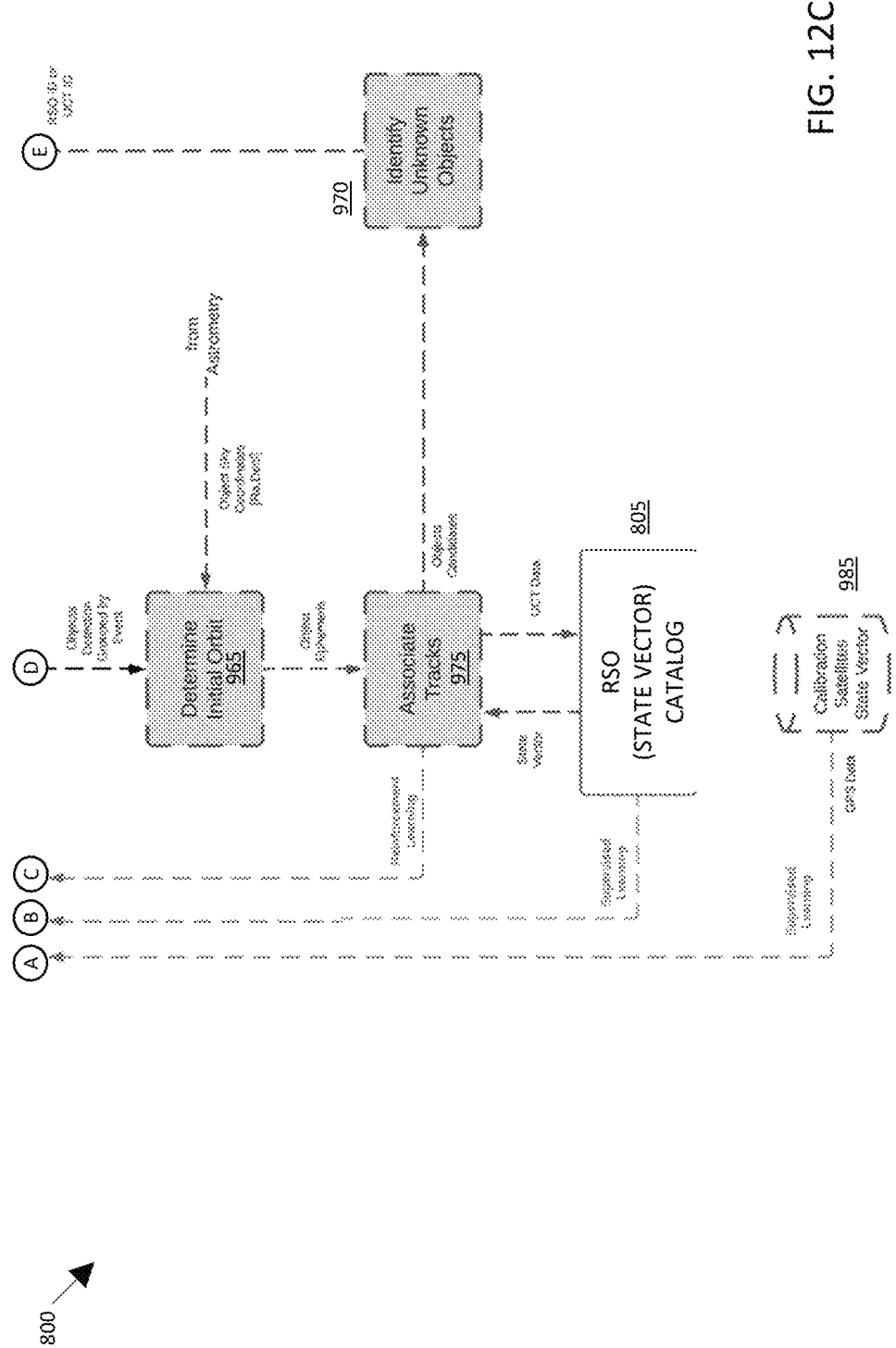

FIGS. 12A-12C are block diagrams of an image processing pipeline 800 for detecting and identifying image features of objects in a plurality of images in accordance with one or more embodiments of the present disclosure. The plurality of images from the mission sequence as described hereinabove may be generated in the at least one imaging camera 20 coupled to the plurality of satellites 15 and transmitted to the centralized computer 70 for processing.

In some embodiments, the image processing pipeline 800, e.g., implanted via the detection and calibration module 710, may begin with the ingestion of a plurality of raw images 815 into a detection pipeline. The raw images may be decrypted and/or decompressed 820 so as to produce image data and/or associated metadata from the raw image data. The decrypted and/or decompressed metadata 830 may be input to a find events function 840 to find events, which are potential object detections, in the celestial image features in any of the plurality of images using the metadata 830, state vectors of RSOs in an RSO catalog 805 (e.g., repository), and/or two-line elements (TLE) of RSOs from a TLE catalog 810 (e.g., for predicting orbital tracks). The find events function 840 may provide information as to what should be detected in the image based on the location and the time that the image was acquired in the imaged region of the sky with known coordinates. The output of the find events function 840 is a timing of any identified events and/or an RSO ID 845, which may be a unique identification tag assigned to every event. Candidate expected RSOs may be derived from the propagation of the RSO data (e.g., state vector data of RSOs) in the RSO catalog 805 on an area slightly larger (e.g., 4 times larger) than the FOV 22 of the camera for each sensor. The RSO catalog data may provide state vectors at the time of the image acquisition for all of the known objects stored in the RSO catalog.

In some embodiments, images and a priori (known object) data may be stored in a database such as the detection and calibration database 750. "A priori" information may include the object's orbit solution (state vector) along with the object's photometric and dynamic characteristics for performing an initial detection.

In some embodiments, the decrypted and/or decompressed raw image and metadata 835, the timing of any identified events and/or the RSO ID 845, calibration maps generated by a calibration map builder sub-function 865, calibration maps received from a $3^{rd}$ Party calibration maps database, and/or a plurality of star coordinates, magnitude and proper motion from a stars catalog 869 may be input to a calibration function 850 that may include the image calibration sub-module 712 as shown in FIG. 11. In other embodiments, the calibration function 850 may output star photometric measurements to a calibration monitoring function 855 that may relay the updated calibration commands to an asset trend analysis module (not shown in FIG. 12A). In yet other embodiments, a list of the events in the image, with their RSO ID tags, times, position and shape, along with raw images and metadata may be inputted into the calibration function 850, which may generate calibrated images and calibration quality information.

Note that the calibration quality information may refer to the information determined through the different aspects of the calibration flow as is further defined hereinbelow. These aspects may include but are not limited to: 1) a continuous monitoring of pixel-wise equalization through the complete image (i.e., a measure of the calibrated images uniformity by analyzing the residuals of the star fits), (2) a continuous monitoring of radiometric calibration through the complete image by validating the expected light intensity received from selected stars, 3) a continuous monitoring of the camera Point-Spread Function (PSF) through the complete image by tracking the star light spatial distribution obtained from each star fit, and/or 4) a continuous monitoring of the camera distortion through the complete image by tracking the exact star location on the image sensor plane from each star fit.

In some embodiments, a calibration image database 860 may store raw image data that may be inputted to the calibration map builder function 865, which may be configured to generate at least one calibration map to be applied to pixel values in the sensor pixel array to calibrate for various image camera and/or optic impairments as discussed hereinbelow.

In some embodiments, calibration maps for specific sensors to basically correct every single pixel in the image data from an image so as to remove as much of the sensor artifact introduced when capturing the raw image. The pixel values in the pixel array of a particular image may be digital levels such as digital count levels. The output of the calibration module may be every single pixel is fixed and corrected for each of the sensor and/or optic impairments in the associated image camera. Each pixel value in the calibrated image may no longer be associated with a digital level but a photonic irradiance value (e.g., in units of photons per second per square meter) for each pixel in the sensor array.

In some embodiments, the calibration function 850 may generate calibrated images 870 from the decrypted and/or decompressed raw image and metadata 835. The calibrated images 170 and/or the calibration quality information may be input into a pre-processing function 875 which may be configured to output contrast-enhanced images 880 and/or enhanced images 885 applying the event timing and/or RSO ID from the find events module (e.g., find events function 840). Background removal and/or artifact correction may be performed in addition to star pattern matching.

In some embodiments, once the plurality of images with raw image data is received by centralized computer 70, calibration images may be used to generate calibration maps to convert the raw image data to calibrated image data as discussed hereinbelow. The image data may have noise and/or artifacts estimated prior to preprocessing. For example, the calibration module may remove geometric and radiometry impairments respectively from the telescope (optics) and the sensors. In the radiometric portion of the calibration, the raw pixel values may be corrected to include the pixel brightness so as to cancel out the sensor impairments. Stated differently, the calibration may cancel the instrument impairments so as to effectively place the reference plane of the image at the entrance of the telescope.

In some embodiments, since it may not be known whether the candidate RSO's may be registered in the RSO catalog 805, and because a particular image may include both known and/or unknown RSOs, each image may be processed by the pre-processing function 875 into two forms: a contrast-enhanced image 880 and an enhanced image 885. The contrast-enhanced image 880 may be used for detecting known objects due to the higher sensitivity needed to better observe object characteristics and improve the correlation to known objects in the RSO catalog. The extracted events may match all possible a priori events that may be in the image. In other embodiments, the enhanced image 885 (e.g., without higher contrast) may be used to in unknown object processing thread as discussed below.

Note that the enhanced image data in the enhanced image 885 may refer to image data that has been processed with image enhancement techniques that may include, but are not limited to brightness adjustment, contrast adjustment, sharpness adjustment, color correction adjustment, noise reduction, removing artifacts, and/or filling in missing parts of an image. The contrast-enhanced image data in the contrast-enhanced image 880 may refer to image data that has been processed with the image enhancement techniques stated above as well as contrast enhancement by increasing, for example, the difference in brightness or color between different parts of the image.

Note that the contrast-enhanced images 880 and/or enhanced images 885 may also be referred to contrast-enhanced image data replica 880 and/or enhanced image data replica 885 of a calibrated image outputted from the calibration function 850 since they may be copies or replicas of the calibrated image data-a first image data replica with image enhancement and a second image replica with image enhancement and contrast adjustment. The contrast-enhanced image data replica may be inputted into a known object processing pipeline 902 and the enhanced image data replica may be inputted into an unknown object processing pipeline 904, e.g., implemented by the known and unknown RSO detection sub-module 715.

In some embodiments, the Known Object Processing pipeline 902, or thread may begin with the contrast-enhanced images 880 inputted into a Detect Known Objects function 890. The Known Object Processing pipeline 902 may be dedicated to the detection of known objects that may use the known object characteristic to better distinguish targets from the image background. This extra information may facilitate a higher sensitivity in the detection process while minimizing a false-positive rate. Thus, the results may be a more reliable and accurate performance in the detection of known objects. Only contrast-enhanced images 880 may be used in the Detect Known Objects function 890. The known objects a priori information may be used to detect the expected objects in the image. A match filter algorithm may be applied to correlate the object feature characteristics with data in the image so as to detect that particular known object in the image. This may improve detection with minimal false positives.

In some embodiments, for the known RSO detection pipeline, the input of this pipeline may be image data with a pattern of stars in the image and two functions to be able to determine the RADEC, and the angle and magnitude from the image data. The processor 75 may use a priori information with state pictures and may be projected on to the image frame so as to identify a shape in length and direction of what an object may look like in an image by applying a match filter. Thus, an image detection outputs a measurement, angular measurements, right ascension declination which is the observable that this function generates, which is an orbital position, also referred to herein as a state vector.

In some embodiments, the RSO state vectors for the RSOs in the field of view (e.g., the FOV 22) and/or vicinity of the field of view may be derived, since there is no accurate information as to where an RSO may be at any time T, in the field of view but also in the regions surrounding the field of view, there may be all kinds of shapes in the image that the system may be trying to identify that could be in the image. A match filter will be applied to these shapes.

In some embodiments, a match filter may be used to determine how an object should appear. In a large field of view, characteristics of the imaging device 20 may be distorted where an object appears at another place in the FOV 22 to detect that object being searched for by the algorithm, and it may not be at the expected location due to this impairment. Hence the detection algorithms may not rely on the exact position of the object, but more how as to how it appears. Thus, the detection mechanism may be tailored to the Concept of Operations (CONOPS) in the system of FIG. 11.

In some embodiments, the matching filter for the images as used herein may refer to various techniques used in image processing to find similarities between two images. The matching filter may operate by comparing specific features or patterns within the images to identify potential matches. Some common types of image matching filters may include a template matching filter, a feature matching filter, a phase-only matched filter, and/or a convolutional neural network. The template matching filter may directly compare a smaller "template" image with specific features to a larger target image, searching for the best fit (highest correlation) across different positions and orientations. The feature matching filter may extract distinctive features like edges, corners, or keypoints from both images and then finds corresponding pairs between them. Algorithms like SIFT (Scale-Invariant Feature Transform) and SURF (Speeded Up Robust Features) may fall under this category. The phase-only matched filter may utilize a Fourier transform to compare the phase information of both images instead of pixel values. It may be useful for noisy images. The convolutional neural network (CNN) may be trained to identify patterns and features directly from large image data sets.

In some embodiments, the known RSO detection pipeline may convert the image using the match filtering such that same shapes appear in the plurality of images may appear with very bright contrast and all other regions of the images may be faded down. So the a priori information for the known object may minimize the false positive because only object (e.g., the celestial image features indicative of RSOs). The match filtering may minimize the false detection in detecting features with very low SNR so as to prevent false positives.

In some embodiments, in using the stars to identify RSO streaks, the result of the match filter as applied to the image as the RSOs may result in an image where the residual stars may be filtered leaving only the brighter RSO streaks.

In some embodiments, the match filter may also detect other objects in the vicinity of a known RSO. For example, a spy satellite within the vicinity of a known RSO may also be captured because it may have substantially a same geometrical shape as the known RSO.

In some embodiments, once the detection may be performed, the detected RSOs may be measured with an identification of all the pixels of interest in the image data. The processor 75 may measure a characteristic of a small region around that streak of interest, which may be the integrated signal. This may typically be the spatial midpoint of the streak. However, a temporal midpoint of the streak may represent the temporal midpoint in the adjacent images from the plurality of images taken about every second. Typically, the spatial midpoint may match the temporal midpoint so the actual temporal midpoint may be extracted. The streak shape, streak length, orientation and direction in the image as well as other dynamic behavioral metrics of streaks may be extracted from the streak measurement in the image. For example, the orientation may be related to the orbital parameters as well as the brightness and the position.

In some embodiments, the Known Object Processing pipeline 902 may need a low false positive for use of the corrected image data in a machine learning algorithm for unknown detection. Thus, any false positives in the training data to train the machine learning model may amplify the false positive rate in the machine learning model output. So, the known processing chain detection and measurement process may be implemented mainly for lowering the false positive rate when the machine learning model may be used ultimately for unknown RSO detection.

FIGS. 13A and 13B are exemplary images 1000 for detecting known RSOs with different detection signal-to-noise ratios (SNR) in accordance with one or more embodiments of the present disclosure. FIG. 13A illustrates a detection of streaks 1010 with a detection SNR=1.73 and FIG. 13B illustrates a detection of streaks 1020 with a detection SNR=11, both images using match filter detection. The streaks may refer to image features related to RSOs. The streaks 1010 and 1020 may spread across several pixels lowering the SNR. The streak may have a spatial content that helps distinguish the streak from the noise when using match filter detection. The streak detection method as illustrated herein may be effective for an SNR>2. As shown in FIG. 13A, where the detection has an SNR=1.73, the streaks 1010 may visible but embedded in a noisy background. In in FIG. 13B, where the detection has an SNR=11, the streaks 1020 may be clearly visible and distinct from the background.

Note that the term streak and streaklets may be used interchangeably herein. Furthermore, detected streaks or streaklets of a particular RSO in successive images from the plurality of images may be used to generate a track (e.g., streaks associated with the particular RSO in successive images) that may be used for example in orbit detection pipelines, for example.

In some embodiments, an object that most closely matches the expected object characteristics may exhibit the highest contrast in the image, while the background is suppressed. This may improve the detection signal-to-noise ratio (SNR) when compared to the original SNR of the incoming raw image. The detection SNR may also be determined to assess the quality of the detection. Applying the match filter application to the contrast-enhanced images 880, the initial image object's characteristics may be extracted: intensity, position of the center of the streaklet, orientation, and other parameters. These may be used to speed-up the processing.

In some embodiments, with reference to FIG. 12B, the Known Object Processing pipeline may include the steps of detection coordinates being forwarded to Measurement routines and/or algorithms in a measurement function 910. The measurement algorithms may calculate the object image coordinates in pixels where center-finding algorithms may be executed to identify the centroid of each streak. The identified centroids of the streaks may be used to define the 2D detection coordinates of streaklet/event/RSO in the image plane. The center-finding algorithms may use initial information from the detection process to feed a least square curve fit algorithm to speed up the processing.

In some embodiments, the input of the measurement function 910 may be different pixel value of a region of interest in an image that is being measured against a theoretical model that may leverage the calibration function 850 using the point spread function (PSF) with a theoretical information as to how a streak would appear in a region of the image. For example, a streak of a particular size and shape in a particular location of the image might look slightly different if the same object with the same shape may be located at a corner of the image versus at a center of the image. So, the theoretical model may essentially match, as precisely as possible, the pixel values in the image data capturing these effects.

In some embodiments, the algorithms in the measurement function 910 may use the detection coordinates to calculate the object characteristics such as brightness, variability/rotation rate, relative apparent velocity, and/or streak orientation. The point spread function of the camera may be used to generate the kernels used in the least squared fit. The least square fit algorithm may determine the best parameters that will fit the measured data.

In some embodiments, the measurement function 910 may output the object image coordinates (camera coordinates) and the object characteristics to the Associate Streaklets function 925.

In some embodiments, the object image coordinates may be input into an Astrometry function 905. The Astrometry function 905 may compute the RA/DEC coordinates (sky coordinates) of the object. The uncertainties propagation may be an algorithm that determines the uncertainties in camera coordinates relative to sky coordinates.

In some embodiments, residuals from the fitting of the stars from the astrometry function 905 may also be generated and used as quality control by the calibration algorithm in the calibration function 850. This may provide a calibration quality control on each image and may validate the accuracy of the measurements of the RSO position. The logic in the Associate Streaklets function 945 may identify which streaklets may be grouped together as a single track. The grouped streaklets may be inputted to an Identify function 945.

In some embodiments, the identify pipeline implemented by the Identify function 945 may determine the RSO ID of a set of grouped streaklets. Passive system imagery may allow the object measurements to be decoupled from the sensor motion, leading to an efficient identification process that may minimize false identifications.

In some embodiments, the RSO ID may be fed into Observation Product function 950. Objects characteristics may be used to compare the measurements to a known RSO in the database. The object characteristics to be used for the identification may include: RSO photometry, streaklet orientation, RSO apparent angular velocity, RSO position, and inter-RSO relative positions. Temporal information, through the use of the grouped streaklets, may be used to compare the measured RSO to a known RSO in the database. Along with the RSO ID, a confidence level of the identification may be computed, thus providing insight into the quality of the identification process.

In some embodiments, an Unknown Object processing pipeline 904 or thread may begin with Detect Unknown Objects pipeline implemented by a Detect Unknown Objects function 900. The Unknown object processing pipeline 904 may perform a complementary or parallel function on the same image, without the higher contrast (e.g., the enhanced image 885). The unknown object pipeline 904 may follow a different logic, the intent of which may maximize the probability of detection of the lowest possible SNR (and contrast) objects. The majority of unknown objects may not have been previously detected because they were not well distinguished from the background, so the Unknown Object processing pipeline 904 may be specifically designed to address that situation. This may typically generate a vast number of false positives.

In some embodiments, the Unknown Object processing pipeline 904 may be used to efficiently filter these false positives. The filtering may be performed by using the known object processing database as a training set to efficiently filter false positives of the unknown detection processing chain through machine learning processing, as well as with efficient temporal filtering and detections grouping. When an unknown object become a confirmed known object, from that point forward it is processed by the Known Object Processing pipeline 904. It will then be added the database of the training set of the unknown object detection pipeline, resulting in a complete machine learning pipeline.

In some embodiments, the Detect Unknown Objects pipeline 904 may ingest the enhanced images 885 from the pre-processing function 875 along with the event timing and RSO ID list generated by the Find events function 840 may all be inputted into a detect unknown objects function 900. The temporal behavior of the objects may be used in this data pipeline to group together objects likely belonging to the same objects. The algorithms used in the detect unknown objects function 900 may process the image(s) to extract the detection characteristics.

In some embodiments, these detection algorithms may be performed independently on each image by a line detection algorithm, and may include, for example, a Canny/Hough algorithm, a Radon transform algorithm, and/or an efficient change detection algorithm on based on subsequent images (e.g., in an acquisition time sequence). The change detection algorithm may result in the highest detection sensitivity, but at the expense of a higher likelihood of false detections. The line detection algorithm may have a lower detection sensitivity.

In some embodiments, the detection characteristics outputted by the detect unknown objects function 900 may be inputted to a Classify Detections function 920. The Classify Detections function 920 may be configured to generate two outputs. A first output may include detection coordinates that may be relayed back into the Measurement function 910 in Known Object Measurement pipeline to complete the processing and create a new RSO to be added to the RSO catalog 805. A second output may include Objects detections, or an object list of candidate RSOs resulting from the initial processing pass, which may be inputted into an Associate Streaklets function 930.

In some embodiments, the Classify Detections function 920 may be include classification processes that may be augmented by three processes. (1) The first process may include a Machine learning-based balanced reinforcement from an Associate Tracks (AT) function 975 (see FIG. 12C). The AT function 975 may ingest object ephemeris from the output of an Initial Orbit Determination function 965, which may generate the ephemeris from the Objects Detections grouped by event, produced by the Associate Streaklets function 930. (2) The second process may include the AT function 975 also ingesting state vectors from the RSO catalog 805 and may send Uncorrelated Track (UCT) data to the RSO catalog 805. The RSO catalog 805 may be a collection of confirmed, identified RSOs, UCTs and candidate RSOs. Each type may be managed separately within the database. (3) The third process may be where the AT function 975 may send Objects Candidates to an Identify Unknown Objects function 970 as shown in FIG. 12C.

In some embodiments, supervised Learning for the Classify Detections logic in the Classify Detection function 920 may be performed in two separate pipelines using the RSO catalog 805 and a Calibration Satellites State vector database 985. The catalog may provide training data of what may be currently considered to be true objects to improve the performance of the detection classification logic. Furthermore, since it is possible for the catalog data to diverge or have errors introduced over time, the machine learning process may be repeated with a set of calibration satellite data (e.g., from the Calibration Satellites State vector database 985) to provide a quality control function on the catalog-based learning.

In some embodiments, the streaklets may be inputted to the Observation Candidate-Grouping process implemented by the Associate Streaklets function 930, which may group all streaklets from different sensors that appear to be generated by the same RSO. This may be done to improve the quality of the initial orbit determination by using longer and more numerous tracks. The group of streaklets may be correlated to other groups of streaklets processed by all sensors in the past several days using neural network-based algorithms. Observer and target positions and velocities may be used in the correlation process, as well as all the measured object photometry.

In some embodiments, a determine initial orbit step performed by the Determine Initial Orbit function 965 may use associated streaklets from the Observation Candidate-Grouping process or, if no grouping was possible, directly from the Associate Streaklet function 930 to perform an Initial Orbit Determination (IOD). Small-Arc IOD may be use for streaklets. Batch processing may be used if the data originates from the Observation Candidate-Grouping process.

In some embodiments, the Associate Tracks function 975 may process objects, may propagate them at the instant of the current observation, and may compare the resultant track to against the current track. If the tracks match, the observations belongings to the tracks may then be grouped and assigned an RSO ID. When a track may be associated to candidates of tracks, a confidence level of association may then be derived based on the quality of the track matching. If no matching tracks are found, the track may then be entered into the RSO catalog 805 with a temporary RSO ID number.

In some embodiments, the calibration flow described herein may be based on the physical processes involved in the whole sequence of transformation from incident photons, through detected photoelectrons up to measured digital levels. It is a pixel-wise method, such that each pixel of the image sensor may be independently characterized and calibrated. The calibration flow may be applied, for example, to infrared cameras and visible-NIR cameras as well as covering all artifacts that the image sensor may introduce in its optical measurements.

In some embodiments, the calibration flow may be split into four independent calibration flows. The first calibration flow may manage the artifacts added by the image sensor itself, to improve the relative uniformity of the image. It is referred to herein as "equalization". The second calibration flow may rely on a more global instrument characterization (image sensor plus its dedicated optics), to give an absolute value to the light illumination detected by each pixel. It is referred to herein as "radiometry".

In some embodiments, the third calibration flow may be based on the characterization of how the instrument spreads the light coming from a point-source. This standard performance measurement of an optical system may be referred to as the "Point-Spread Function (PSF)". Finally, the fourth calibration flow may play a critical role in the data acquisition mission detailing how the instrument translates the image position of a point-source relative to its ideal imaging capability. It is referred to herein as "distortion".

In some embodiments, instrument physical model may be the fundamental base of the calibration method. The model may define how the artifacts that may be added by the instrument are represented. The role of the calibration flow is to correct for these artifacts, by implementing the best methods to compromise between instrument artifact removal and addition of new defects introduced by the correction algorithm itself.

In some embodiments, the physical modeling of the optical instrument may serve as the basis behind the overall instrument calibration and characterization strategy.

In some embodiments, the image sensor ideal behavior may be characterized by a linear relation between the increase in digital count level and the integration time, as defined by:

$$C_p = C_{off,p} + F_p \times t_{int}$$

where $C_p$ is the digital count level [DL] measured by the image sensor, $C_{off,p}$ is the offset count level [DL] (without integration), $F_p$ is the count flux [DL/s] related to detected signal strength, and $t_{int}$ is the integration time [s]. The parameter p may be an index representing the pixel. So, each parameter with such index may be mathematically represented by a map having the image size. However, experimental characterization of the image sensor resulted in a modification in this last relation to introduce a non-linear contribution:

$$C_p = C_{off,p} + F_p \times \tau_p \times f(t_{int}/\tau_p),$$

where $\tau_p$ is a time constant [s] and f(x) is a monotonous non-linear function showing a linear slope at the origin and exhibiting saturation for large values of its argument. The time constant may itself be varying exponentially with the flux level:

$$\tau_p = \frac{\tau_{0,p}}{(F_p/F_0)^{\alpha_p}},$$

where $\tau_{0,p}$ may be the time constant [s] at reference count flux $F_0$ [DL/s] and $\alpha_p$ may be an exponent [–]. A value of "$\alpha_p=1$" refers to a count level that exhibits the same behavior (i.e., same non-linearity) with increasing integration time for any flux level. Finally, the time constant at reference count flux does vary with sensor temperature T [C]:

$$\tau_{0,p} = \frac{\tau_{00,p}}{2^{\frac{T-T_0}{\Delta T_\tau}}},$$

where $\tau_{00,p}$ is the time constant at reference count flux $F_0$ and reference temperature $T_0$ [° C.], and $\Delta T_\tau$ represents the required temperature increase [° C.] to halve the reference time constant.

In some embodiments, the count flux may have two contributions: an intrinsic offset and a scene-related quantity. It may be represented by the following equation:

$$F_p = F_{off,p} + G_p \times I_p$$

where $F_{off,p}$ is the offset count flux [DL/s], which may be present even without illumination of the image sensor, $G_p$ is the electronic gain [DL/electron], and $I_p$ is the electronic photocurrent [electron/s]. The latter may correspond to the amount of light detected by each pixel.

In some embodiments, the dominant contribution to the offset count flux may be expected to be the dark current of the image sensor. This quantity may be modeled as an exponential relation with sensor temperature:

$$F_{off,p} = F_{off,0,p} \times 2^{\frac{T-T_0}{\Delta T_F}},$$

where $F_{off,0,p}$ is the offset count flux [DL/s] at reference temperature $T_0$, and $\Delta T_F$ may represent the required temperature increase [° C.] to double the reference offset count flux.

In some embodiments, the electronic photocurrent may be proportional to the incoming light level on the instrument. It may be expressed by a simple relation:

$$I_p = A_{ep} \times K_p \times E_{ph,p}$$

where $A_{ep}$ is the area [m²] of the entrance pupil of the instrument optics, $K_p$ is the opto-electronic gain [electron/photon] of the overall instrument (image sensor plus optics) and $E_{ph,p}$ is the photonic irradiance [photon/(s·m²)] of the light incident at the instrument entrance.

In some embodiments, a point-source, like a star, may ideally produce on the image sensor, a single point, which is illuminating a single pixel. However, the coupling of the instrument optics and the image sensor assembly may result in a specific spatial distribution of the light on the sensor surface. This effect may be referred to as the point-spread function (PSF). This distribution may vary across the surface of the image sensor. It may be modeled by a 2D Gaussian distribution:

$$PSF = \frac{V}{2\pi\sigma_x\sigma_y\sqrt{1-r^2}} \times \exp\left\{\frac{-1}{2(1-r^2)}\left[\left(\frac{x-x_c}{\sigma_x}\right)^2 - 2r\left(\frac{x-x_c}{\sigma_x}\right)\left(\frac{y-y_c}{\sigma_y}\right) + \left(\frac{y-y_c}{\sigma_y}\right)^2\right]\right\} + O,$$

where V is the volume [photon/(s·m²·px²)] of the PSF, O is the offset [photon/(s·m²)] of the PSF, $x_c$ is the horizontal coordinate [px] of its center, $y_c$ is the vertical coordinate [px] of its center, represents its horizontal width $\sigma_x$, $\sigma_y$ represents its vertical width [px], and r is the correlation coefficient [–]

of the profile. The latter may be a normalized quantity ($|r|\leq 1$) related to the covariance of the profile $\sigma_{x,y}^2$ [px$^2$]:

$$r = \frac{\sigma_{x,y}^2}{\sigma_x \sigma_y}.$$

In some embodiments, while the PSF may relate to the relative spreading of the light flux, the information carrying its absolute position location on the image plane may be characterized separately. Ideally, a perfect optical system may locate the image of a point-source at a known position related to the angle between the object celestial location and the instrument optical axis. This angle may then be directly converted in a translation over the image sensor surface. Practical optical systems may suffer from aberrations that may change this ideal mapping. It may be globally characterized by the distortion of the imaging system. The horizontal and vertical translations related to the distortion may be simply added to the ideal position:

$$(y_{d,p}, x_{d,p}) = (y_{u,p}, x_{u,p}) + (\Delta y_{d,p}, \Delta x_{d,p})$$

where $(y_{d,p}, x_{d,p})$ may be the distorted image coordinates [px], $(y_{u,p}, x_{u,p})$ may be the undistorted image coordinates [px], and $(\Delta y_{d,p}, \Delta x_{d,p})$ may be the added distortion values [px].

In some embodiments, the image calibration flow may cover the steps that may be used to invert the physical model, i.e., to start with raw information, such as the digital level of a pixel, to convert it into a standard radiometric physical quantity—the photonic irradiance.

In some embodiments, the first step may be to convert the digital count level into a count flux. This is done by using the equations given above. Starting with the sensor temperature, the time constant at reference count flux is first calculated. The count flux is first estimated using the linear equation:

$$F_p = \frac{C_p - C_{off,p}}{t_{int}}.$$

In some embodiments, this estimation may be next used to calculate the time constant, which is next used to calculate a new count flux value:

$$F_p = \frac{C_p - C_{off,p}}{\tau_p \times f(t_{int}/\tau_p)}.$$

In some embodiments, this new count flux value may be used to estimate the time constant, which may be used to calculate again the count flux. This iterative process may be repeated upon convergence.

In some embodiments, the next step in the calibration flow may be to calculate the electronic photocurrent for each of the pixels in the image data by directly inverting the count flux method described herein above. The offset count flux may be determined using the sensor temperature and the inverse relation gives the electronic photocurrent:

$$I_p = \frac{F_p - F_{off,p}}{G_p}.$$

In some embodiments, the photonic irradiance may be obtained for each pixel by evaluating using the following relation defined hereinabove:

$$E_{ph,p} = \frac{I_p}{A_{ep} \times K_p}.$$

Figure 14:
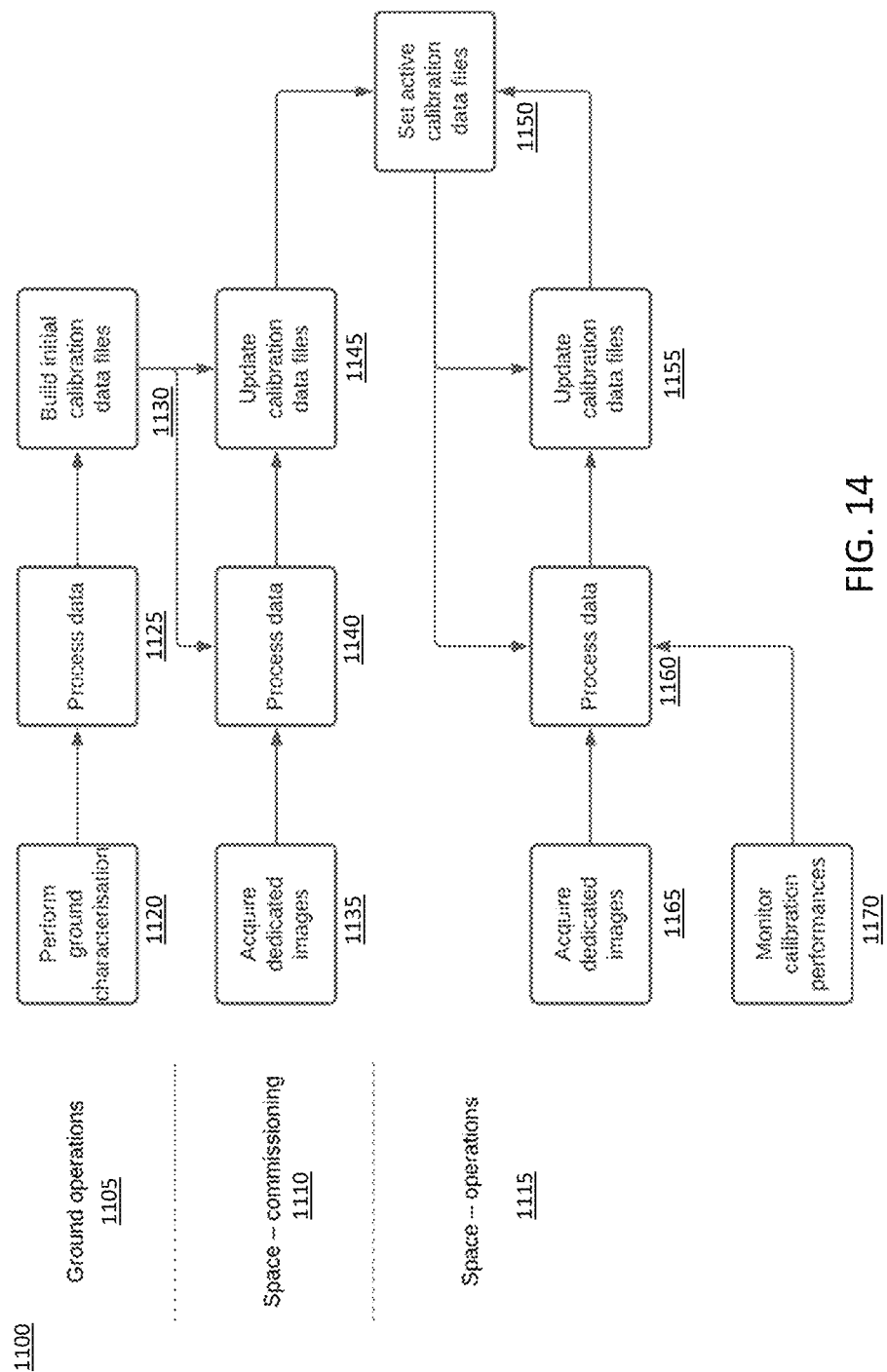

FIG. 14 is a block diagram 1100 of a method for building calibration data sets in accordance with one or more embodiments of the present disclosure. The method for building calibration data sets may be performed in three steps. During the satellite manufacturing, the image camera may be tested and characterized. The acquired data sets may be analyzed and processed to build the initial calibration data sets.

In some embodiments, a first step may be performed as ground operations 1105 where the characterization of the image sensors may be performed 1120 and the data processed 1125 so as to build initial calibration data sets 1130. First, the image sensor may be characterized. Next, the fully integrated image sensor along with the optical system may be tested. The image sensor, along with its dedicated electronics and firmware, may be fully characterized while being illuminated by a quasi-uniform stable incoherent light source. The acquired data sets may be referred to as "calA".

In some embodiments, after integration of the image sensor into the instrument optics, the full image camera may be characterized using the projection of an image target that may include a distribution of pinholes. The images of the pinholes may be analyzed and processed to provide global instrument information distributed into blocks "calB", "calC" and "calD". Thus, the initial calibration data sets 1130 may include "calA", "calB", "calC" and "calD".

In some embodiments, a second step may be referred to as the space commissioning phase 1110, where after launching the satellite and ensuring all its components are fully operational and performing as expected, dedicated data sets of space-acquired image data 1135 may be acquired and may be processed 1140 with the initial calibration data sets 1130 so as to validate and update the initial calibration data sets 1145. These new space-acquired data files may be compared to the initial ones so as to ensure their validity. These updated calibration data files 1150 may be used as the first active calibration data set.

In some embodiments, in a third step under nominal space operations 1115, dedicated image data sets 1165, such as the ones acquired during the commissioning phase (e.g., the acquired image data 1135) may be regularly acquired and processed 1160 to ensure the validity of the active calibration data. Performance monitoring 1170 of the standard image processing chain of these additional image data sets may be also analyzed for updating the active calibration data sets 1155. Thus, the updated calibration data sets may then be selected as the current active calibration data set 1150.

In some embodiments, during the commissioning phase, dedicated images may be acquired and processed to provide all the information required to fully understand the post-launch image camera behavior when operated under its space environmental conditions. Such information may be used to update the initial calibration data. This results in the first active calibration data set. The main activities occurring during the commissioning phase may be based on star imaging.

In some embodiments, an initial calibration flow may also be performed and referred to as an initial step prior to the two-step calibration flow of correcting the radiometry, and then the geometry. In the initial calibration flow, calibration images may be used to determine how much distortion may be present in the image. This determination may be done using the calibration images with stars in the field of view.

In some embodiments, calibration images (e.g., from a repository such as the star catalogue 1255) may include a plurality of star features (e.g., detected object features of at least one other celestial body such as stars) for performing a star pattern matching in the newly acquired images from the plurality of imaging devices on the respective plurality of satellites. The star pattern matching may be used to determine how much star patterns in the newly acquired images may be distorted such that corrections may be applied.

In some embodiments, the star pattern matching may be applied after the radiometric calibration flow.

In some embodiments, bad or defective pixels may be removed from the pixel array due to regions of defects in the sensor array detector, for example, which may help to prevent false positives in the detection and in the rest of the processing chain. Removing all of the artifacts may enable a really low false alarm rate, false positive rate at the detection level and for the rest of the processing chain.

Figure 15:
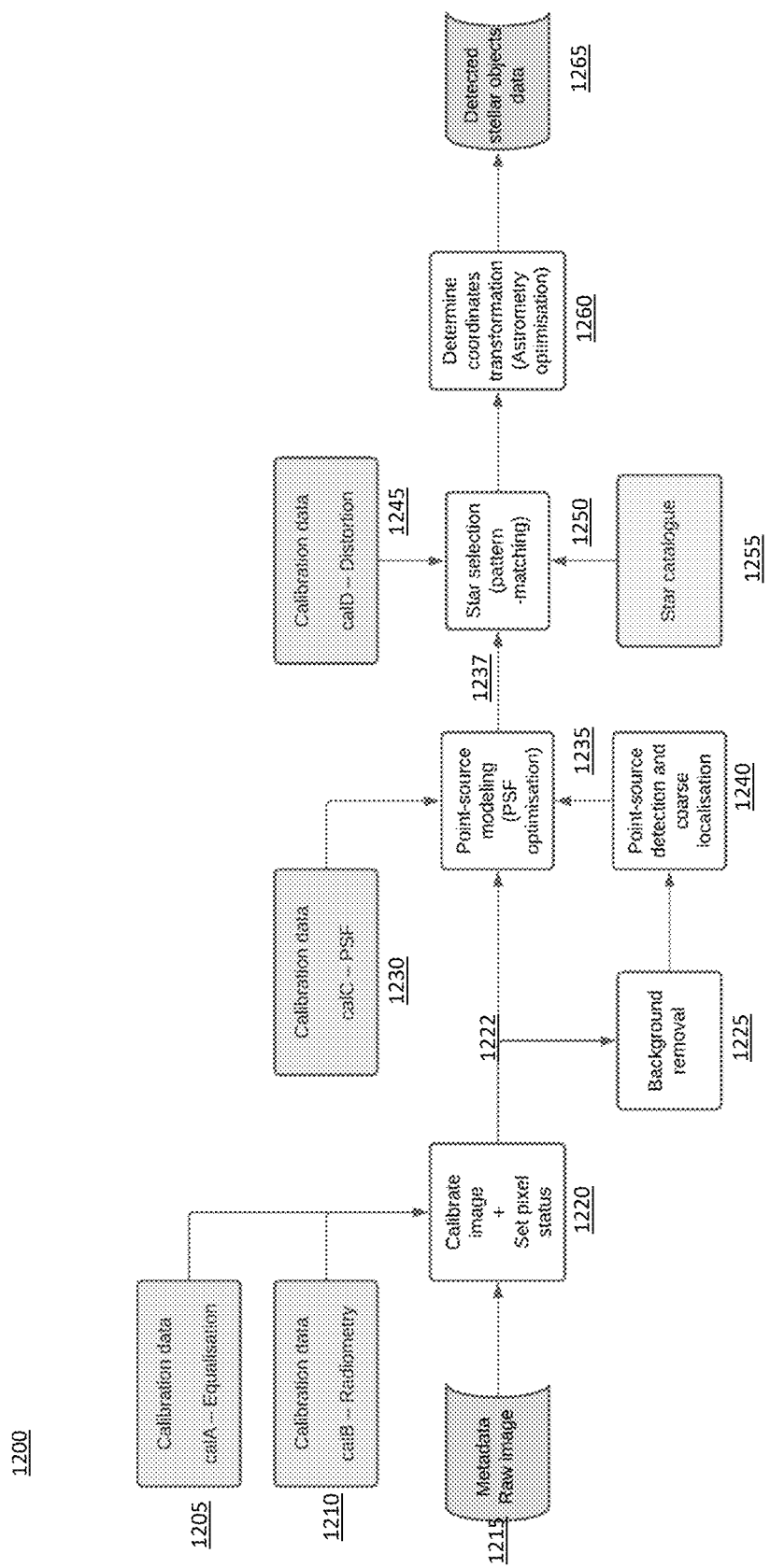

FIG. 15 is a processing flow block diagram 1200 using star imaging to estimate instrument parameters in accordance with one or more embodiments of the present disclosure. The processing flow block diagram 1200 may include raw image data (metadata) 1215 including at least one stellar image that may be calibrated 1220 and the status of each pixel assessing the validity of the numeric value of each pixel may be set using the Equalisation (calA) calibration data set 1205 and/or the Radiometry (calB) calibration data set 1210. The stellar image may also be referred to herein as a star image.

In some embodiments, background removal 1225 may be applied to calibrated star images 1222. After the background removal 1225 of the calibrated star images, the system may apply a point source detection and coarse localization algorithm 1240 before applying a point-source modeling (PSF optimization) 1235 using PSF calibration data calC 1230 to the star images. In other embodiments, the point-source modeling (PSF optimization) 1235 using the PSF calibration data (calC) 1230 may be directly applied to the calibrated star images 1222.

In some embodiments, a star selection (pattern matching) 1250 may be applied to the PSF optimized calibrated star images 1237 using a distortion calibration (calD) data set 1245 and a star catalogue 1255 so as to identify stars in the PSF optimized calibrated star images 1237. For each of the identified stars, the system may determine coordinate transformation 1260 (Astrometry optimization) for providing detected stellar object data 1265.

In some embodiments, the block diagram 1200 may represent a processing of the star images so as to provide information that may be used to estimate instrument parameters by analyzing the data extracted from a multitude of stellar objects, as observed on one or many distinct images at different locations on the image plane. The process may include validating each parameter, scalar ones, or maps, of the calibration data sets. Based on the validation, the calibration data blocks may be confirmed with its current values or the calibration blocks may need to be further refined to build updated calibration data blocks.

In some embodiments, the information provided by the stars, that may be also referred to as detected stellar objects, may be split into four categories. First, the magnitude of each star, as provided by the star catalogue 1255, may enable an estimation of the photonic irradiance that should be measured by the instrument. Comparison between these expected values and the measurements, at various locations in the image plane, may enable the application of a correction to the opto-electronic gain map (stored in "calB").

Secondly, in some embodiments, the celestial location of each star may be given by the star catalogue. Comparing these locations with the measured coordinates as calculated by the processing flow shown in FIG. 6, may facilitate an update, if necessary, of the distortion maps that are stored in "calD".

Thirdly, in some embodiments, the PSF optimization performed for each detected star, may bring direct measurements of the three parameters that may characterize the spatial profile at various locations in the image plane. Such measurements may then be compared to the current calibration data. The maps of these three parameters may be stored in block "calC".

Finally, in some embodiments, for each PSF optimization that may be calculated, a residual map (i.e., the difference between the fitted image and the measured one) may be obtained. Accumulation of these residual maps may provide information about the quality of the equalization data provided by block "calA". Systematic trends in the residual maps may be identified and used to update the appropriate maps.

In some embodiments, under nominal space operations, dedicated images, as mentioned hereinabove, may be regularly acquired, processed, and analyzed to validate the quality of the active calibration data set. Added to this process, the standard processing chain may also monitor the performance of the calibration. Any drift in the calibration parameters may be estimated, and an updated calibration data set may be determined. This may lead to a change in the active calibration data set.

In some embodiments, the continuous monitoring of the calibration data quality may be a key aspect of the overall calibration method. It may provide stability and repeatability of the mission data products.

Figure 16:
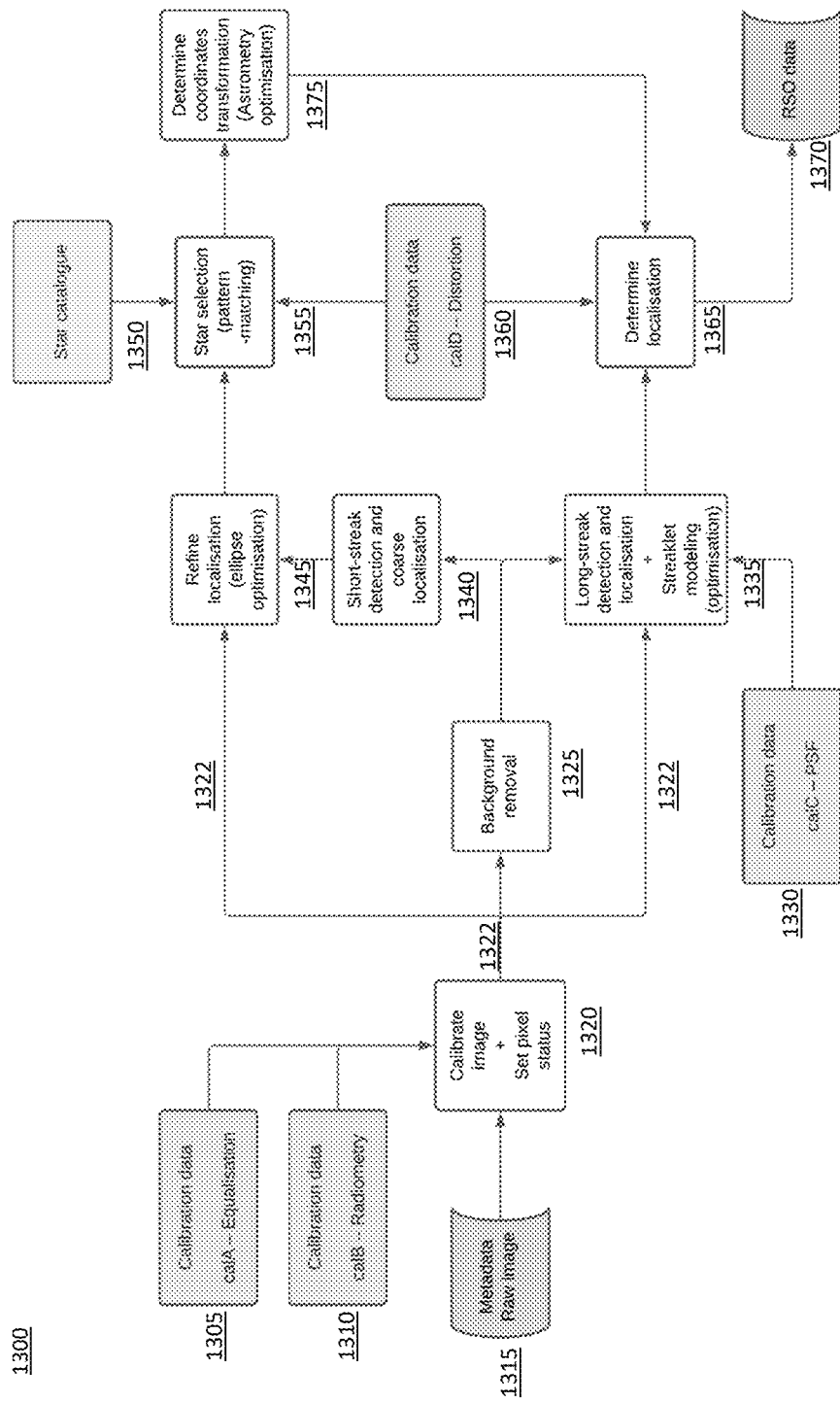

FIG. 16 is a processing flow block diagram of a find events pipeline 1300 for the image processing for determining the locations of detected RSOs along with the specific use of the calibration data blocks in accordance with one or more embodiments of the present disclosure. The find events pipeline 1300 may include raw image data (metadata) 1315 including at least one stellar image, at least one RSO, or any combination thereof that may be calibrated 1320 and the status of each pixel assessing the validity of the numeric value of each pixel may be set using the Equalization (calA) calibration data set 1305 and/or the Radiometry (calB) calibration data set 1310. The stellar image may also be referred to herein as a star image.

In some embodiments, background removal 1325 may be applied to calibrated star images 1322. After the background removal 1125 of the calibrated star images, the system may apply a short-streak detection and coarse localization algorithm 1340 before applying a refine localization (ellipse optimization) 1345 to the star images. In other embodiments, the refine localization (ellipse optimization) 1345 may be directly applied to the calibrated star images 1322. From the refine localization 1345 algorithm, a star selection (pattern matching) 1355 using data from the star catalogue algorithm may be used to identify stellar (star) objects in the image data and then a determine coordinates transformations (Astrometry optimization) algorithm 1375 may be applied. The output of the determine coordinates transformations (Astrometry optimization) algorithm 1375 with the stellar object information may be input to a determine localization 1365 algorithm for the RSO objects in the image data.

In some embodiments, background removal 1325 may be applied to calibrated images 1322. After the background removal 1325 of the calibrated star images, the system may apply a long-streak detection and localization algorithm and streak modeling optimization 1335 using the PSF calibration data (calC) 1330 to the image data related to the RSOs. In other embodiments, the long-streak detection and localization algorithm and streak modeling optimization 1335 may be directly applied to the calibrated images 1322.

In some embodiments, the determine localization 1365 algorithm may receive as inputs: the outputs from the determine coordinate transformation algorithm 1375 with the stellar object data and the long-streak detection and localization (streaklet modeling) 1335 algorithm with data related to the RSO so as to output RSO data 1370 from the determine localization 1365 algorithm.

In some embodiments, prior to performing calibration, the image data from the plurality of images may be used to in the find events pipeline 1300 to find events in the celestial image features in any of the plurality of images. When a particular camera may be located at a particular location in space and time, the find events pipeline 1300 may know the known objects that should be in the field of view 22 when pointing at the particular location in space at the particular time.

In some embodiments, known RSOs may be compared with data stored in a resident space object (RSO) repository database that may include information about known RSOs. The RSO repositories may be used by a variety of organizations, including space agencies, military agencies, satellite operators, and researchers. Space agencies may use RSO repositories to track the movement of RSOs and to assess the risk of collisions. Satellite operators may use RSO repositories to avoid collisions with other satellites. Researchers may use RSO repositories to study the population of RSOs and to develop ways to mitigate the risks posed by RSOs.

In some embodiments, any or all of the RSO catalog databases may be periodically updated with the generated celestial image features based on celestial feature metadata of each image from the plurality of images and/or processed celestial image features data during different data collection missions, for example.

In some embodiments, to determine what known RSOs from the RSO catalog database may be at a particular location and time in space for imaging by a particular camera, state vectors from orbital determination and propagation of the state vectors may be used to know when and where known RSOs may be at a particular location in time and space. The satellite processor may then predict based on the camera's positional data as to when and where an expected RSO may be in the FOV 22 of the camera. Stated differently, known RSOs in the RSO catalog in the RSO database repository may be propagated to the time of observation of the image and camera location to determine what known RSO will be present in the FOV 22. Only image data from known RSOs may be pre-processed at this stage that may be subsequently used in the calibration flows as described herein below.

In some embodiments, the image data may be processed on if there is an event in the image. The find events pipeline 1300 where an object may be present in the image data to the known processing may be run on every image and the calibration flows may be run on every image when the images are known. When unknown RSOs may be present, an unknown RSO processing pipeline may use a different calibration flow. The processor 75 may decrypt in the image data and then calibrate the sensor array based on the stars and other celestial body features captured in the plurality of images.

In some embodiments, the find events pipeline 1300 may be used to filter out images. Each image may be preprocessed and calibrated, where the find events pipeline 1300 may be applied in the known objects or the unknown objects processing/calibration flows.

In some embodiments, the find events pipeline 1300 may be part of the unknown object processing for health monitoring of the unknown RSO processing chain. The unknown object pipeline may be looking at all images, the find event preprocessing mode using known RSOs to identify a particular known RSO that will be known to be in the FOV 22 of the camera, may be used to validate the accuracy or health monitoring of the unknown object pipeline because the processor 75 may be configured to identify that there is supposed to be a particular known RSO in the FOV 22 of a particular satellite at a particular time. Not finding the particular known RSO by the camera may indicate that the system may be faulty. Thus, the find events pipeline 1300 checks may be used to validate the pipeline accuracy before calibration and splitting into the known and unknown RSO detection pipelines.

In some embodiments, for the find events pipeline 1300 for health monitoring of the processing known and unknown processing chains, the celestial feature metadata from a particular image from the plurality of images to identify where the FOV 22 may be pointing in space may be used instead of analyzing the raw image data.

In some embodiments, the celestial feature metadata may be input to the find events pipeline 1300 to identify features and the timings of those events (e.g., the expected RSOs to be detected) in the metadata. Then the expected RSOs to be detected and associated information and the raw image data after decryption and decompression process may be inputted into the calibration process.

In some embodiments, the image calibration flows as shown in FIGS. 14-15 may include two calibration steps: equalization and radiometry as described hereinbelow. They may be used to invert the equations of the physical model that is used to represent the image sensor plus its optics. These processes are applied independently for each pixel of the image sensor.

Figure 17:
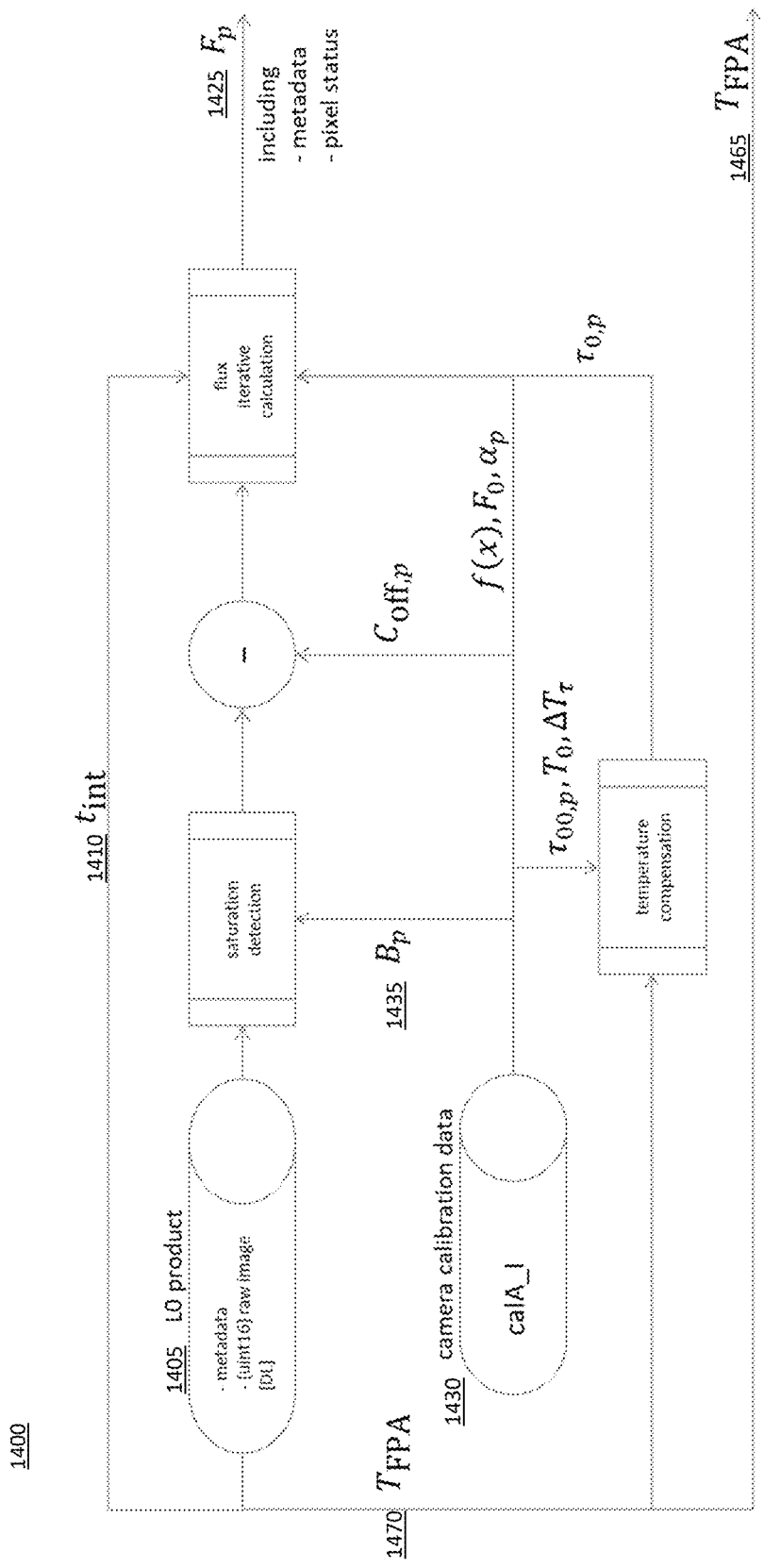

FIG. 17 is a first part of an equalization data flow diagram 1400 of the image calibration for conversion of the raw image in a count flux image in accordance with one or more embodiments of the present disclosure.

Figure 18:
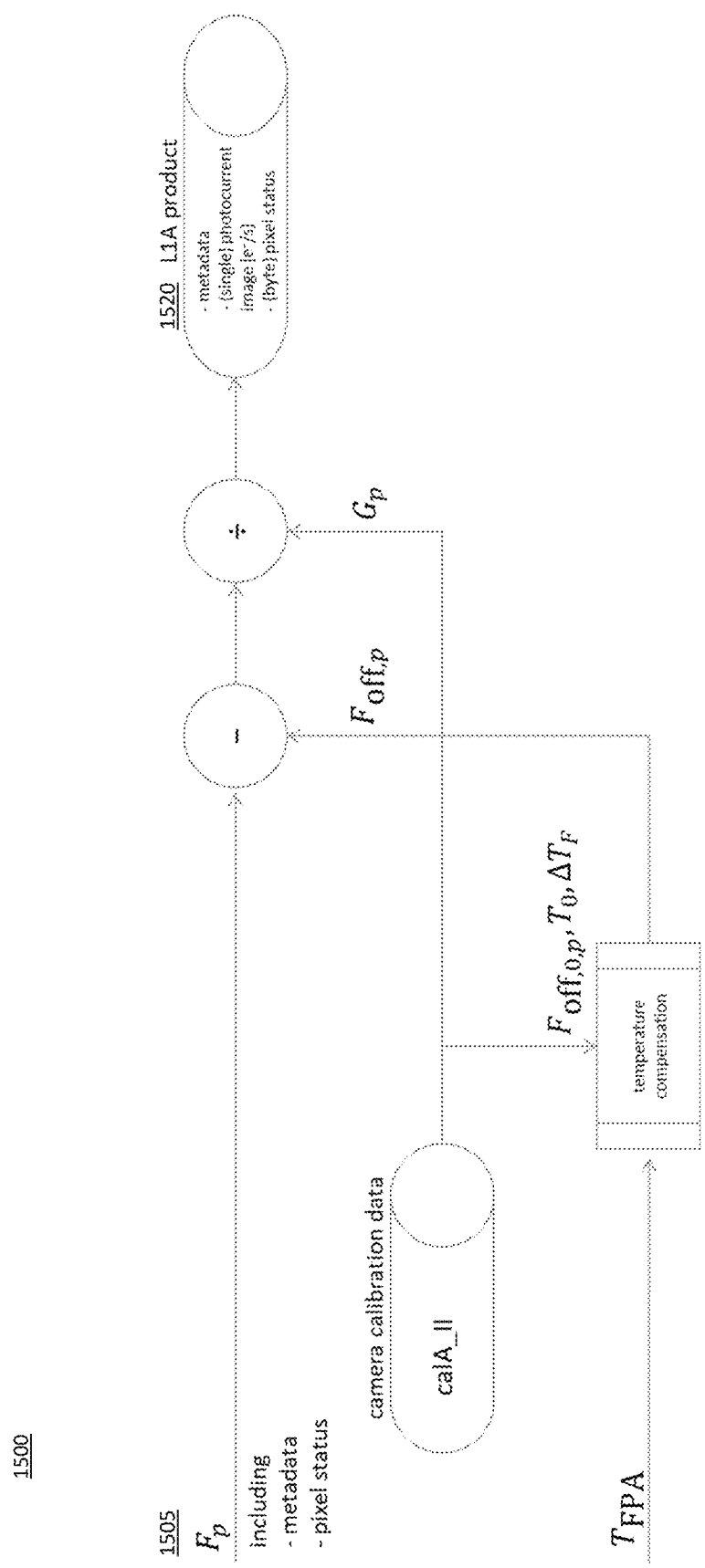

FIG. 18 is a second part of an equalization data flow diagram 1500 of the image calibration for conversion of the count flux image into photocurrent image data in accordance with one or more embodiments of the present disclosure.

In some embodiments, three levels of data products may follow the data processing chain. An L0 data product 1405 may represent the raw information provided by the image camera and may include the raw image in binary format and the corresponding metadata carrying all the essential supporting data (e.g., timing, localization, pointing, system operating mode, environmental, etc.).

In some embodiments, an L1 data product 1520 may include the metadata, as well as the calibrated image and the pixel status stating the validity of the numeric value of each pixel. The L1A data product 1520 may represent the calibrated image in electronic photocurrent units, while for an L1B data product 1620, the calibrated image may be provided in photonic irradiance units.

In some embodiments, the role of equalization may be used to convert the raw image into a photocurrent image by using the data stored in block "calA" 1430. These processes may be depicted in FIG. 17 (part I) and FIG. 18 (part II). In the processes, two values may be extracted from the metadata: $T_{FPA}$ 1465 may be the temperature of the image sensor and $t_{int}$ 1410 may be the integration time. All the other parameters may be obtained from "calA".

In some embodiments, the algorithmic flow shown in FIGS. 17-18 may use pixel offsets and dark current (signal related to a sensor temperature). The algorithmic flow may detect saturated pixels, which may have exceeded the dynamic range of the detector. Since there is no brightness assessment of the saturated pixels, they may not be used in the calibration flow.

In some embodiments, upon completion of the first section of radiometric calibration flow in FIGS. 17-18 results in an output of an image with a pixel array measured in electrons per second that have been calibrated for the physical detector parameters.

Figure 19:
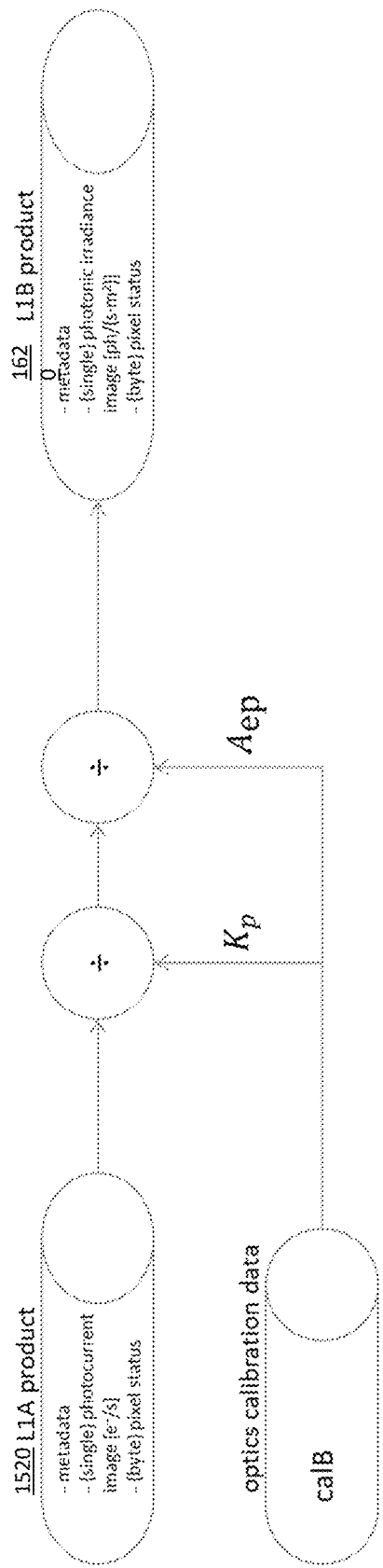

FIG. 19 is a radiometric data flow diagram 1600 of the image calibration for conversion of the photocurrent image data into photonic irradiance image data in accordance with one or more embodiments of the present disclosure. The second step is to convert photocurrent image into a photonic irradiance image as shown in FIG. 19. All the required parameters may be obtained from "calB".

In some embodiments, the information to calibrate the image camera artifacts is distributed in the four calibration blocks "calA", "calB", "calC" and "calD", each block being related to a specific part of the image processing.

In some embodiments, the "calA" calibration data set may provide the data for converting the raw image data, in units of Digital Levels (DL), to an image representing the photocurrent, i.e., the current inside each detector pixel produced by the detected light flux, in units of electrons per second. The main role of "calA" may be to spatially "equalize" the raw image by correcting for the main random contributions between the pixels of the image sensor.

In some embodiments, to achieve the equalization calibration, block "calA" may be partitioned into two parts. Part I may be used in the conversion from digital counts (DL) to linear count fluxes (units of DL per second). Part II may be used to enable the conversion from these count fluxes to photocurrent.

In some embodiments, this section of calibration may calibrate impairments related to the transmission of photon signals through the detector by correcting for the optoelectronic gain and the pupil entrance. The Opto-Electronic Gain [electrons/photon] may relate how many photons arrive on the instrument for one detected electron. The quantity may be represented as a matrix and defined as Kp. A Pupil Entrance [$m^2$] may be the area of the sensor that the electromagnetic signal interacts for detection.

In some embodiments, the radiometric calibration flow may include a block for removing bad pixels. Bad pixels may include pixels that may be dead, white or zombie. A zombie may be a state where pixel may be dead or alive, switching between both.

In some embodiments, upon completion of the second section of the radiometric calibration flow, the pixel values in the pixel array of the images may be represented by photonic irradiance, where each pixel value may be in photons/second meter squared. Furthermore, a pixel-by-pixel map may indicate a status for the different pixels (e.g., dead, zombie or white).

FIG. 20 is a table 1700 of a list of the parameters included in block "calA" (Part I and Part II) in accordance with one or more embodiments of the present disclosure. In addition, each calibration block may include an identification, a version number, a time stamp, a satellite ID, and/or a sensor ID.

In some embodiments, the "calB" calibration data set may include the information for converting the photocurrent image into an image of photonic irradiance, (e.g., pixel array values) in units of photons per second per square meter. This physical quantity may correspond to the radiometric approach for depicting the calibrated illumination level on the image sensor surface, as produced by the optical system. It thus corresponds to the calibrated image as measured by the image camera.

FIG. 21 is a table 1750 of a list of the parameters included in block "calB" in accordance with one or more embodiments of the present disclosure. In addition, each calibration block may include an identification, a version number, a time stamp, a satellite ID, and/or a sensor ID.

In some embodiments, the "calC" calibration data set may include the information required to model the image camera capability to image a point-source object, e.g., the Point-Spread Function (PSF) of the optical system. The PSF may represent the spatial distribution of the imaged point on the image sensor surface produced by the instrument optics.

In some embodiments, the PSF model may be an elliptic binormal distribution which may be represented by a set of three parameters, whose spatial behavior may be characterized across the full image.

In some embodiments, the spatial profile of the PSF may be used as an initial seed to facilitate the optimization of star and RSO models.

In some embodiments, the PSF information may not be used to correct the image of the image camera since such process, associated with deconvolution, may be ill-conditioned. It would amplify spatial noise and camera artefacts, so its usage in this manner may be avoided.

FIG. 22 is a table 1800 of a list of the parameters included in block "calC" in accordance with one or more embodiments of the present disclosure. In addition, each calibration block may include an identification, a version number, a time stamp, a satellite ID, and/or a sensor ID.

In some embodiments, block "calD" role may be critical relative to the essential task of object localization in that it contains the information depicting how an object image may be shifted (horizontally and/or vertically) in the image plane relative to its ideal position, as (linearly) predicted by the effective focal length of the optical system. The spatial behavior of such parameters may be characterized across the full image.

In some embodiments, the distortion information may be used to correct the localization of objects in the image plane once the optimization methods provided an estimated position of the target object in the processed image. The distortion information may not be used to correct the image of the image camera, since such process may finely interpolate the calibrated image. Thus, such algorithm may be ill-conditioned relative to spatial noise and/or camera artifacts, so its usage may be avoided.

In some embodiments, distortion may be measured using star pattern matching since the location of the stars may be known and the processor 75 may compare the exact location of the stars with the measured location using the camera. The processor 75 may use these differences to build distortion maps to correct for the distortion of the instruments. This distortion correction may be done for each satellite by building the maps for the radiometry, for the profile and for the distortion. However, the raw image is not corrected for the distortion. Instead, shifts of a star or any object in the image plane of the camera may be converted to an absolute direction. The absolute direction may be corrected by knowing a given amount of distortion in the image. The geometric correction of the image may be computationally heavy and may often result in many artifacts. Hence the processor 75 may use these parameters, the profile, and the distortion as information that may be used to apply the correction posteriorly instead of trying to correct the image for that.

FIG. 23 is a table 1850 of a list of the parameters included in block "calD" in accordance with one or more embodiments of the present disclosure. In addition, each calibration block may include an identification, a version number, a time stamp, a satellite ID, and/or a sensor ID.

Figure 24:
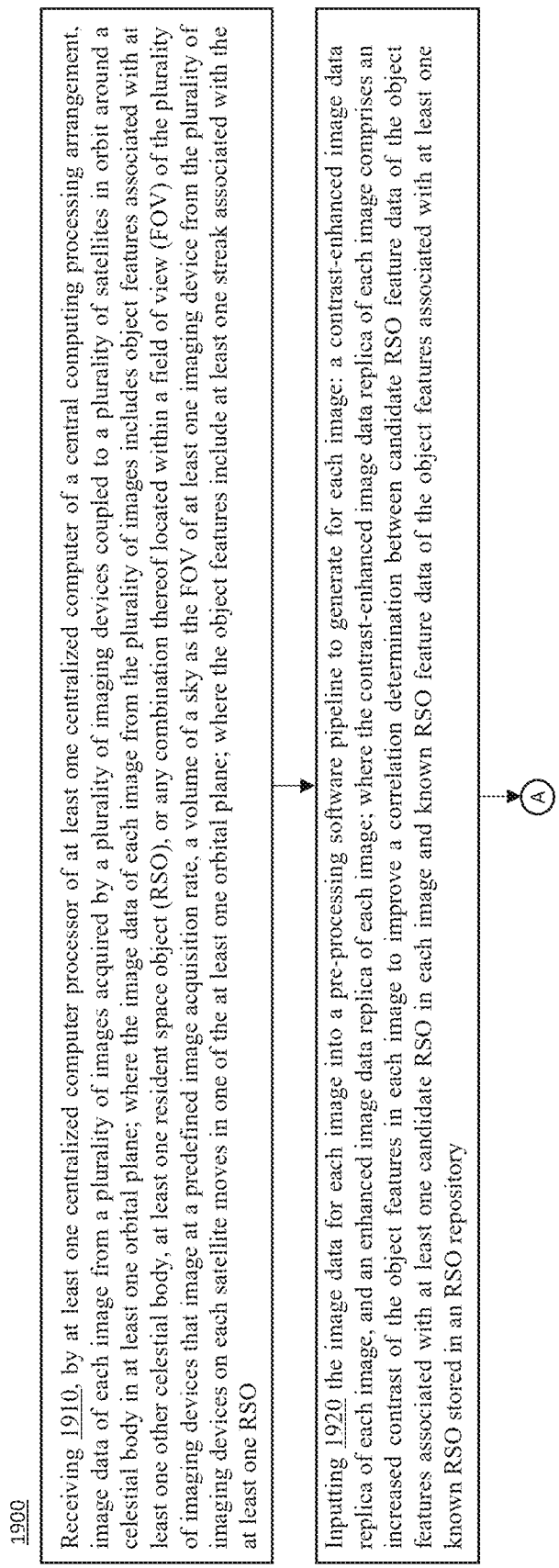

FIG. 24 is a flowchart of a method 1900 for calibrating spacecraft captured images and detecting resident space objects in accordance with one or more embodiments of the present disclosure. The method 1900 may be performed by the processor 75.

The method 1900 may include receiving 1910 image data of each image from a plurality of images acquired by a plurality of imaging devices coupled to a plurality of satellites in orbit around a celestial body in at least one orbital plane; where the image data of each image from the plurality of images includes object features associated with at least one other celestial body, at least one resident space object (RSO), or any combination thereof located within a field of view (FOV) of the plurality of imaging devices that image at a predefined image acquisition rate, a volume of a sky as the FOV of at least one imaging device from the plurality of imaging devices on each satellite moves in one of the at least one orbital plane; where the object features include at least one streak associated with the at least one RSO.

The method 1900 may include inputting 1920 the image data for each image into a pre-processing software pipeline to generate for each image: a contrast-enhanced image data replica of each image, and an enhanced image data replica of each image; where the contrast-enhanced image data replica of each image comprises an increased contrast of the object features in each image to improve a correlation determination between candidate RSO feature data of the object features associated with at least one candidate RSO in each image and known RSO feature data of the object features associated with at least one known RSO stored in an RSO catalog.

The method 1900 may include receiving 1930 from an output of a known-unknown RSO split data processing pipeline, a determination, based at least in part on temporal behavior of the at least one streak associated with the at least one candidate RSO in successive images in the plurality of images generated by the plurality of imaging devices that the at least one candidate RSO is the at least one known RSO stored in the RSO catalog, or at least one unknown RSO absent from the RSO catalog; where the known-unknown RSO split data processing pipeline includes a known object processing pipeline that outputs the determination using the contrast-enhanced image data replica of each image in the plurality of images, and an unknown object processing pipeline that outputs the determination by inputting the enhanced image data replica of each image in the plurality of images into at least one machine learning model trained to: group the object features into tracks based on the temporal behavior of the objects features in the successive images, determine a likelihood of the tracks being associated with at least one particular candidate RSO, and relay detection coordinates of the tracks into the known object processing pipeline to assess whether a particular candidate RSO from the at least one candidate RSO is a particular known RSO registered in the RSO catalog.

The method 1900 may include assigning 1940 based on the determination, one of: at least one RSO ID of the at least one known RSO listed in the RSO catalog to the at least one candidate RSO based on the determination that the at least one candidate RSO is the at least one known RSO, or at least one new RSO ID to the at least one candidate RSO for storage in the RSO catalog based on the determination that the at least one candidate RSO is the at least one unknown RSO.

In some embodiments, the celestial feature metadata may include system metadata which may further include sensor health monitoring metadata, camera health monitoring metadata, satellite health monitoring metadata, telemetry information received from the satellite for communicating the position of the satellite and other positional metrics. In other embodiments, the system metadata may be finely compressed by the satellite processors by any suitable compression algorithm and decompressed by the at least one processor 75 of the at least one central computer 70.

In some embodiments, a compression algorithm for compressing the images in space that will preserve the information needed for the calibration, for example, may be used. The algorithm may be some threshold value in the image to look at the image scene because the image may include bright dots and a lot of black between the bright dots, but the black portion may include noise information for use in the calibration process. A threshold algorithm may consider a region in the image data the bright spot and/or bright pixels as well as the surrounding pixels with the noise information. A window may be placed around this region that may be, for example, one pixel by one pixel, or larger pixel windows. However, some information may be lost but most of the information of interest may be preserved. So, in this manner, the noise around the signal may be preserved.

In some embodiments, a portion of the sensor calibration may be performed on the ground and may be done in fact prior to building the imaging device. Sensor calibration data of different sensor may be acquired in the laboratory in a controlled environment and the impairment for cancellation may be modelled, and a sensor calibration map may be constructed in a sensor calibration map builder module.

In some embodiments, the sensor and/or image optic impairments may be more critical to calibrate for sensors in an infrared imager than a visible light imager. In other embodiments, the calibration module may be developed in a global approach to accommodate many different imaging sensors in imaging cameras, such as for example, but not limited to visible, infrared, multispectral and/or hyperspectral imagers.

In some embodiments, the different types of sensor-specific impairments may include characteristics of the sensors, different types of sensor noise, sensor non-uniformity, point spread function (PSF) distortion, and geometric distortion.

In some embodiments, the calibration process may be validated by processing image data having at least one star in a very wide field of view and to use the at least one star in the field of view as a calibration source. The use of the star may be used to validate if the calibration is correct or needs correcting. Sensor-specific impairments may include the integration time since a larger integration time results in more signal received from the at least one star. Furthermore, some of the sensor's internal parameters may be affected by integration time, so the integration time may be varied in the lab to determine how the sensor behavior depends on the integration time such that the sensors may be calibrated for any integration time.

In some embodiments, the sensors may be characterized under different photon fluxes and such that the linearity of the sensor may be independent of the photon flux so any source may be calibrated for any flux value.

In some embodiments, temperature may also be a parameter that may change some of the sensor parameters. Calibration tests may be performed at different temperatures to characterize the temperature variations and to identify which sensor parameters may be temperature sensitive, slightly temperature sensitive, or not temperature sensitive. Monitoring the variation of sensor parameters or temperature stability of sensor parameters may be critical for maintaining a reliable calibration over time.

In some embodiments, the sensors may be characterized on the ground to build the different versions of calibration maps for the sensors of the imaging device. Subsequently the calibration may be constantly monitored the quality of the calibration maps are still valid after a time in orbit such as after 1-3 years for example. If properties of some pixels over time in a given sensor array change, the calibration maps may be updated accordingly. The health monitoring of the sensors may be done periodically such as every month, for example.

Furthermore, calibrating the camera on the ground may benefit from calibrating the sensor array itself without any camera optics so as to split the calibration parameters to identify which sensor parameters (1) may be related only to the sensor and to build calibration maps only related to the sensor, and (2) parameters that may be related to the more global behavior of the instrument, of the panel, etc, and to prepare calibration maps for those.

In some embodiments, an imaging camera (e.g., infrared and/or visible) may need to be calibrated at the beginning and the end of use, for every integration time (or to rely on extrapolations for integration time), and for the temperature ranges of use. A permanent sensor calibration map of the imaging camera that is independent of photon flux, integration time and sensor temperature may be generated. However, an uncalibrated infrared camera may generate an image that is essentially white. For a visible camera, two images taken respectively with uncalibrated visible camera and a calibrated visible camera may be hard to distinguish.

In some embodiments, a first set of satellites in a given satellite configuration (a plurality of satellites orbiting on a plurality of orbital planes) may have infrared cameras and a second set may have visible cameras. In other embodiments, a satellite may have both at least one infrared and at least one visible camera. In yet other embodiments, one satellite from the plurality of satellites in the satellite constellation for imaging outer space may have at least one infrared camera and the other satellites from the plurality of satellites may have visible cameras.

In some embodiments, different calibration images may be the input to the calibration map builder function 865 where at least one calibration map may be algorithmically generated that may be configured to correct many impairments that are not just sensor related. The at least one calibration map may be derived from four calibration sub-modules or pipeline based on the impairment being correcting. These four sub-modules may include an equalization sub-module, a radiometry sub-module, a point-spread function (PSF) sub-module, and a distortion sub-module.

In some embodiments, the first sub-module may be a pixel-to-pixel equalization sub-module that is sensor-based since each pixel in the pixel array is different, so raw image data that is supposed to be uniform may not be uniform due to the individual pixel impairments. Thus, the equalization sub-module may be configured to recover the uniformity of the image. Note that this impairment may be only sensor-based since camera optics placed in front of the sensor array cannot change the pixel-to-pixel behavior of the camera. So, the equalization sub-module is one of the calibration maps that may be derived directly from the sensor characterization.

In some embodiments, the second sub-module in the calibration module may be the radiometry sub-module. After equalization sub-module may be applied to the pixel values in the raw pixel array, for example, to achieve a uniform image, the pixel values for each pixel in the pixel array may remain undefined relative to the measured light. The radiometry sub-module may convert the raw pixel value to an irradiance value for each pixel with units of photons per second per square meter. Thus, after this radiometry calibration step, the amount of light that was received at each pixel in the pixel array is known.

In some embodiments, the processor 75 may not even detect any celestial image features in the image data. Nevertheless, the equalization and radiometry sub-modules in the calibration flow may apply the equalization and radiometry sub-module calibration tables to the pixel data as long as the name of the sensor generating image data, the integration time, and/or the sensor temperature from each specific satellite are known.

In some embodiments, a calibration map may be generated by applying the same algorithm to each pixel value of each pixel in the pixel array. The characterization may be done for each sensor individually, so each sensor may be characterized to derive its own map for each one. Again, the individual sensor may be characterized alone without the optics so as to provide the information to build the equalization maps.

In some embodiments, for the radiometry calibration sub-module, there may be no information from the sensor characterization done at first since the optics had not been included. However, a characterization of the performance of the optics may be needed for the other sub-modules of the calibration flow. The manufacturer of the imaging device may not have the material to perform the calibration for all the other aspects. For example, for the radiometry calibration, the manufacturer may not have a calibrated source to eliminate the full optics so that may be done during the commissioning phase with the stars. As a result, well monitored known stars and known their magnitudes as well as their known flux values may be used to derive the first map to perform the radiometry of the sensor.

In some embodiments, cross-sensor reference validation may be used to ensure that all sensors may be independent regardless of whether different facilities may be producing different sensors. The calibration strategy may be to remove impairments of different sensor types and/or different manufacturers.

In some embodiments, the calibration process may be finished in space, acquiring data using stars as calibration source, which may be done using visible and infrared stars, instead of using a well-defined calibration source for visible and infrared cameras. With an infrared camera, there may be no value of characterizing the sensor alone since the characterization including the optics may be needed. The unique calibration flow may be based in part on the way the characterization may be implemented, the way the update of the calibration maps may be performed, and the way the calibration maps are defined.

In some embodiments, geometric calibration may include two types of calibration maps. One type of calibration map may be related to the size of the stars or the profile of the stars that may be observed by the instrument. However, since the optics itself has impairments, the stars may not be imaged on a single pixel but may be spread across a few pixels. This spreading may be characterized during the commissioning phase, where the stars may be observed in different parts of the sensor image. The variation of the star image profile may be captured such that all of the profile of the star across the image may be characterized.

In some embodiments, the processor 75 may determine three calibration maps based on a star image profile changing across the full profile map. This information may be used by the algorithm to recognize and fit the profile of the star (e.g., star identification). Next, once the star is identified, a fit may be performed to the parameters to match the flux profile of the star and determine the full value of the flux provided by the star, since the flux is distributed over many pixels. Next the processor 75 may discriminate between the magnitude of the star and the magnitude of the background. The background may include any other source of light, such as for example, sunlight that may be diffused by the atmosphere in order to determine radiometric parameters, and eventually to perform the same with the RSO so as to get the proper magnitude of the RSO.

In some embodiments, the third sub-module of the calibration may be the point-spread function (PSF) sub-module. The fourth sub-module of the calibration is the distortion sub-module. Since the camera optics is not ideal so when the optics image a particular point in space, instead of the acquired image being centered in the pixel array, the image may be offset. Thus, this offset, or distortion offset may be corrected in each horizontal and vertical direction. Stated differently, for a perfect rectangle imaged without distortion correction by the camera may result in a rectangle that is not aligned on each side or slightly curved.

In some embodiments, the equalization calibration map may be based on the ground measurements whereas the three other calibration sub-modules: radiometry, profile and distortions sub-modules may be based on the instrument in flight. During the commissioning phase, the known stars may be used to build the first maps. After building the first full set of calibration, they may be applied to known and unknown objects. Based on performances over time, the calibration maps may be tracked for inaccuracies and whether changes are needed because. For example, for radiometry, any aging of the optics may result in a decrease in the amount of light that the camera is receiving. Thus, each parameter may be tracked so as to determine if the calibration map may need to be updated.

In some embodiments, a large FOV 22 may capture a lot of stars, which may be used as a calibration target on every image. There may be a cost of using the stars in the calibration because they may need to be measured. Astronomical computation may be needed in order to perform the astrometry and to convert the star images to the pixel right declination, right ascension and declination. So, on every image and observation that the system 700 performs, the processor 75 may be able to assess the quality control of the calibration with respect to calibration targets that are in the image, e.g., the stars. This may be used to certify that the calibration is valid on every image.

In some embodiments, the cost of having a wide field of view sensor may be in the more distortion created across the field of view that needs to be corrected. A least squares analysis may be performed as a very precise fitting algorithm and provides accurate results, but unfortunately, may be very computationally inefficient. However, to increase computational efficiency, the images may be calibrated first, so as to remove sensor artifact so as to provide the algorithms with a priori information to a least squares fit, which may be closer to actual measurements. When the near theoretical fit may be closer to actual measurements, not just at the center of the image but everywhere in the field of view, this may take into account any PSF effects as well. So, in order to use that the least squares algorithm in a computational efficient manner in using a wide field of view, the images need to be corrected and/or calibrated as much as possible in the image before applying the least squares analysis.

In some embodiments, this methodology may be further applied to the stars to extract the celestial coordinates for a particular object. When measuring the image directly, the pixel values may have distorted pixel locations that may need to be corrected using the distortion maps which is another output of the calibration process.

In some embodiments, the least squares analysis may also provide the covariance of the fitting parameters so as not provide only the uncertainty directly on the measurement but also how one variable may impact another. So, for example, an observation may be the right ascension and declination, which may normally have uncertainty, but may be compensated using the covariance. The least square algorithm may also adjust for the propagation of any errors in the models in order to preserve a fine measurement process. In the development of a fine measurement process, having a wide field of view may impose limitations in the number of pixels needed for detection. Each pixel images a region in the sky with respect to the precision of the measurement so sub-pixel precision may be needed. The least squares algorithmic approach described above facilitates sub-pixel accuracy but at the tradeoff of the need to add a signal that is distributed like a PSF so as to distribute each pixel slightly. The fine measurement process to minimize the cost of having a big field of view may account for this tradeoff, so as to provide a good fitting, but also account for the parametric covariance that may not be the most precise method for detecting the RSOs. The above described the process flow for a priori detection and measurement.

In some embodiments, using the position of stars in the plurality of images may enable the system to remap the position of pixels in the celestial image features and the coordinates of objects in each of the images. An object may be surrounded by stars in the images. The stars may typically not be objects of interest for detection, but they may be used for measurements and also to adjust the calibration of the image (e.g., to adjust the detection).

In some embodiments, star pattern matching does need information about where the FOV 22 of the image camera 20 may be pointing in space. Pointing information may be useful to speed up for pattern matching computations.

In some embodiments, a database of patterns may include triangle plots and/or every shape of interest may be used to analyze images. This database may be used to match configuration of stars in an image (shapes, like constellations but just shapes without names or myths), and to correlate them to patterns in databases to help positively identify stars. For a given image, pixel coordinates of the stars in the image may be input into the algorithm which may be configured to identify a star pattern match, such that stars in the image based on the pixels may be particular identified stars that may be used to build the maps and then view the photometry of the stars. The output of the algorithm may be two functions: one function may be to identify the RADEC as a function of pixel and one function may be to capture the integrated signal.

In some embodiments, the bright stars may be used by the processor 75 mostly for performing geometric corrections. The processor 75 may use the star pattern in the calibration images that may be overlaid with the stars with the image to be analyzed. Faint stars may be considered. The star pattern is typically not used for correcting the distortion since it has been previously corrected, but the star pattern may be used for performing image calibration validation. The star pattern may be used for astrometry, as if the image is not corrected. This helps to speed up the algorithmic compilation for finding the first calibration. The faint stars may also be used to readjust the calibration on each image to look at the residuals.

Note that the stars may move with relatively high velocity and may be captured as a very short line or streak in contrast to RSOs, which are closer to the imaging device and may generate longer streaks. However, the absolute geometrical position and location of the stars may be unknown.

In some embodiments, the processor 75 may clip the stars, and remove them from the image. The bright stars may be easier to detect which may provide higher confidence in an automated detection process, such that there is star detection without false positives, for example. The faint stars may also be required so as to obtain a more precise astrometry and more stable photometry as well. However, algorithmically, a threshold of a signal to noise ratio (SNR) may be used for bright star detection whereas a faint star detection may be based on a match filter.

In some embodiments, sometimes errors may arise in the radiometry calibration map. For example, processor 75 may be measuring stars over a predetermined time period such as a couple of weeks. For health monitoring to assess the quality of the calibration, if there may be some more positive errors than negative errors then some parameter in the calibration map may needed to be tuned to adjust the errors. When the calibration tables are completed, any discrepancies the calibration may be monitored. During the commissioning phase, data may be acquired to build and to check the calibration maps. Commissioning may be part of building the sensor and when the commissioning is done, so after a time period such as for example, three months, after the sensor is in flight, then the data may be evaluated.

In some embodiments, for a particular data acquisition mission, image data may be acquired of outer space while a particular satellite may be in orbit in dedicated timeslots. For example, each month or every three months, specific imagery may need to be reacquired to readjust the calibration.

In some embodiments, multiple images of the moon, for example, may be obtained by multiple imaging sensors that may generate multiple images of the moon with a very short period of time between the multiple images, which enables cross-sensor validation as well. Thus, knowledge of the position of one sensor with respect to another and what kind of artifact may be generated with respect to another one may be necessary. Since the multiple sensors all have substantially the same calibration method, they may be evaluated on the same comparison scale. Infrared cameras, visible cameras, UV camera, may be all corrected the same way and then a target in space may be used that are common to the sensors and then being able to assess the discrepancy between sensors.

In some embodiments, the calibration images may include stars registered in a Star Catalog and the calibration tables may be built based on these star images. But in processing a regular image, the stars and the Star Catalog may be needed for its calibration.

In some embodiments, a preprocessing step may be performed to increase contrast and removing artifacts using a sliding window technique to adjust the contrast and filter out artifacts in the image. The sliding window technique may be applicable for cosmic rays. In this technique, aside from the image and the pixel values, the technique may include the use of a pixel status variable that is carrying the information about the pixel. For example, when performing the characterization, this pixel may have been defective, for example, and not possible to characterize it. In this case, the pixel may be marked as defective, but during the processing of the calibration the pixel may be saturated because the star may be too bright, so if it is saturated, the pixel may be marked as defective and not used.

A cosmic ray event may be where the presence of electrons or protons crossing the detector with velocities close to the speed of light. The cosmic ray event may be just present on one image. Suppose for example a streak may be detected is an RSO. Then on an image, there may be two streaks so maybe there is two RSOs. Then when other images may be observed with the imaging devices on satellite, the RSO may be moving over the multiple images, but if just one streak may occur in one image and the streak may not be present on the other image, this may be a signature of a detected cosmic ray.

In some embodiments, when stars may be removed, there may be a residue of pixels, of bright pixels around the stars. When you compare one image to the next one and then the next one, the star may be substantially at the same place in the sky. When using the sliding window, cosmic ray streak may be on one image and not on the rest of them, so they may be removed easily.

In some embodiments, an RSO identification step may analyze different streaklets from one image representing different RSOs. So, in a set of the images, each having multiple streaklets, may include different streaklets of the same RSO. So, this step may group all these streaklets together in the set of images that may belong to the same object. All false positives may be removed because at the end of the detection and measurement, some false positives may happen at the lowest level.

In some embodiments, in the RSO identification step, the position in time of all the RSOs may be known and this information may be used to assess how the different RSOs behave so as to reconstruct the path of those streaklets in the images in time. This step provides a kind of time filtering process or time grouping for the image sets. This step may use the RADEC of many images such that the path of an RSO may be reconstructed. When two objects may be almost identical and close together, it may be hard to distinguish any identify the two separate RSOs. However, since there are two streaklet lines over multiple time series images, they may be separated into the two objects and identified. Using the time behavior of one object may be used to filter the object by triggering the match filtering. In other embodiments, a streak appearing in one image and not in a subsequent image in time may be indicative of a cosmic ray that may be filtered.

In some embodiments, a streaklet of a particular object from one image to the other may form a zigzagging line so continuity between images may be maintained. Images may be captured at one frame per second (FPS) capturing at one FPS with an integration time of one second, so between two images there are no gaps e.g., there is substantial overlap which may be used to put streaklets together. For example, for the case of very short integration times with bigger gaps such as 0.5 second integration time but with an FPS five seconds, there may be a gap of 4.5 seconds. During that time, the spacecraft may have instabilities in motion for example that may provide difficulties in putting the streaklets together.

In some embodiments, a size of the field of view may be chosen to be large enough to capture enough streaklets including objects closer to the imaging devices. This may cause many streaklets in a single image and in adjacent for an object that is very far, like in GEO orbit, for example. This effect may be used for filtering and minimizing false positives.

In some embodiments, there may be for example, about 90% to 95% feature coverage between adjacent image frames such that the background may not be changing significantly between images. Note that for example, a 90% feature coverage may refer to 90% of the features in a first image frame may appear in a second image frame, where the first image frame may be sequentially adjacent to the first. These streaklets in successive image frames may be concatenated for performing an identification process. The identification process may identify that a particular group of streaklets or a streak may be RSO N or RSO X, for example. In the a priori flow, streaklet characteristics such as for example, a streaklet shape, a streaklet intensity, a streaklet length, and/or a relative streaklet position in the image when in the presence of other streaklets may be leveraged for the detection process. In contrast to the identification process, the known position of an RSO may be used for a particular RSO or a group of RSOs that may be needed for orbital determination to rebuild or correct the orbital characteristic of the object from the data stored in the RSO catalog.

In some embodiments, to minimize theoretical errors in the position leverages the covariance matrix of a state vector that may represents some kind of confidence of the knowledge of its position and velocity of a particular RSO at the time of the image was captured. For example, if a particular RSO may be well known and previously documented, the modeling may predict that a particular RSO may be at a particular location within just a few arc seconds for instance, the algorithms may attempt to locate it in a particular region. However, for another object with more uncertainty of a few arc minutes instead of arc seconds, then the sphere to locate the object in space may need to be much bigger and wider.

In some embodiments, the algorithms may also compute the confidence of the timing with respect to the a priori flow. If the object may be close to the position where it is expected to be, if the uncertainty of the position of the object, the intensity of the object, the orientation of the object, the length of the object may be what it is expected to be (e.g., the more characteristics of the object), the higher the level of confidence of identifying the right object and the tagging process. Having a wider field of view with one or more streaklets may improve the identification and/or tagging confidence levels particularly when bonding streaklets together for multiple image streak processing. In contrast, an imaging camera having a small field of view when tracking an object, may yield an image that may include a dot for an RSO in which an RSO dot (e.g., instead of a streaklet) may be difficult to identify. Multiple images may still result in a dot which makes identification very difficult and may be missing additional streaklet confidence characteristics, such as, for example, streaklet position and magnitude, streaklet orientation, streaklet length, and/or streaklet time dependencies.

In some embodiments output data to train an algorithm for unknown RSO may be made with identification schemes having a high confidence level as in multiple image streak processing, so as to minimize the automated generation of false positives. Thus, if the algorithm uses machine learning algorithms, these algorithms may be trained more weight on the objects having high confidence levels that they may be RSOs. Similarly, the weight of objects that may not be RSO may be minimized so the deep learning algorithm may not be distorted.

In some embodiments, the identification algorithms may assign probabilities to a particular streaklet as to what a particular RSO may be. The more streaklet confidence characteristics used in the analysis, the higher the confidence level in the assigned probabilities.

In some embodiments, the confidence levels from the different streaklet confidence characteristics may be ranked. The orientation characteristic may be typically ranked. The use of the streaklet may be the most powerful algorithm for filtering. Depending on the uncertainty of the measurement of a particular streaklet, if the signal to noise ratio is very small then the covariance would be higher and the identification measurement may be less accurate.

In some embodiments, there may be two types of covariance: a covariance for the measurements, and the a priori flow for the identification process may also include its own covariance.

In some embodiments, the algorithm may have six parameters, for example, to fit. These six parameters may be represented as six vectors. The closer the theoretical model may be to the measured parameters, the dot product of the theoretical to measured parametric vectors nearly match because they will be nearly aligned (e.g., with nearly a zero angle between the two). If they are not aligned, few parameters in the a priori flow may be fit.

In some embodiments, as of today, there may be 30,000 objects in space being monitored regularly, with up to about a million objects that may not be tracked. These detections may be missed and uncorrelated. The streaklet features of these uncorrelated objects may be referred to as uncorrelated tracks (UCT).

In some embodiments, a method may include receiving, by at least one centralized computer processor of at least one centralized computer of a central computing processing arrangement, image data of each image from a plurality of images acquired by a plurality of imaging devices coupled to a plurality of satellites in orbit around a celestial body in at least one orbital plane; where the image data of each image from the plurality of images may include object features associated with at least one other celestial body, at least one resident space object (RSO), or any combination thereof located within a field of view (FOV) of the plurality of imaging devices that image at a predefined image acquisition rate, a volume of a sky as the FOV of at least one imaging device from the plurality of imaging devices on each satellite moves in one of the at least one orbital plane; where the object features may include at least one streak associated with the at least one RSO; inputting, by the at least one centralized computer processor, the image data for each image into a pre-processing software pipeline to generate for each image a contrast-enhanced image data replica of each image, and an enhanced image data replica of each image; where the contrast-enhanced image data replica of each image may include an increased contrast of the object features in each image to improve a correlation determination between candidate RSO feature data of the object features associated with at least one candidate RSO in each image and known RSO feature data of the object features associated with at least one known RSO stored in an RSO catalog; receiving, by the at least one centralized computer processor, from an output of a known-unknown RSO split data processing pipeline, a determination, based at least in part on temporal behavior of the at least one streak associated with the at least one candidate RSO in successive images in the plurality of images generated by the plurality of imaging devices that the at least one candidate RSO is: the at least one known RSO stored in the RSO catalog, or at least one unknown RSO absent from the RSO catalog; where the known-unknown RSO split data processing pipeline may include: a known object processing pipeline that outputs the determination using the contrast-enhanced image data replica of each image in the plurality of images, and an unknown object processing pipeline that outputs the determination by inputting the enhanced image data replica of each image in the plurality of images into at least one machine learning model trained to: group the object features into tracks based on the temporal behavior of the objects features in the successive images, determine a likelihood of the tracks being associated with at least one particular candidate RSO, and relay detection coordinates of the tracks into the known object processing pipeline to assess whether a particular candidate RSO from the at least one candidate RSO is a particular known RSO registered in the RSO catalog; and assigning, by the at least one centralized computer processor, based on the determination, one of: at least one RSO ID of the at least one known RSO listed in the RSO catalog to the at least one candidate RSO based on the determination that the at least one candidate RSO is the at least one known RSO, or at least one new RSO ID to the at least one candidate RSO for storage in the RSO catalog based on the determination that the at least one candidate RSO is the at least one unknown RSO.

In some embodiments, the receiving of the image data of each image may include decrypting, decompressing, or both, of raw image data of each image to generate the image data and associated metadata of each image.

In some embodiments, the associated metadata may include at least one of: a camera shutter open duration data, satellite system data, a sensor integration time data, or an acquisition timestamp data.

In some embodiments, the method may further include inputting, by the at least one centralized computer processor, the raw image data of each image into a find events software pipeline to determine, based at least in part on RSO data stored in the RSO catalog, at least one candidate RSO identification (ID) tag data and at least one timing data of the object features in each image associated with the at least one candidate RSO; inputting, by the at least one centralized computer processor, the at least one candidate RSO ID tag data, the at least one timing data, the raw image data, the associated metadata for each image into a calibration software pipeline that generates calibrated image data for each image for input into the pre-processing pipeline; where the calibration software pipeline may apply, on a pixel-by-pixel basis, a plurality of calibration data sets to each image to adjust for a plurality of image-capturing impairments; where the raw image data of each image from the plurality of images may include a plurality of pixel values for a respective plurality of pixels in a sensor array for each imaging device from the plurality of imaging devices; where each pixel value may be a digital count level; and where the calibration software pipeline may be configured to generate the calibrated image data for each image by applying the plurality of calibration data sets to each image to adjust for the plurality of image-capturing impairments that converts the digital count level to a photonic irradiance value for each pixel in the sensor array.

In some embodiments, the at least one candidate RSO ID tag data may include at least one of: at least one RSO tag of the at least one candidate RSO, at least one state vector of the at least one candidate RSO, or at least one photometric characteristic, at least one dynamic characteristic, or any combination thereof of the at least one candidate RSO.

In some embodiments, the plurality of calibration data sets may include: an equalization calibration data set, a radiometry calibration data set, a point-spread function calibration data set, or a distortion calibration data set.

In some embodiments, the known object processing pipeline may be configured to determine from detection coordinates of the at least one streak in the contrast-enhanced image data replica of each image, a centroid of the at least one streak image in each image; apply a fitting algorithmic pipeline to the centroid of the at least one streak to determine at least one object characteristic of the at least one streak in the contrast-enhanced image data replica of each image; and input coordinates of the at least one streak and the at least one object characteristic from each contrast-enhanced image data replica of each image from the successive images associated with the at least one candidate RSO into an identification pipeline that outputs a confidence level that the at least one candidate RSO matches the at least one known RSO in the RSO catalog, and provide the determination that the at least one candidate RSO is the at least one known RSO listed in the RSO catalog when the confidence level is greater than a predefined confidence threshold level. In other embodiments, the confidence levels may be normalized to a range of zero to one. The predefined confidence threshold level as defined herein may be in a range for example, from 0.50-1.00, 0.55-1.00, 0.60-1.00, 0.65-1.00, 0.70-1.0, 0.75-1.00, 0.80-1.00, 0.85-1.00, 0.90-1.00, 0.95-1.00, 0.98-1.00, or 0.99-1.0, or may be in a range, for example, from 0.5-1.0, 0.6-1.0, 0.7-1.0, 0.8-1.0, 0.9-1.0, where the higher the threshold, the higher the confidence level of the detection process.

In some embodiments, the at least one object characteristic of the at least one streak associated with the at least one candidate RSO may include at least one of: a streak brightness, a variability in streak brightness, a streak rotation rate of the at least one candidate RSO, a velocity associated with the at least one candidate RSO, a streak orientation, or a camera point spread function.

In some embodiments, the unknown object processing pipeline using as an input, the enhanced image data replica of each image inputted, may be configured to increase a probability of detecting the object features by distinguishing objects from an image background.

In some embodiments, the unknown object processing pipeline may be configured to determine the likelihood of the tracks being associated with the at least one particular candidate RSO by applying all of the tracks in images acquired by all of the plurality of imaging devices to neural network models to output the likelihood.

A system may include at least one non-transitory memory configured to store computer code; and at least one centralized computer processor of at least one centralized computer of a central computing processing arrangement; where the at least one centralized computer processor may be configured to execute the computer code that causes the at least one centralized computer processor to: receive image data of each image from a plurality of images acquired by a plurality of imaging devices coupled to a plurality of satellites in orbit around a celestial body in at least one orbital plane; where the image data of each image from the plurality of images may include object features associated with at least one other celestial body, at least one resident space object (RSO), or any combination thereof located within a field of view (FOV) of the plurality of imaging devices that image at a predefined image acquisition rate, a volume of a sky as the FOV of at least one imaging device from the plurality of imaging devices on each satellite moves in one of the at least one orbital plane; where the object features may include at least one streak associated with the at least one RSO; input the image data for each image into a pre-processing software pipeline to generate for each image: a contrast-enhanced image data replica of each image, and an enhanced image data replica of each image; where the contrast-enhanced image data replica of each image may include an increased contrast of the object features in each image to improve a correlation determination between candidate RSO feature data of the object features associated with at least one candidate RSO in each image and known RSO feature data of the object features associated with at least one known RSO stored in an RSO catalog; receive from an output of a known-unknown RSO split data processing pipeline, a determination, based at least in part on temporal behavior of the at least one streak associated with the at least one candidate RSO in successive images in the plurality of images generated by the plurality of imaging devices that the at least one candidate RSO is: the at least one known RSO stored in the RSO catalog, or at least one unknown RSO absent from the RSO catalog; where the known-unknown RSO split data processing pipeline may include: a known object processing pipeline that outputs the determination using the contrast-enhanced image data replica of each image in the plurality of images, and an unknown object processing pipeline that outputs the determination by inputting the enhanced image data replica of each image in the plurality of images into at least one machine learning model trained to: group the object features into tracks based on the temporal behavior of the objects features in the successive images, determine a likelihood of the tracks being associated with at least one particular candidate RSO, and relay detection coordinates of the tracks into the known object processing pipeline to assess whether a particular candidate RSO from the at least one candidate RSO is a particular known RSO registered in the RSO catalog; and assign based on the determination, one of: at least one RSO ID of the at least one known RSO listed in the RSO catalog to the at least one candidate RSO based on the determination that the at least one candidate RSO is the at least one known RSO, or at least one new RSO ID to the at least one candidate RSO for storage in the RSO catalog based on the determination that the at least one candidate RSO is the at least one unknown RSO.

In some embodiments, the at least one centralized computer processor may be configured to receive of the image data of each image by decrypting, decompressing, or both, of raw image data of each image to generate the image data and associated metadata of each image.

In some embodiments, the associated metadata may include at least one of: a camera shutter open duration data, satellite system data, a sensor integration time data, or an acquisition timestamp data.

In some embodiments, the at least one centralized computer processor may be configured to input the raw image data of each image into a find events software pipeline to determine, based at least in part on RSO data stored in the RSO catalog, at least one candidate RSO identification (ID) tag data and at least one timing data of the object features in each image associated with the at least one candidate RSO; input the at least one candidate RSO ID tag data, the at least one timing data, the raw image data, the associated metadata for each image into a calibration software pipeline that generates calibrated image data for each image for input into the pre-processing pipeline; where the calibration software pipeline may apply, on a pixel-by-pixel basis, a plurality of calibration data sets to each image to adjust for a plurality of image-capturing impairments; where the raw image data of each image from the plurality of images may include a plurality of pixel values for a respective plurality of pixels in a sensor array for each imaging device from the plurality of imaging devices; where each pixel value may be a digital count level; and where the calibration software pipeline may be configured to generate the calibrated image data for each image by applying the plurality of calibration data sets to each image to adjust for the plurality of image-capturing impairments that converts the digital count level to a photonic irradiance value for each pixel in the sensor array.

In some embodiments, the at least one candidate RSO ID tag data may include at least one of: at least one RSO tag of the at least one candidate RSO, at least one state vector of the at least one candidate RSO, or at least one photometric characteristic, at least one dynamic characteristic, or any combination thereof of the at least one candidate RSO.

In some embodiments, the plurality of calibration data sets may include: an equalization calibration data set, a radiometry calibration data set, a point-spread function calibration data set, or a distortion calibration data set.

In some embodiments, wherein the known object processing pipeline may be configured to determine from detection coordinates of the at least one streak in the contrast-enhanced image data replica of each image, a centroid of the at least one streak image in each image; apply a fitting algorithmic pipeline to the centroid of the at least one streak to determine at least one object characteristic of the at least one streak in the contrast-enhanced image data replica of each image; input coordinates of the at least one streak and the at least one object characteristic from each contrast-enhanced image data replica of each image from the successive images associated with the at least one candidate RSO into an identification pipeline that outputs a confidence level that the at least one candidate RSO matches the at least one known RSO in the RSO catalog, and provide the determination that the at least one candidate RSO is the at least one known RSO listed in the RSO catalog when the confidence level is greater than a predefined confidence threshold level. In other embodiments, the confidence levels may be normalized to a range of zero to one. The predefined confidence threshold level as defined herein may be in a range for example, from 0.50-1.00, 0.55-1.00, 0.60-1.00, 0.65-1.00, 0.70-1.0, 0.75-1.00, 0.80-1.00, 0.85-1.00, 0.90-1.00, 0.95-1.00, 0.98-1.00, or 0.99-1.0, or may be in a range, for example, from 0.5-1.0, 0.6-1.0, 0.7-1.0, 0.8-1.0, 0.9-1.0, where the higher the threshold, the higher the confidence level of the detection process.

In some embodiments, the at least one object characteristic of the at least one streak associated with the at least one candidate RSO may include at least one of: a streak brightness, a variability in streak brightness, a streak rotation rate of the at least one candidate RSO, a velocity associated with the at least one candidate RSO, a streak orientation, or a camera point spread function.

In some embodiments, the unknown object processing pipeline using as an input, the enhanced image data replica of each image inputted, may be configured to increases a probability of detecting object features by distinguishing objects from an image background.

In some embodiments, the unknown object processing pipeline may be configured to determine the likelihood of the tracks being associated with the at least one particular candidate RSO by applying all of the tracks in images acquired by all of the plurality of imaging devices to neural network models to output the likelihood.

Figure 25:
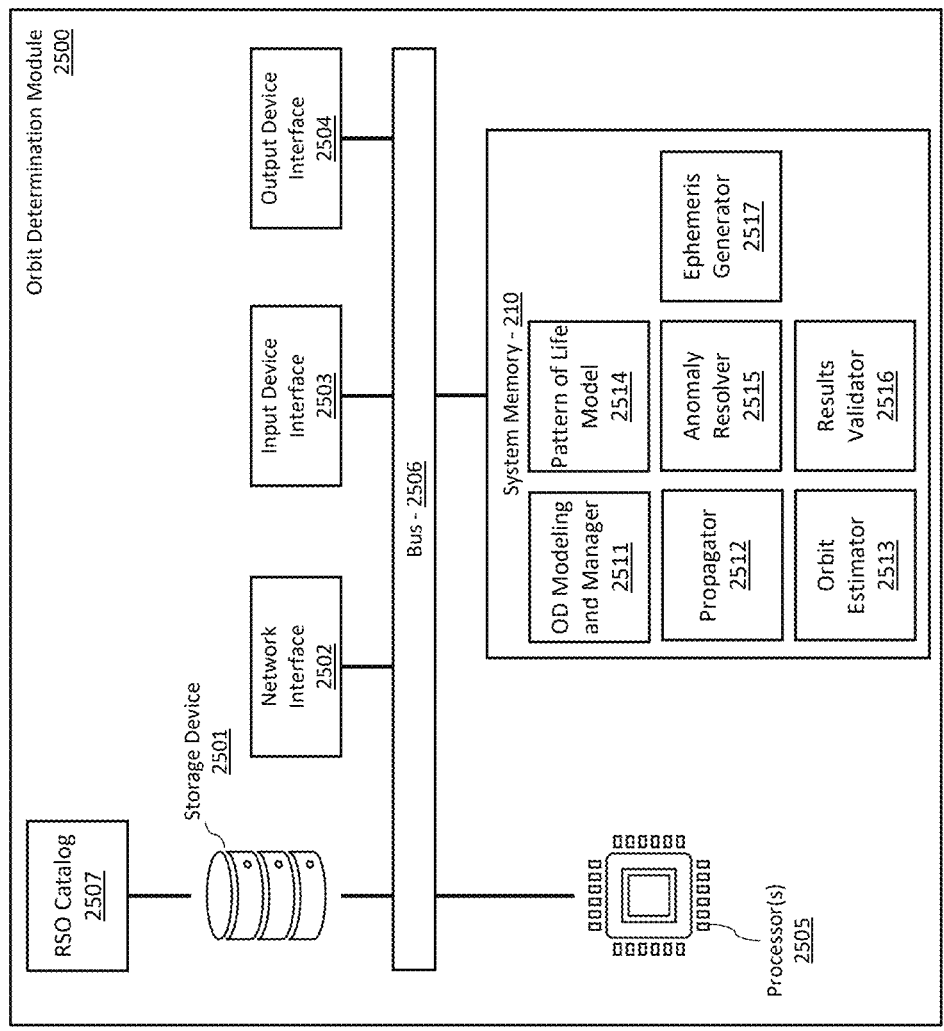

Referring now to FIG. 25, a schematic diagram of an orbit determination system for propagating and estimating and validating orbits is depicted in accordance with one or more embodiments of the present disclosure.

In some embodiments, an orbit determination module 2500, such as the orbit determination module 720 detailed above, may use observation data of an RSO to configure an orbit determination pipeline 2600 for orbit determination of the RSO, which may be validated against a pattern-of-life for the RSO, including the generation of an alert for anomalous orbital behavior. Accordingly, the orbit determination module 2500 may include one or more hardware and/or software components (collectively referred to as "computer engines") to orbital determination (OD) manager 2511 for configuring the orbital determination process, propagator 2512, e.g., which may be implemented by the propagation module 730 as detailed above, to propagate states across projected positions, orbit estimator 2513 of the RSO, apply a pattern of life model 2514 for input to a results validator 2516 and perform anomaly resolution with an anomaly resolver 2515, and to generate ephemeris with an ephemeris generator 2517 for the estimated and validated orbit. In some embodiments, the OD Modeling and Manager 2511 enables application of optimized algorithms for propagation and orbit estimation for improved accuracy and efficiency, while the pattern of life model 2514 enables improved validation of an estimate orbit through learned patterns of orbital behaviors of the RSO. For example, in some embodiments, the OD Modelling and Manager 2511 may be configured the orbit determination pipeline 2600 by incorporating a configuration of environment models (e.g., for use in a propagator, integrator or both), sensor/observation characteristics and/or models, among other characteristics, features, attributes, variables, models and functions in a pipeline for orbit determination.

In some embodiments, the computer engines may include software stored in a system memory 2508 of the orbit determination module 2500. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the orbit determination module 2500 may include hardware elements embodied in one or more computing devices. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the orbit determination module 2500 may include hardware components such as a processor 2505, which may include local or remote processing components. In some embodiments, the processor 2505 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 2505 may include data-processing capacity provided by the microprocessor. In some embodiments, the microprocessor may include memory, processing, interface resources, controllers, and counters. In some embodiments, the microprocessor may also include one or more programs stored in memory.

Similarly, the orbit determination module 2500 may include storage device(s) 2501, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage device(s) 2501 may include, e.g., a suitable non-transient computer readable medium such as, e.g., random access memory (RAM), read only memory (ROM), one or more buffers and/or caches, among other memory devices or any combination thereof.

In some embodiments, the orbit determination module 2500 may take the form of one or more computing devices, such as a personal computing device, server, cloud platform, distributed processing system, among others or combinations thereof. In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), by software running on one or more real machines (e.g., allowing to be moved around and scaled up (or down) on the fly without affecting the end user). The aforementioned examples are, of course, illustrative and not restrictive.

In some embodiments, the orbit determination module 2500 may include a network interface 2502 for connecting to one or more networks. In some embodiments, the network may include any suitable computer network, including, two or more computers that are connected with one another for the purpose of communicating data electronically. In some embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, the orbit determination module 2500 may include one or more input device interface(s) 2503 and/or output device interface(s) 2504 for sending and receiving data with other systems and/or devices, including computer peripherals (e.g., keyboard, mouse, display, augmented reality (AR) and/or virtual reality (VR) headset, etc.), storage devices 2501 including local and/or remote storage (e.g., hard drive, solid state drive, network attached storage, flash drive, thumb drive, cloud platform, server, another computing device, etc.) among other devices and/or systems or any combination thereof. For example, an administrator terminal computing device may interact with the orbit determination module 2500 via the input device interface 2503 and/or output device interface 2504 to allow an administrator to diagnose and address bugs, load configurations, install programs, onboard databases, etc.

In some embodiments, the system memory 2510, processor(s) 2505, storage device(s) 2501, network interface 2502, input device interface 2503 and/or output device interface 2504, among other hardware and/or software components of the orbit determination module 2500 may interact and communicate via a bus 2506. In some embodiments, the bus may include any suitable communication system that transfers data between components inside the computer system, include an internal data bus, memory bus, system bus, address bus, front-side bus, or other internal bus or any combination thereof. In some embodiments, examples of the bus may include, e.g., PCI express, small computer system interface (SCSI), parallel AT attachment (PATA), serial AT attachment (SATA), HyperTransport™, InfiniBand™, Wishbone, Compute Express Link (CXL), among others or any combination thereof.

In some embodiments, an RSO observation may be ingested by the orbit determination module 2500 and processed to output orbital ephemeris for the RSO that incorporates pattern of life analysis for validation and anomaly detection. The RSO observation may include, e.g., a current observation of an RSO (e.g., data from a detected object by a space-based and/or ground-based imaging device/system) and/or historical observation data. Observation data may include, e.g., data defining a state of the RSO ("RSO state").

In some embodiments, the RSO state may be defined, e.g., by the OD Modeling and Manager 2511, including, e.g., orbit parameters and/or RSO physical characteristics (e.g., mass and/or geometry). In some embodiments, the orbit parameters may include, e.g., equinoctial orbit parameters (a, ex, ey, hx, hy, $\lambda M$ or $\lambda E$ or $\lambda v$) in meters and radians, Keplerian orbit parameters (a, e, i, $\omega$, $\Omega$, M or E or v) in meters and radians, circular orbit parameters (a, ex, ey, i, $\Omega$, $\alpha M$ or $\alpha E$ or $\alpha v$) in meters and radians, and/or Cartesian orbit parameters (x, y, z, vx, vy, vz) in meters and meters per seconds. In some embodiments, default propagation settings may utilize in equinoctial parameters with a true longitude argument. In some embodiments, where the OD Modeling and Manager 2511 may or may not explicitly specify the central attraction coefficient, the one used to define the initial orbit may be used.

Thus, in some embodiments, an RSO catalog 2507 may store data and/or characteristics of each known RSO, including historical states, ephemerides, orbits, etc. In some embodiments, the RSO catalog 2507 may include a locally and/or externally sourced repository of RSO's, such as, e.g., North American Aerospace Defense Command (NORAD), Northstar Earth & Space, space-track.org, L3Harris, or other situational space awareness (SSA) supplier or any combination thereof.

In some embodiments, the propagator 2512 may query the storage device(s) 2501 to access the RSO catalog 2507 and load the RSO data for the observed RSOs for orbit propagation. In some embodiments, the propagator 2512 may employ one or more numerical and/or analytical techniques to propagate the state vectors of each satellite based on the satellite configuration data in parameters of each RSO, including, e.g., the respective TLE/state vectors, and/or RSO mass and/or geometry, among other parameters or any combination thereof.

For example, the propagator 2512 may include numerical propagation, such as, e.g., Keplerian or Eckstein-Hechler, Newton's method, conic orbits, patch conic approximation, universal variable formulation, perturbations, or other propagation determination technique or any combination thereof. In some embodiments, numerical propagation may be more accurate than analytical propagation, but may employ more steps to set up to be used properly. Whereas analytical propagators are configured only thanks to their various constructors and can be used immediately after construction, numerical propagators configuration involve setting several parameters between construction time and propagation time.

In some embodiments, the propagator 2512 may utilize iterative physics-based algorithms to predict a future state based on an initial object state of the RSO. Such algorithms may include, e.g., Bayesian inferencing, Monte-Carlo Modelling, Extended Kalman Filtering (EKF), adaptive robust (AR) Kalman Filter (ARKF), or other suitable iterative approach. In some embodiments, the iterative physics-based algorithm, such as an EKF estimator, may generate sequential predictions of both the RSO state and its uncertainty (e.g., covariance).

In some embodiments, the orbit determination module 2500 may utilize the historical states of the RSO in the RSO catalog 2507 as a mechanism to detect maneuvers or other changes of behavior by the observed RSO. Thus, the propagator 2512 may set the initial state of the RSO to be the most recent historical state of the RSO such that the propagator 2512 may propagate the state of the RSO to the observation time of the observation of the RSO. As a result, the measurements in the observation of the observed RSO may be checked against the propagated state to enable the orbit determination module 2500, e.g., using the results validator 2516 as detailed below, to test whether the observed RSO moving according to its expected orbit, as represented by the propagated state.

In some embodiments, the OD Modeling and Manager 2511 may define propagation parameters, among other parameters for each orbital regime (e.g., LEO, MEO, GEO, among others or any combination thereof). Thus, the OD Modeling and Manager 2511 may establish parameters for the propagator 2512 to optimize the orbit determination pipeline 2600 to the RSO based on the orbital regime of the RSO. Accordingly, the storage device(s) 2501, upon query, may return orbital regime-specific parameters and/or RSO-specific parameters (e.g., geometric and other physical characteristics).

For example, configuration parameters for the propagation may include, e.g., a coefficient of drag for the RSO, solar radiation pressure coefficient, an RSO 3D model, atmospheric density model (coefficients, reference altitude/density pairs, temporal/seasonal factors, etc.), gravitational coefficients (spherical harmonic coefficients), an initial RSO state based on an observation and/or a most recent historical state for the RSO in an RSO catalog 2507, a central attraction coefficient, one or more force models, a type of orbital parameters to be used for propagation, a type of position angle to be used in orbital parameters to be used for propagation where it is relevant, whether state transition matrices and Jacobians matrices should be propagated along with orbital state, whether additional derivatives should be propagated along with orbital state, discrete events that should be triggered during propagation, a binding logic with the rest of the application, among others or any combination thereof.

In some embodiments, to enable accurate propagation of states, the RSO data of the RSO catalog 2507 may include RSO parameters for each RSO. For example, RSO parameters for the propagation may include, e.g., an initial RSO state, a central attraction coefficient, one or more force models, a type of orbital parameters to be used for propagation, a type of position angle to be used in orbital parameters to be used for propagation where it is relevant, whether state transition matrices and Jacobians matrices should be propagated along with orbital state, whether additional derivatives should be propagated along with orbital state, discrete events that should be triggered during propagation, a binding logic with the rest of the application, among others or any combination thereof.

In some embodiments, the propagator 2512 may include an underlying numerical integrator, set up in the OD Modeling and Manager 2511 which may also have its own configuration parameters. In some embodiments, configuration parameters for adaptive step-size integrators may include a minimum, maximum, a start step size, one or more absolute and/or relative errors thresholds, among others or any combination thereof.

Thus, in some embodiments, the RSO catalog 2507 and RSO parameters may establish the input parameters for the propagator 2512 for each RSO. Based on the data of each RSO, the propagator 2512 may output a series of state vectors and covariances (e.g., as represented in one or more covariance matrices) to generate the ephemerides for the propagation period that define position, trajectory and covariances at one or more propagation steps ("epochs").

In some embodiments, based on the state vector(s), the orbit estimator 2513 may determine an orbit of the observed RSO. In some embodiments, the orbit may be characterized, as detailed above, by, e.g., equinoctial orbit parameters (a, ex, ey, hx, hy, $\lambda M$ or $\lambda E$ or $\lambda v$) in meters and radians, Keplerian orbit parameters (a, e, i, $\omega$, $\Omega$, M or E or v) in meters and radians, circular orbit parameters (a, ex, ey, i, $\Omega$, $\alpha M$ or $\alpha E$ or $\alpha v$) in meters and radians, and/or Cartesian orbit parameters (x, y, z, vx, vy, vz) in meters and meters per seconds.

In some embodiments, to estimate the orbit of the observed RSO from historical, initial and/or propagated state vectors, the orbit estimator 2513 may employ one or more orbit estimation algorithms. The RSO's state vector can be used to compute its classical or Keplerian orbital elements and vice versa. The elements are more descriptive of the size, shape and orientation of an orbit, e.g., inclination, Right Ascension of the Ascending Node (RAAN), right ascension and declination (RADec), eccentricity, argument of perigee, among others or any combination thereof. The elements may be used to quickly and easily estimate the RSO's state at any arbitrary time provided its motion is accurately modeled by the two-body problem with only small perturbations. In some embodiments, the state vector is directly useful in a numerical integration that accounts for time-varying forces such as drag, thrust and gravitational perturbations from third bodies as well as the gravity of the primary body.

In some embodiments, the orbit estimator 2513 may apply a cost function to refine the state vector(s), both observed and/or propagated, to better fit, e.g., historical state vectors from the RSO catalog 2507 and/or historical orbital elements. For example, the orbit estimator 2513 may employ, e.g., least squares, batch least squares, sequential batch least squares, Kalman filter, extended Kalman filter, unscented Kalman filter, ARKF among others or any combination thereof.

Applying the orbit estimator 2513 to an RSO's state vector(s) with associated covariances may generate the orbit including orbit parameters such as the full state vector of the RSO, e.g., as an initial time, at a final time, throughout a period defined by the initial time and final time (the propagation period), or any time or period between the initial and final times, or any combination thereof. In some embodiments, the initial time, the final time or both may be prior to a current time (e.g., in the past), after the current time (e.g., in the future) or may including a combination of the past and future times. In some embodiments, the orbit parameters may include, e.g., position, velocity, acceleration, among other coefficients (biases) or any combination thereof.

For example, in some embodiments, as a result of the orbit estimation algorithm(s), the orbit estimator 2513 may output the orbital parameters, e.g., position, velocity, acceleration, perturbations coefficients, estimate values, covariance, orbit parameters, among others or nay combination thereof. In some embodiments, the orbit parameters and state vectors and covariances may be fused to produce, e.g., two-line elements (TLEs) representing the orbital parameters, state vectors or any combination thereof.

In some embodiments, the measured state of the observed RSO as per the observation may be validated against the orbit of the RSO, as estimated by the orbit estimator 2513 to detect a maneuver event whereby the observed RSO deviates from its previous trajectory. Based on such deviation, the maneuver event may be validated against a pattern of life of the RSO according to the historical data of the RSO in the RSO catalog. To do so, the orbit determination module 2500 may apply a pattern of life model 2514 to learn patterns of movement of the RSO based on historical observations of the RSO, including, e.g., historical state vectors, historical positions, historical trajectories, among others, or any combination thereof.

In some embodiments, the pattern of life model 2514 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i. define Neural Network architecture/model,
  ii. transfer the input data to the exemplary neural network model,
  iii. train the exemplary model incrementally,
  iv. determine the accuracy for a specific number of timesteps,
  v. apply the exemplary trained model to process the newly-received input data,
  vi. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the propagator 2512 and orbit estimator 2513 may determine an orbit for the RSO based on an observation of the RSO at a particular time. However, there may be a period of time that elapses until a next observation, and thus the RSO moves during that period of time, where the movement may or may not conform to the determined orbit. A pattern of life learned from historical observations of the RSO may enable the orbit determination module 2500 to fill in the behavior of the RSO during the period of time where the RSO is not being observed. Thus, the pattern of life may predict behavior of the RSO in the period of time, validate behavior before, during and/or after the period of time, identify anomalous behaviors, among other improvements or any combination thereof.

Thus, in some embodiments, the pattern of life of the RSO may include, e.g., conformity to a particular orbital track, deviation from a particular orbital track, periodic changes in trajectory and/or velocity, magnitude(s) of periodic changes in trajectory/velocity, frequency of periodic changes in trajectory/velocity, among other behaviors and/or movements or any combination thereof. In some embodiments, because the RSO catalog 2507 includes the historical behaviors of the RSO, the pattern of life model 2514 may implement one or more unsupervised learning models that are trained based on the historical data to predict one or more features of the state of the RSO in a future prediction period. The one or more features may include a time, duration, magnitude, trajectory, velocity, or other behavior of the RSO or any combination thereof.

Figure 27:
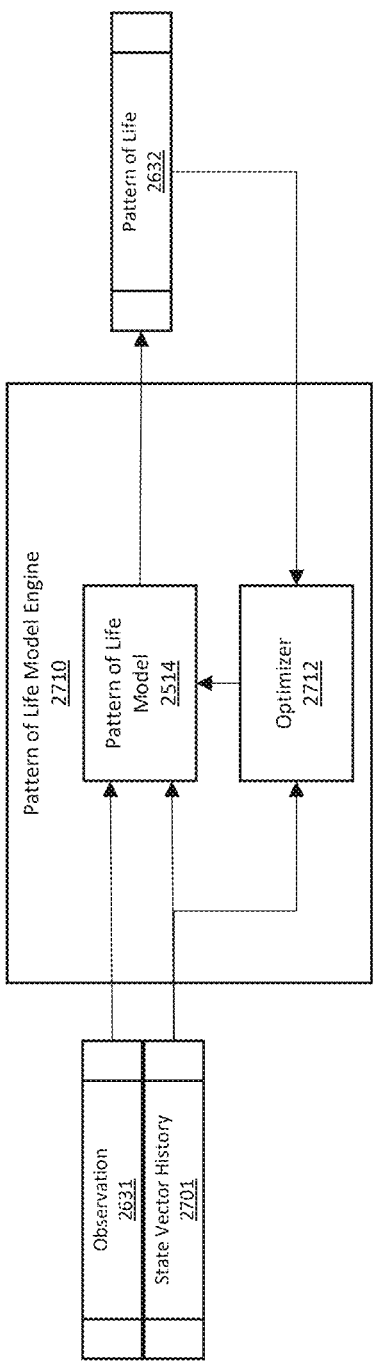

In some embodiments, the pattern of life model 2514 may include one or more unsupervised machine learning models for pattern recognition and/or prediction. Accordingly, the pattern of life model 2514 may access the history of states of the observed RSO in the RSO catalog 2507 to learn a pattern of the states for the observed RSO. In some embodiments, the history of states may include state vectors and/or other data (e.g., space environment data, two-line elements, etc.) associated with each historical observation of the detected RSO at previous epochs. The state vectors and/or other data may be encoded into one or more feature vectors representing the data through time. In some embodiments, as depicted in FIG. 27, a pattern of life model engine 2710 may ingest the feature vector(s) and apply the pattern of life model 2514 generate an output indicative of the pattern of life.

In some embodiments, the pattern of life may include a prediction of a confidence score indicating a degree of confidence that the observation conforms to the historical behavior of the observed RSO as per the history of states, e.g., based on a pattern recognition methodology. To do so, the pattern of life model 2514 may ingest a feature vector encoding the observation (e.g., the as-measured state at observation time of the observed RSO) and predict the confidence score that indicates that a likelihood that the observation matches the pattern of behavior of the observed RSO, and thus is performing an expected maneuver.

Alternatively or additionally, in some embodiments, by learning the pattern of life using the pattern of life model 2514 and historical observations, expected behaviors of the RSO, including orbit keeping and other maneuvers can be predicted. Accordingly, in some embodiments, the determined orbit of the RSO may be validated based on whether the determined orbit matches the pattern of life. Thus, in some embodiments, the results validator 2516 may compare the feature(s) predicted by the pattern of life model 2514 to the orbital parameters and/or state vector determined by the propagator 2512 and the orbit estimator 2513. In some embodiments, the results validator 2516 may compare state vector data produced for the RSO to the feature(s) of the pattern of life to determine whether the RSO is behaving in a way that matches the pattern of life. In some embodiments, the comparison may include, e.g., a difference in a predicted position and the position of the state vector, a difference in the velocity/trajectory according to the pattern of life and the velocity/trajectory of the state vector, among other differences or any combination thereof.

In some embodiments, the results validator 2516 may generate a similarity metric to quantify the difference(s). In some embodiments, the similarity metric may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same. In some embodiments, similarity may be measured between each individual attribute separately, and the respective similarity scores summed, averaged, or otherwise combined to produce a measure of similarity of the pattern of life and the determined orbit.

In some embodiments, based on the similarity metric, the results validator 2516 may determine a confidence score indicative of the confidence against historical observations of the RSO that the determined orbit is correct. In some embodiments, the confidence score may be a classification according to thresholds of the similarity metric, such as, e.g., high, medium and low, or other set of classifications. In some embodiments, the confidence score may include a machine learning based classification, e.g., based on the similarity metric, the feature(s) of the pattern of life, the state vector of the RSO, the ephemeris of the RSO, the orbit parameters of the RSO, among others or any combination thereof. In some embodiments, the machine learning based classification may be generated by a machine learning model trained on historical pattern of life comparisons, e.g., in a supervised or unsupervised training paradigm.

In some embodiments, the similarity metric may include a matrix of values representing similarity to inputs from, e.g., the pattern of life 2632 and/or the orbit estimator 2513 detailed above. The pattern of life defines the expected orbit perturbations as a function of time due to the past observed history of maneuvers for orbit maintenance, routine satellite operations, and past conjunction avoidance maneuvers. Comparing the current orbit estimation with the pattern data provides additional insight into whether an unexpected orbit solution is more likely to be due to a routine deviation, an anomalous deviation, or possibly an incorrect orbit solution. Accordingly, a similarity may be calculated between the current orbit estimation each the pattern of life 2632 such that confidence relative to one or more past orbit perturbations can be assessed.

In some embodiments, where the confidence score falls below or is equal to a predetermined threshold value, the result validator 2516 may add and/or modify a validation tag of the orbit indicating that the determined orbit is not validated. A not validated orbit may include a determined orbit that does not exhibit the feature(s) of the pattern of life, such as a particular behavior of the RSO at a particular time according to the frequency and/or magnitude of trajectory/velocity changes, or other unexpected behaviors and/or changes in behaviors based on the historical data of the RSO.

In some embodiments, where the confidence score exceeds or is equal to the predetermined threshold value, the results validator 2516 may add and/or modify the validation tag to indicate that the determined orbit is validated. Thus, where the confidence score exceeds or is equal to the predetermined threshold value, the determined orbit may be identified as exhibiting a behavior that matches the pattern of life of the RSO.

In some embodiments, an illustrative example of an RSO's pattern of life may be a spacecraft that periodically performs orbital maneuvers. The orbital maneuvers may be regular maneuvers that occur at a regular frequency with a pattern in change in magnitude and orientation of a velocity of the RSO. Thus, when the RSO departs from such patterns, indicating an unexpected maneuver or a lack of an expected maneuver, determined orbit for the RSO may be deemed not validated due to low confidence in view of the pattern of life.

In some embodiments, a not validated orbit may be indicative of an anomaly in the determined orbit that represents an erroneous orbit determinations process, a change to the behavior of the RSO, or both. Thus, the results validator 2516 may generate an anomaly alert to alert a user, such as an administrator or other user, to the anomalous orbit.

In some embodiments, additionally or alternative, upon a not validated determination, the results validator 2516 may pass the determined orbit, including the not validated tag, to an anomaly resolver 2515. In some embodiments, the anomaly resolver 2515 may include one or more manual and/or automated tools for address the anomalous behavior of the RSO. For example, in some embodiments, the anomaly resolver 2515 may determine an error between the pattern of life of the RSO and the determined orbit, and backpropagate the error to the OD Modeling and Manager 2511 to update parameters of the orbit determination pipeline 2600 for the observed RSO. In some embodiments, the anomaly resolver 2515 may determine the error based at least in part on an error function such as, e.g., Hinge Loss, Multi-class SVM Loss, Cross Entropy Loss, Negative Log Likelihood, or other suitable loss function.

In some embodiments, for anomaly resolution, the Results validator 2516 may provide the anomaly resolver 2515 with three factors: whether the orbit solution converged, how large the residuals of the orbit solution are, and how well the orbit solution fits with past data. The results validator 2516 may compare each factor, among others or any combination thereof, to one or more threshold values in order to validate the orbit solution. In some embodiments, in order for the results validator 2516 to validate the orbit solution, all three factors may be required to meet the threshold value(s). In some embodiments, in order for the results validator 2516 to validate the orbit solution, a combination of the three factors may be required to meet the threshold value(s). In some embodiments, in order for the results validator 2516 to validate the orbit solution, any combination of combined and/or individual factors may be required to meet the threshold value(s). For example, where no convergence is reached, the anomaly resolver 2515 may instruct for the orbit determination pipeline to be rerun, e.g., with a larger covariance or with outlier measurements filtered out, or both, among other adjustments to the orbit determination pipeline 2600 parameters implemented of the OD Modeling and Manager 2511 or any combination thereof. In some embodiments, such adjustments may be performed automatically, e.g., according to predetermined rules, algorithms and/or machine learning.

In some embodiments, the anomaly resolver 2515 may include, e.g., a dashboard on a user interface to display to the user the determined orbit for the observed RSO, the pattern of life, the deviation from the pattern of life, historical state vectors for the observed RSO, among other data or any combination thereof. Thus, the user, such as a data scientist or analyst, may review the anomaly and act on the anomaly. For example, the dashboard may provide user interface elements including selectable options to change aspects of the determined orbit, orbit determination pipeline 2600 parameters implemented by the OD Modeling and Manager 2511, among other actionable selections or any combination thereof. For example, an operator may change initial conditions to see if the result improves. If the solution converges but does not fit with expected behavior, and operator may act on the information and/or send an alert. In some embodiments, the dashboard may provide a user selectable element to generate and send the alert notifying of the anomaly to an entity computing device via the output device interface 2504 and/or network interface. In some embodiments, the entity computing device may include a computing device associated with an entity that is associated with the observed RSO, a spacecraft in a vicinity of the observed RSO, a spacecraft for which conjunction with the observed RSO is expected, an RSO tracking or publication service, among other entities or any combination thereof.

In some embodiments, where the determined orbit of the observed RSO is validated, the orbit parameters and/or state vector(s) may be output as a state vector product. In some embodiments, the state vector product may include, e.g., a data object encoding the state vector(s) produced by the orbit estimator 2513 and the validation tag produced by the results validator 2516.

In some embodiments, the state vector product may be input into an ephemeris generator 2517 to generate ephemeris indicative of an orbit of the observed RSO into a future period of time ("prediction period"). In some embodiments, the ephemeris generator 2517 may use the state vector of the observed RSO to forward propagate the state vector and covariance over time.

In some embodiments, similar to the propagator 2512 and/or orbit estimator 2513, as detailed above, the ephemeris generator 2517 may employ one or more numerical and/or analytical techniques to propagate the state vectors of for the RSO based on the RSO data. In some embodiments, to enable accurate propagation of ephemerides, ephemeris configuration parameters may be loaded form the OD Modeling and Manager 2511. For example, ephemeris configuration parameters may include, e.g., a central attraction coefficient, one or more force models, a type of orbital parameters to be used for propagation, a type of position angle to be used in orbital parameters to be used for propagation where it is relevant, whether state transition matrices and Jacobians matrices should be propagated along with orbital state, whether additional derivatives should be propagated along with orbital state, discrete events that should be triggered during propagation, a binding logic with the rest of the application, among others or any combination thereof.

In some embodiments, the ephemeris generator 2517 may include an underlying numerical integrator, set up in the OD Modeling and Manager 2511 which may also have its own configuration parameters. In some embodiments, configuration parameters for adaptive step-size integrators may include a minimum, maximum, a start step size, one or more absolute and/or relative errors thresholds, among others or any combination thereof.

In some embodiments, based on the ephemerides, the ephemeris generator 2517 may determine a future orbit of the observed RSO using the state vector associated with the observation. In some embodiments, to estimate the orbit of the observed RSO, the ephemeris generator 2517 may employ one or more orbit estimation algorithms. In some embodiments, the ephemeris generator 2517 may apply a cost function to refine the state vector(s), both observed and/or propagated, to better fit, e.g., historical state vectors from the RSO catalog 2507 and/or historical orbital elements. For example, the ephemeris generator 2517 may employ, e.g., least squares, batch least squares, sequential batch least squares, Kalman filter, extended Kalman filter, unscented Kalman filter, ARKF among others or any combination thereof.

In some embodiments, the ephemeris generated by the ephemeris generator 2517 may be output via an ephemeris data object, including an ephemeris product. In some embodiments, the ephemeris product may include, e.g., one or more two-line elements, a set of state vectors corresponding to the propagated state vectors, the covariance(s) of the propagated state vectors, the validation tag, among other data or any combination thereof.

In some embodiments, the orbit determination module 2500 may publish the ephemeris product via an orbit data message. In some embodiments, the orbit data message may include an electronic message including attributes representative of the orbital parameters, state vector, validation tag, etc. of the determined orbit for the observed RSO. For example, the orbit data message may include, e.g., a CCSDS-recommended message type, such an orbit parameter message (OPM), an orbit mean-elements message (OMM), an orbit ephemeris message (OEM), or other message type or any combination thereof.

In some embodiments, the orbit determination module 2500 may send the orbit data message to a remote entity computing device associated with the entity, e.g., via a network using the network interface 2502. In some embodiments, the network may include any suitable computer network, including, two or more computers that are connected with one another for the purpose of communicating data electronically. In some embodiments, the network may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, the network interface 2502 may include one or more software interfaces, such as, e.g., Common Object Request Broker Architecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

In some embodiments, the network interface 2502, the input device interface 2503 and/or the output device interface 2504 may utilize one or more hardware computing interface technologies, such as, e.g., Universal Serial Bus (USB), IEEE 1394 (FireWire), Ethernet, Thunderbolt™, Serial ATA (SATA) (including eSATA, SATAe, SATAp, etc.), among others or any suitable combination thereof.

In some embodiments, where the determined orbit is validated based on the pattern of life, the orbit determination module 2500 may generate the orbit data message including the validation tag set to validated. In some embodiments, where the determined orbit is not validated based on the pattern of life, the orbit determination module 2500 may generate the orbit data message including the validation tag set to not validated. In some embodiments, the orbit determination module 2500 may publish the orbit data message, whether validated or not, including, e.g., RSO ephemeris of the determined orbit, to the storage device(s) 2501, to the user computing device (e.g., to present the orbit data message in the user interface), to the entity computing device, or to any other device, system, service, etc. or any combination thereof.

In some embodiments, the user may interface with the orbit determination module 2500, e.g., using a computing device and/or peripheral device via the input device interface 2503 and/or the network interface 2502. In some embodiments, the user may interface with the orbit determination module 2500 to access the user interface, dashboard, and other functions. For example, the user may use the user interface to adjust, modify, create and/or delete orbit determination configurations to be implemented by the OD Modeling and Manager 2511. In some embodiments, the user may query the storage device(s) 2501 to view the RSO catalog 2507, including RSOs in the catalog, historical observation data, historical state vector data, historical determined orbits, pattern of life data, current and historical anomalies, among other data including statistical analytics associated with the RSOs and anomalies thereof.

In some embodiments, the OD Modeling and Manager 2511 may apply the orbit determination configurations to refine the orbit determination pipeline for future observations. In some embodiments, an orbit determination configuration may include parameters for, e.g., an initial state covariance (e.g., to add constraint or freedom to RSO position and/or velocity based on RSO characteristics and pattern of life), data weights for similar constraints on and/or freedom of adjustment to the In some embodiments, the term "computing device" may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/ PDA, television, smart device (e.g., smart phone, smart tablet or smart television), mobile internet device (MID), messaging device, data communication device, and so forth.

Figure 26:
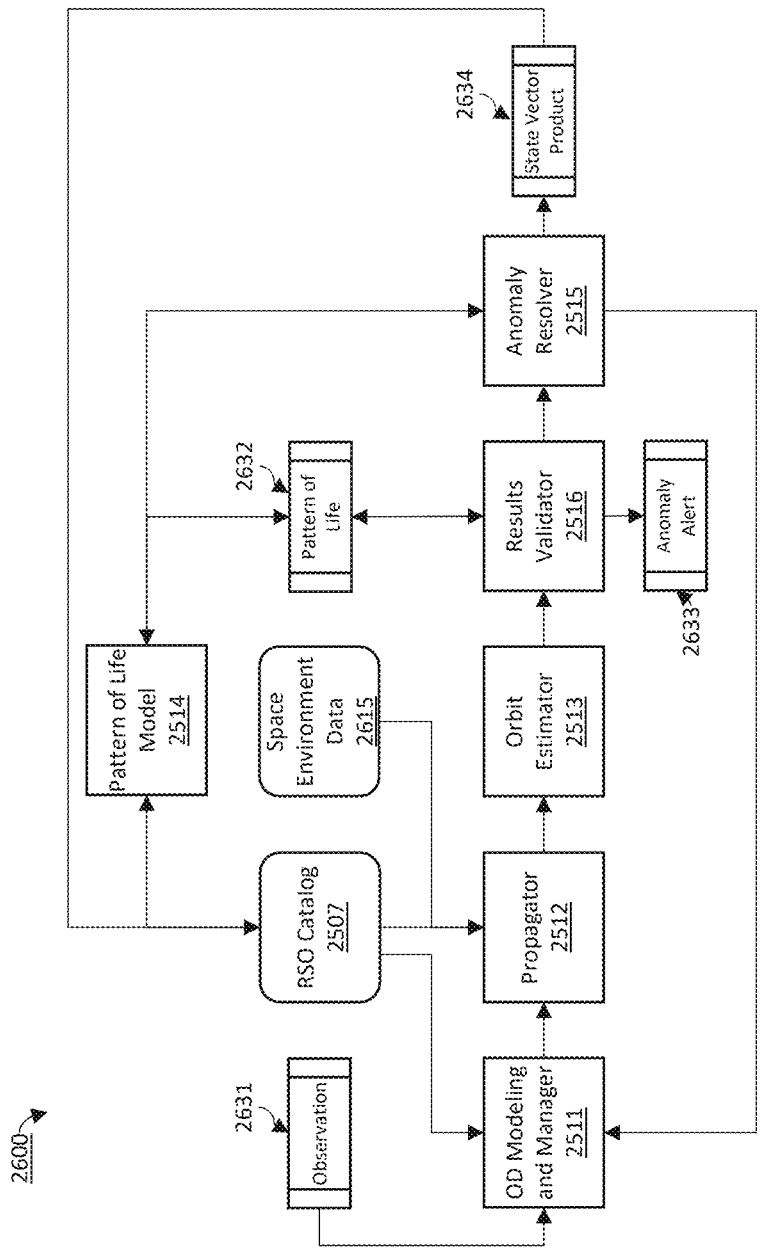

Referring now to FIG. 26, a block diagram illustrating orbit determination using the orbit determination system of FIG. 25 is depicted in accordance with one or more embodiments of the present disclosure.

In some embodiments, in an orbit determination pipeline 2600 implemented by the orbit determination module 2500 of FIG. 25, the orbit determination module 2500 may receive an observation 2531 of an observed RSO. In some embodiments, the observation 2531 may include data associated with measurements of the observed RSO, such as image data, radiometric data, photometric data, geometric data, RSO ID or UCT ID, UTC time of observation, RSO image coordinates [pixels] and uncertainties, RSO sky coordinates [Ra,Dec] and uncertainties, RSOs characteristics (magnitude, irradiance) and uncertainties, spacecraft state vector at time of observation, apparent velocity and uncertainties, apparent streak orientation (e.g., angle and/or length of an observed streak) and uncertainties, confidence factors of processing among other data or any combination thereof. In some embodiments, for example, the observation 2531 may include data extracted or otherwise derived from direct imaging of the detected RSO, such as by a ground-based or space-based imaging sensor. In some embodiments, such data extracted or otherwise derived from direct imaging may include pixel values (e.g., intensity) of pixels on which the detected RSO detected, a number of pixels on which the detected RSO is detected, a trajectory and/or velocity of the detected RSO based on the number and configuration of pixels on which the detected RSO is detected, among other features or any combination thereof.

In some embodiments, the detected RSO may include an RSO that is previously known, e.g., via one or more RSO tracking systems or services. Accordingly, in some embodiments, the RSO catalog 2507 may include a history of observations, states, orbits, maneuvers, and other behavior characteristics, as well as RSO characteristics such as mass, fuel, launch mass versus wet mass versus dry mass, geometry, reflectance, size, etc. In some embodiments, the RSO catalog 2507 may log the history and/or object parameters with reference to an identifier that identifies the detected RSO. Accordingly, the observation 2531 may include the identifier of the observed RSO. As a result, the orbit determination module 2500 may utilize the history and object parameters of the detected RSO by querying the RSO catalog 2507 with the identifier.

In some embodiments, the OD Modeling and Manager 2511 may receive the observation 2531 and determine a per-event process configuration. In some embodiments, to inform the configuration, the OD Modeling and Manager 2511 may also receive and/or query a time of last observation for the observed RSO, RSO characteristics, among other data associated with the RSO from the RSO catalog 2507. Accordingly, the OD Modeling and Manager 2511 may package the observation to be used for the orbit determination pipeline 2600 and configure the orbit determination pipeline 2600 as per dynamically generated, learned and/or predetermined configurations parameters.

In some embodiments, the orbit determination pipeline 2600 may include a set of available propagators and/or propagator configurations, a set of available filters and fitting algorithms for orbit estimation, among other configurable parameters or any combination thereof. For example, the propagator 2512 may include four propagators while the orbit estimator 2513 may include four orbit estimation filters and/or fitting algorithms. The four propagators and four orbit estimation filters/fitting algorithms may each correspond to respective orbital regimes (LEO, MEO, GEO, HEO) to optimize the orbit determination pipeline 2600 based on orbital regime. Other sets and set sizes of the propagator 2512 and/or orbit estimator 2513 may be employed to optimize the orbit determination pipeline 2600 based on other factors, or on any combination of factors. For example, the OD Modeling and Manager 2511 may include parameter configurations to address whether the observed RSO is an active body (e.g., may move), whether it has fuel and that it can maneuver versus a rocket body versus an object that is uncontrollable, whether the RSO is a debris, whether the RSO is a rocket body, whether the RSO is in the super GEO or in a "graveyard," whether the observation occurred at nighttime or daytime, the size and/or mass of the RSO, whether the observation occurred in the northern or southern hemisphere, etc.

Indeed, in some embodiments, the OD Modeling and Manager 2511 may address technical problems with automating an orbit determination pipeline 2600 because RSOs are found in many orbital regimes, from LEO up through GEO, and each orbit may vary based on the orbital regime and other factors (e.g., some orbits that are inclined, some that are really eccentric, etc.). Thus, the OD Modeling and Manager 2511 may include optimized configurations that optimize each step in the orbit determination pipeline 2600 to customize the orbit determination pipeline 2600 to the factors of the orbit of the RSO.

In some embodiments, to further optimize parameters of the orbit determine process, each orbital regime may be divided into sub-regimes to increase accuracy. For example, LEO may include 2, 3, 4, 5, 6, 7, 8, or more sub-regimes. Similarly, each of MEO, GEO and HEO may include 2, 3, 4, 5, 6, 7, 8, or more sub-regimes.

In some embodiments, each orbital regime and/or sub-regime may have different perturbations. For example, for an RSO closer to the Earth, gravity is pulling the RSO down with greater force than in higher orbits, and thus a gravity model may be implemented and optimized for the orbital regime/sub-regime. In another example, in higher orbital regimes/sub-regimes, an RSO may experience greater exposure and/or intensity of the sun, and thus the sun and/or perturbations models may be adjusted accordingly, and similarly with the moon and other planetary, celestial or other objects. In some embodiments, one of the orbital regimes may be a "GEO transfer" where a rocket sends a satellite and leaves it in LEO, the rocket may go from the LEO position to GEO, e.g., 36,000 miles, thus becoming and RSO in a transfer orbit ("a GTO regime"). Thus, the location of the observed RSO within a particular regime/sub-regime may affect the selection the perturbation models and the parameters/coefficients thereof.

In some embodiments, based on the factors associated with the observation 2531, the OD Modeling and Manager 2511 may identify a particular configuration for orbit determination for the observed RSO. To do so, the OD Modeling and Manager 2511 may identify the factors, based on observation 2531 data and/or RSO data in the RSO catalog 2507. The OD Modeling and Manager 2511 may determine which regime the observed RSO is in. The OD Modeling and Manager 2511 may determine the mass and/or size of the RSO. The OD Modeling and Manager 2511 may then determine a degree of freedom to use for the RSO to converge on a solution depending, e.g., upon whether the RSO is active or debris. In some embodiments, the OD Modeling and Manager 2511 may then determine coefficients for the mass of the observed RSO object.

In some embodiments, metadata and/or data of the observation 2531 may specify the sensor used to detect the detected RSO. Accordingly, based on the observation, the OD Modeling and Manager 2511 may determine characteristics of the sensor. Based thereon, the OD Modeling and Manager 2511 may determine parameters associated with the sensor such as sensor uncertainty or error, among other information or any combination thereof. Thus, the OD Modeling and Manager 2511 may determine a filter and/or algorithm parameters optimized for the sensor uncertainty and/or error.

In some embodiments, using the RSO data from the RSO catalog 2507, the OD Modeling and Manager 2511 may determine the span of the observations received in a most recent observation period. The OD Modeling and Manager 2511 may use such information to configure the time span or epoch of the propagator 2512.

In some embodiments, based on the factors of the orbit of the observed RSO and the RSO characteristics, the OD Modeling and Manager 2511 may load the associated configurations into the propagator 2512, orbit estimator 2513, results validator 2516, anomaly resolver 2515, pattern of life model 2514 and/or ephemeris generator 2517 to optimize the orbit determine process for the observed RSO. In some embodiments, the configuration parameters may each be mapped to particular values for the factors, dynamically generated based on algorithmic rules, and/or dynamically generated based on learned modelling via one or more machine learning models trained to produce orbit determination parameters based on the values of the factors.

In some embodiments, based on the configuration, the propagator 2512 and orbit estimator 2513 may estimate an orbit for the observed RSO. In some embodiments, to do so, the propagator 2512 and orbit estimator 2513 matches the measurement of the observation 2531 to its equivalent in math, e.g., as a mathematical formula of what the measurement should be, and then compares the mathematical formula to the measurement and fit the mathematical formula to the measurement.

In some embodiments, the propagator 2512 performs mathematical modelling of the trajectory of the observed RSO, based upon the Earth's gravitational force, atmospheric drag, third-body attraction (i.e., Moon, Sun, etc.), the radiation pressure of the Sun, plus other space environment data 2615. In some embodiments, the propagator 2512 may receive the per event process configuration from the OD Modeling and Manager 2511, a previous state vector and object characteristics of the detected RSO from RSO catalog 2507, the observation 2631, earth orientation parameters, solar radiation presser and geomagnetic data from space environment data 2615, among other data or any combination thereof. Using the previous state vector, the propagator 2512 may produce an expected state or state vector including a position, e.g., in sky coordinates (e.g., Ra.dec.) and/or trajectory/velocity, at the time of the observation 2631. As a result, the measurements of the observation 2631 may be compared to the expected position and/or trajectory/velocity. In some embodiments, the propagator 2512 may propagate the position and/or trajectory/velocity using one or more propagators as detailed above.

In some embodiments, the observation 2631 may include observed information and/or computed information (or "computed observables"). Observed information may include observations produced from the output images of the sensors. Computer information may include information generated by converting the observation information into appropriate coordinate frames, propagating the previous state to the desired time frame, converting back to observation coordinates, and/or comparing the observation to a propagated estimate (what the observation at that time is expected to be based on the computed results). In some embodiments, the orbit determination pipeline 2600 may also include an F function that calculates computed information. The computed information may be based on a dynamical model of the RSO's equations of motion, e.g., due to gravity, solar radiation pressure (SRP), maneuvers and momentum desaturation events (desats), and other small non-gravitational forces. In some embodiments, for determining the trajectory of an RSO, computed values of observed quantities may be fit to the observation measurements, e.g., by varying values of the model parameters. The estimated values of these parameters may be used to determine the trajectory of the RSO.

In some embodiments, the orbit estimator 2513 may apply one or more filters and/or fitting algorithms to the expected state to perform orbit estimation based on prediction (orbit propagation) observed measurements and initial conditions (e.g., as established by the OD Modeling and Manager 2511 and/or space environment data 2615). As a result, the orbit estimator 2513 may output a position, a velocity, a perturbations, coefficients, estimated values, covariance, among other orbit data or any combination thereof. In some embodiments, the orbit estimator 2513 may include a data smoothing function that smooths covariance for each observation of the event.

In some embodiments, the orbit estimator 2513 may estimate the orbit, e.g., using the cost function, as detailed above. For example, the orbit estimator 2513 may employ, e.g., least squares, batch least squares, sequential batch least squares, Kalman filter, extended Kalman filter, unscented Kalman filter, ARKF among others or any combination thereof.

In some embodiments, the results validator 2516 may validate the observation 26 2531 against the estimate orbit for the RSO. Thus, the results validator 2516 may perform a state vector validation process including convergence check, residual check and confidence check with the corresponding confidence factor. To do so, the results validator 2516 may evaluate the performance of the orbit determination pipeline 2600 based on the metrics obtained from its result and validates the next pass of the RSO using convergence of filters, confidence of estimated orbit, and magnitude of measurement residuals.

In some embodiments, the results validator 2516 may apply the validator to an input including, e.g., the observed RSO data (e.g., position, velocity, perturbations, coefficients, estimated values, covariance, etc.). In some embodiments, where the observed RSO data matches the estimated orbit, the results validator 2516 may augment the observed RSO data with the validation tag indicating a validated orbit. However, where the observed RSO data does not match the estimated orbit, the results validator 2516 may determine that the observed RSO is undergoing a maneuver event including a maneuver of the observed RSO. As a result, the results validator 2516 may call the pattern of life model 2514 to obtain a pattern of life 2632 for the observed RSO and validate whether the maneuver conforms to a pattern of life 2632, and thus whether the observed RSO is performing a scheduled maneuver. Based on the pattern of life, the results validator 2516 may set the validation tag to be validated or not validated, e.g., based on the confidence score as detailed above. In some embodiments, the results validator 2516 determines that the orbit is not validated, the results validator 2516 may produce an anomaly alert 2633, e.g., to the user, an entity, etc. via a user interface of at least one computing device.

In some embodiments, when the estimated orbit is not validated, the pattern of life model 2514 may obtain the historical RSO data form the RSO catalog 2507 to formulate the pattern of life 2632 in order to determine whether the deviation of the observed RSO from the expected orbit is due to an expected maneuver.

In some embodiments, the pattern of life model 2514 may include one or more unsupervised machine learning models for pattern recognition and/or prediction. Accordingly, the pattern of life model 2514 may access the history of states of the observed RSO in the RSO catalog 2507 to learn a pattern of the states for the observed RSO. In some embodiments, the history of states may include state vectors and/or other data (e.g., space environment data, two-line elements, etc.) associated with each historical observation of the detected RSO at previous epochs. The state vectors and/or other data may be encoded into one or more feature vectors representing the data through time. In some embodiments, as depicted in FIG. 27, a pattern of life model engine 2710 may ingest the feature vector(s) and apply the pattern of life model 2514 generate an output indicative of the pattern of life 2632.

In some embodiments, the pattern of life 2632 may include a prediction of a confidence score indicating a degree of confidence that the observation 2631 conforms to the historical behavior of the observed RSO as per the history of states. To do so, the pattern of life model 2514 may ingest a feature vector encoding the observation 2631 (e.g., the as-measured state at observation time of the observed RSO) and predict the confidence score indicative of the observation 2631 conforming to the pattern(s) of the history of states, which may indicate a likelihood that the observation matches the pattern of behavior of the observed RSO, and thus is performing an expected maneuver. Thus, the pattern of life model 2514 may be trained to recognize the pattern of the history of states using the history of states.

Accordingly, in some embodiments, the pattern of life model 2514 ingests a feature vector that encodes features representative of a particular state (e.g., a state vector and/or associated data, as detailed above). In some embodiments, the pattern of life model 2514 processes the feature vector with parameters to produces a prediction of the confidence score. In some embodiments, the parameters of the pattern of life model 2514 may be implemented in a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the pattern of life model 2514 may advantageously include a random forest classification model.

In some embodiments, the pattern of life model 2514 processes the features encoded in the feature vector by applying the parameters of the pattern of life model 2514 to produce a model output vector. In some embodiments, the model output vector may be decoded to generate one or more labels indicative of the confidence score. In some embodiments, the model output vector may include or may be decoded to reveal a numerical output, e.g., one or more probability values between 0 and 1 where each probability value indicates a degree of probability that a particular label correctly classifies the particular state. In some embodiments, the pattern of life model 2514 may test each probability value against a respective probability threshold. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the particular state is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the pattern of life model 2514 may produce the confidence score for a particular state based on the probability value(s) of the model output vector and the probability threshold(s).

In some embodiments, the parameters of the pattern of life model 2514 may be trained based on known outputs. For example, in training, the pattern of life model 2514 may iteratively step through each epoch in the history of states, predicting a confidence score for a next state. The actual degree of conformity or difference of the next state from an expected state in the history may be paired with the predicted confidence score to form a training pair. In some embodiments, an optimizer 2712 associated with the prediction model 2514 may then compare the predicted output value with the known output of the training pair to determine an error of the predicted output value. In some embodiments, the optimizer 2712 may employ a loss function, such as, e.g., Hinge Loss, Multi-class SVM Loss, Cross Entropy Loss, Negative Log Likelihood, or other suitable classification loss function to determine the error of the predicted output value based on the known output.

In some embodiments, based on the error, the optimizer 2712 may update the parameters of the pattern of life model 2514 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer 2712 may update the parameters of the pattern of life model 2514 based on the error of predicted labels in order to train the pattern of life model 2514 to model the correlation between the observation 2631 and the confidence score in order to produce more accurate labels regarding conformance to the pattern of life 2632.

Alternatively or in addition, in some embodiments, the pattern of life 2632 may include a projected pattern of state vectors or state vector changes for a prediction period, e.g., from the initial state of the latest state vector in the history of states up to the observation time. The projected pattern may be compared to the observation 2631 to determine whether the observation 2631 deviates from the estimated orbit to a similar magnitude and in a similar trajectory to the projected pattern, thus indicating that the observation 2631 conforms to the pattern of life of the observed RSO. As a result, the results validator 2516 may receive the projected pattern and determine a difference between a velocity, velocity change relative to the estimated orbit, position, position change relative to the estimated orbit, among other differences or any combination thereof. Based on the difference(s), the results validator 2516 may generate the confidence score indicate of the degree of difference between the observations 2631 and the projected pattern thus representing how well the observation 2631 conforms to the projected pattern. Where the confidence score meets and/or exceeds a predetermined confidence threshold, the results validator 2516 may set the validation tag to "validated." Where the confidence score meets and/or falls below the predetermined confidence threshold, the results validator 2516 may set the validation tag to "not validated." In some embodiments, the results validator 2516 may modify the validation tag to include the confidence score instead of or in addition to the "validated"/"not validated" indicator.

In some embodiments, to predict the projected pattern, the pattern of life model 2514 may process the feature vector with learned parameters. In some embodiments, the parameters may be implemented in a suitable machine learning model including a prediction machine learning model, such as, e.g., Linear Regression, Logistic Regression, Ridge Regression, Lasso Regression, Polynomial Regression, Bayesian Linear Regression (e.g., Naive Bayes regression), a convolutional neural network (CNN), a recurrent neural network (RNN), decision trees, random forest, support vector machine (SVM), K-Nearest Neighbors, or any other suitable algorithm for predicting output values based on input values. In some embodiments, for computational efficiency while preserving accuracy of predictions, the pattern of life model 2514 may advantageously include a random forest model.

In some embodiments, the pattern of life model 2514 processes the features encoded in the feature vector by applying the parameters to produce a model output vector. In some embodiments, the model output vector may be decoded to generate one or more numerical output values indicative of the projected pattern, e.g., future state vectors and/or state changes. In some embodiments, the model output vector may include or may be decoded to reveal the output value(s) based on a modelled correlation between the feature vector and a target output.

In some embodiments, the parameters of the pattern of life model 2514 may be trained based on known outputs. For example, in training, the pattern of life model 2514 may iteratively step through each epoch in the history of states, predicting a next state. The actual next state in the history may be paired with the predicted next state to form a training pair. In some embodiments, an optimizer 2712 associated with the prediction model 2514 may then compare the predicted output value with the known output of the training pair to determine an error of the predicted output value. In some embodiments, the optimizer 2712 may employ a loss function, such as, e.g., Hinge Loss, Multi-class SVM Loss, Cross Entropy Loss, Negative Log Likelihood, or other suitable classification loss function to determine the error of the predicted output value based on the known output.

In some embodiments, based on the error, the optimizer 2712 may update the parameters of the pattern of life model 2514 using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer 2712 may update the parameters of the pattern of life model 2514 based on the error of predicted values in order to train the pattern of life model 2514 to model the behavior of the observed RSO.

In some embodiments, the confidence score may be a numerical score, e.g., on a scale of 1 to 2, 1 to 3, 1 to 5, 1 to 10, 1 to 100, 0 to 2, 0 to 3, 0 to 5, 0 to 10, 0 to 100 or other scale. In some embodiments, the confidence score may be a qualitative classification, such as, e.g., high, medium or low, or other qualitative indicators of a degree of confidence or any combination thereof with 2, 3, 4, 5 or more degrees and associated indicators.

In some embodiments, a high confidence score, e.g., a confidence score about the threshold confidence score, may be indicative of the observed RSO engaging in a scheduled maneuver. In some embodiments, spacecrafts may undergo station keeping, maintenance, regular repositioning, among other flight plan maneuvers that may or may not be published. Thus, the pattern of life model 2514 learns such scheduled maneuvers to determine when a deviation of an estimated orbit is due to an instance of the schedule maneuvers. In contrast, where the observed RSO deviates from both the estimated orbit and the learned pattern of life, the observed RSO may be undergoing an expected maneuver, such as having experienced a collision, intercepting another spacecraft or object, changing mission plan, among other unexpected maneuvers. Such unexpected maneuvers may give rise to concerns that the observed RSO is defective or damaged, posing or reacting to a hazard in the space environment, among other possible anomalous conditions or any combination thereof.

Accordingly, in some embodiments, where the confidence score is below the confidence score threshold, the results validator 2516 may produce the anomaly alert 2633 as detailed above, and pass the estimated orbit and/or observation 2631 to the anomaly resolver 2515. In some embodiments, the anomaly resolver 2515 may receive the confidence score for the pattern of life 2632 from the pattern of life model 2514 and generate one or more updates to the mathematical parameters of the OD Modeling and Manager 2511 to use in subsequent observations in the orbit determine process. In some embodiments, the anomaly resolver 2515 may take the state vector of the observation 2631 and apply those orbital tweaks to the algorithms of the propagator 2512 and/or orbit estimator 2513 based on a degree of deviation from the estimated orbit and/or pattern of life 2632.

In some embodiments, upon resolving an anomaly (where present), the orbit determination pipeline 2600 may output a state vector product 2634 representing the current state at observation time of the observed RSO. In some embodiments, the state vector product 2634 may include, e.g., the position, the velocity, perturbations coefficients, estimated values, covariance, the validation tag, among other state data or any combination thereof. The state vector product 2634 may be stored in the RSO catalog 2507 as a new record in the history of states of the observed RSO so as update the history.

Referring now to FIG. 27, a block diagram illustrating pattern of life modelling is depicted in accordance with one or more embodiments of the present disclosure.

Systems and methods of the present disclosure include: receiving, by at least one processor, an observation of a resident space object (RSO); where the observation includes at least one measurement of the observed RSO includes: a Right Ascension angle in a celestial coordinate frame; a Declination angle in the same celestial coordinate frame; a time associated with the observation; training, by at least one processor, a pattern-of-life model that models patterns in maneuvers of the observed RSO based at least in part a plurality of historical states in historical observation data of the observed RSO; where the pattern-of-life model is trained to predict pattern of life data for the observed RSO based at least in part on the patterns of the plurality of historical states; propagating, by the at least one processor, at least one propagated position of the detected RSO observation for a current period of time based at least in part on at least one orbital determination configuration; where the at least one propagated position represents an expected state of the RSO based on a last known state in the historical observation data; determining, by the at least one processor, based on the at least one propagated position and at least one cost function, an orbit of the RSO, the orbit including: a position throughout the current period of time, a velocity throughout the current period of time, perturbation coefficients during the current period of time, and covariance during the current period of time; utilizing, by the at least one processor, the pattern-of-life model to predict the pattern of life data for the current time period based at least in part on the plurality of historical states; determining, by the at least one processor a validation of the at least one maneuver event based on the pattern of life data being indicative of the at least one maneuver matching the patterns in maneuvers; and generating, by the at least one processor an update to the orbital determination configuration based on the validation so as to refine the orbital determination configuration to more accurately predict the orbit of the observed RSO.

Systems and methods of the present disclosure further include where the pattern of life data includes at least one confidence score indicative of a confidence that the at least one maneuver conforms to the patterns in maneuvers.

Systems and methods of the present disclosure further include where the pattern of life data includes at least one predicted state indicative of a predicted maneuver for the current period of time based on the patterns in maneuvers.

Systems and methods of the present disclosure further include determining, by the at least one processor, based on the predicted state, a confidence score indicative of a likelihood of the at least one maneuver event of the observed RSO conforming to the patterns in maneuvers.

Systems and methods of the present disclosure further include determining, by the at least one processor, based on a difference between the observation and at least one propagated position, a maneuver event for the observed RSO.

Systems and methods of the present disclosure further include determining, by the at least one processor, the maneuver event for the observed RSO based at least in part on the difference exceeding at least one measurement error associated with the at least one measurement.

Systems and methods of the present disclosure further include applying, by the at least one processor, an orbital determination configuration based at least in part on the detected RSO observations, where the orbital determination configuration includes algorithm parameters and/or algorithms associated with an expected behavior of the RSO based on the detected RSO observation; where the detected RSO observations includes greater than 1000 RSO observations.

Systems and methods of the present disclosure further include extracting, by the at least one processor, historical state data for at least one RSO, the historical state data covering a period of time preceding an observation time; where the historical state data includes propagated orbit data for the at least one RSO data;

Systems and methods of the present disclosure further include extracting, by the at least one processor, the historical observation data for the at least one RSO, the historical observation data being indicative of measured RSO states at points in time during the period of time;

Systems and methods of the present disclosure further include where the observation includes at least one of: the position in RSO coordinates, the position in sky coordinates, at least one RSO characteristic; at least one RSO state vector, an apparent velocity, an apparent velocity uncertainty, an apparent streaklet orientation, an apparent streaklet orientation uncertainty, an apparent visual magnitude, an absolute in-band irradiance, a NORAD identifier (ID), a confidence level of ID, a signal to noise ratio (SNR) of detection, direction, orientation, at least one jitter assessment metrics, a number of stars used for astrometry, at least one photometry calculation from at least one photometry model, a target rotation rate, at least one distortion coefficient residual, a sensor calibration observation time offset, an attitude rate of observer, or at least one confidence factor.

According to aspects of one or more embodiments, the conjunction assessment system processes each RSO, including ephemeris and error generated by an orbital determination pipeline, to place each RSO within a predefined three-dimensional grid of space around Earth, where each element of the grid is a geospatial volume cells ("voxels") that represents a volume at a particular position in space, e.g., defined by coordinate frames. Using the ephemeris of each RSO, the orbital trajectory of each RSO can be mapped to the corresponding voxel(s) of the heat map through which each RSO is expected to move. Thus, according to aspects of one or more embodiments, the heat map can represent levels of RSO activity in specific regions of space.

According to aspects of one or more embodiments, the heat map can be used to aid in determining the trust level that should be placed in conjunction analysis based on the level of activity in which a particular ("target") RSO is expected to be. According to aspects of one or more embodiments, if a conjunction is estimated to occur in a voxel having high activity, then the likelihood that the orbit solution of the secondary RSO being poor increases, and a method to account for the lower confidence level (e.g., introduction of some process noise) is applied. Thus, the heat map provides enables improved compensation for error.

Moreover, according to aspects of one or more embodiments, RSOs are generally assessed for potential conjunction by pairing the target RSO with each other RSO. However, in some instances, some pairs can be disregarded as having effectively no probability of colliding due to distance between the two. In some embodiments, the heat map may be used to provide a filter by pairing the target RSO with secondary RSOs from only voxels of the heat map within a predetermined range. Thus, number of combinations of RSO pairs needed to be examined can be significantly reduced to reduce the computational load.

Further, according to aspects of one or more embodiments, the conjunction analysis pipeline may additionally compensate for error by determining and characterizing a level of confidence of a probability of collision output. The level of confidence is formulated based on: image factors to characterize confidence at the measurement level (e.g., via a measurement of image quality of the RSO imaging), orbit factors that measures confidence based on a measurement of consistency of the RSO's recent state/ephemeris history, and a pattern-of-life factor that measures confidence of the RSO's predicted trajectory based on pattern of life (see above) and whether the RSO is expected to maneuver. The confidence of each of the three factors may be combined to produce the level of confidence of a particular conjunction prediction.

Figure 28:
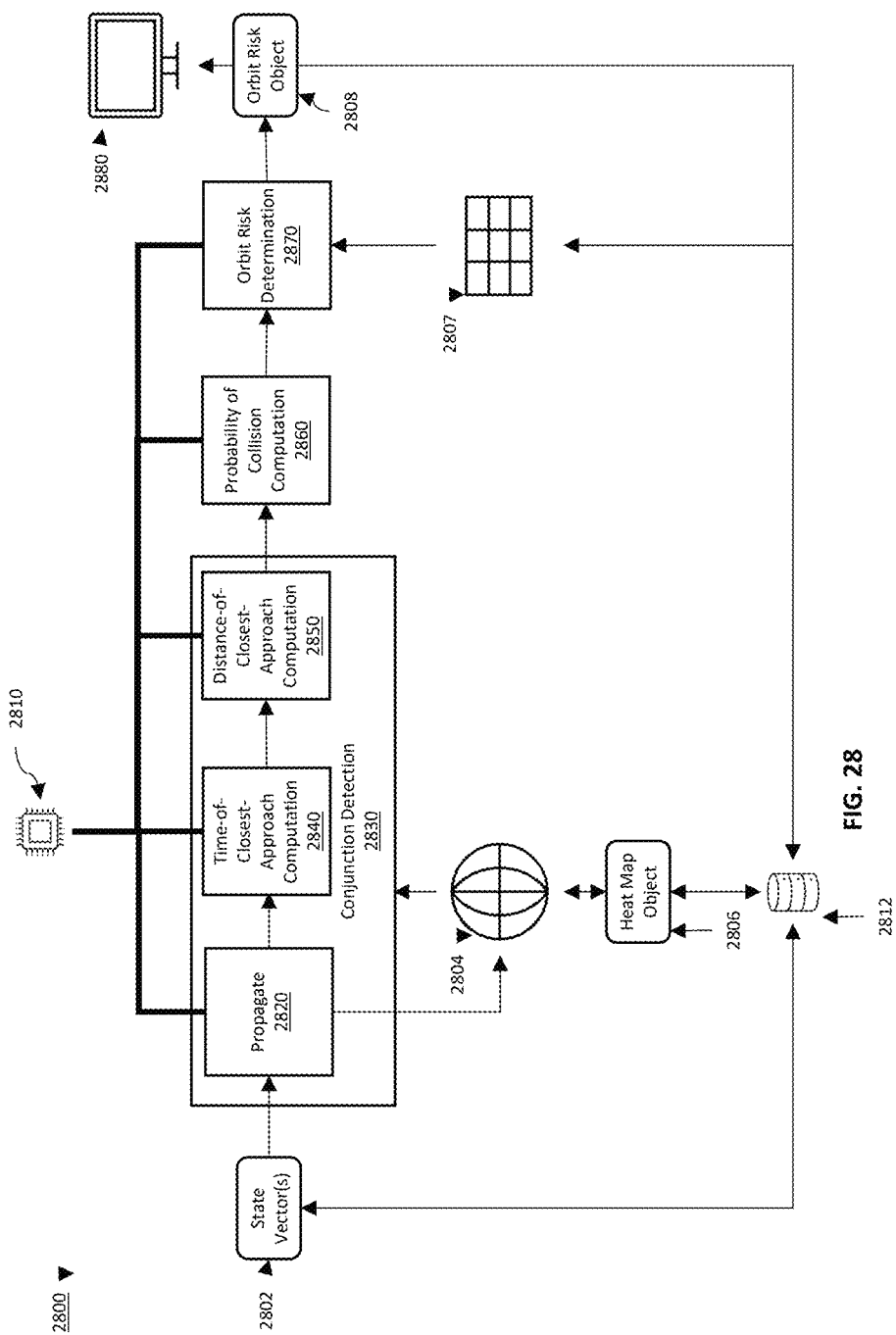

FIG. 28 depicts a conjunction assessment system in accordance with aspects of one or more embodiments of the present disclosure.

In some embodiments, a system for determining orbit risk, including a risk of conjunction between RSOs, may include a conjunction assessment pipeline 2800 executed by a processor 2810 using a storage 2812, e.g., including conjunction assessment module 740 detailed above including processor 75 and/or memory 80 detailed above. The conjunction assessment pipeline 2800 may use state vector(s) 2802 for multiple RSOs to determine likely future states, a likelihood of conjunction with another RSO and a confidence of the likelihood to produce an orbit risk object 2808 representing a risk assessment based on the likelihood and confidence of conjunction between any two RSOs. The orbit risk object 2808 may be provided to a computing device 2880 associated with one or more entities associated with the RSO(s) so as to alert the entity of the orbit risk of the RSO(s).

In some embodiments, the conjunction assessment pipeline 2800 may include hardware components such as a processor 2810, which may include local or remote processing components. In some embodiments, the processor 2810 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 2810 may include data-processing capacity provided by the microprocessor. In some embodiments, the microprocessor may include memory, processing, interface resources, controllers, and counters. In some embodiments, the microprocessor may also include one or more programs stored in memory.

Similarly, the conjunction assessment pipeline 2800 may include storage 2812, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 2812 may include, e.g., a suitable non-transient computer readable medium such as, e.g., random access memory (RAM), read only memory (ROM), one or more buffers and/or caches, among other memory devices or any combination thereof.

In some embodiments, the conjunction assessment pipeline 2800 may implement computer engines for propagation 2820 (e.g., such as the propagation module 730 detailed above), conjunction detection 2830, time-of-closes approach computation 2840, distance-of-closes approach computation 2850, probability of collision computation 2860 and orbit risk determination 2870. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the conjunction assessment pipeline 2800 may receive one or more state vectors 2802 for each RSO. The conjunction assessment pipeline 2800 may receive the state vector(s) 2802 from storage 2812, an external data store (e.g., another storage device/system, a database, a local and/or remote server or host, a network-attached storage, among other storage locations or any combination thereof), or directly from a preceding a process, such as the orbit determination module 2500 detailed above. In some embodiments, the state vector(s) 2802 of each RSO may include position, velocity and/or time vectors as measured, predicted and/or inferred for each RSO. For example, the position and/or velocity information may include cartesian position and/or velocity data representing three-dimensional position and/or velocity of each RSO at a particular time in orbit. In some embodiments, the state vector(s) 2802 of each RSO may include a single, most current state vector, a time window of most recent state vectors, one or more projected state vectors, or other set of state vector(s) characterizing the trajectory of each RSO through the space environment.

In some embodiments, the state vector(s) 2802 of each RSO may under propagation 2820 to project the state of each RSO for some period into the future. In some embodiments, similar to the propagator 2512 detailed above, the propagation 2820 may employ one or more numerical and/or analytical techniques to propagate the state vectors of each satellite based on the satellite configuration data in parameters of each RSO, including, e.g., the respective TLE/state vectors, and/or RSO mass and/or geometry, among other parameters or any combination thereof.

For example, the propagation 2820 may include numerical propagation, such as, e.g., Keplerian or Eckstein-Hechler, Newton's method, conic orbits, patch conic approximation, universal variable formulation, perturbations, or other propagation determination technique or any combination thereof. In some embodiments, numerical propagation may be more accurate than analytical propagation, but may employ more steps to set up to be used properly. Whereas analytical propagators are configured only thanks to their various constructors and can be used immediately after construction, numerical propagators configuration involve setting several parameters between construction time and propagation time.

In some embodiments, the propagation 2820 may utilize iterative physics-based algorithms to predict a future state based on an initial object state of the RSO. Such algorithms may include, e.g., Bayesian inferencing, Monte-Carlo Modelling, Extended Kalman Filtering (EKF), adaptive robust (AR) Kalman Filter (ARKF), or other suitable iterative approach. In some embodiments, the iterative physics-based algorithm, such as an EKF estimator, may generate sequential predictions of both the RSO state and its uncertainty (e.g., covariance).

In some embodiments, the orbit determination module 2500 may utilize the historical states of the RSO, e.g., as record in storage 2812 and/or in the RSO catalog 2507 detailed above, as a mechanism to detect maneuvers or other changes of behavior by the observed RSO. Thus, the propagation 2820 may set the initial state of the RSO to be the most recent historical state of the RSO such that the propagation 2820 may propagate the state of the RSO to the observation time of the observation of the RSO.

In some embodiments, to enable accurate propagation of states, the RSO data of the RSO catalog 2507 may include RSO parameters for each RSO. For example, RSO parameters for the propagation may include, e.g., an initial RSO state, a central attraction coefficient, one or more force models, a type of orbital parameters to be used for propagation, a type of position angle to be used in orbital parameters to be used for propagation where it is relevant, whether state transition matrices and Jacobians matrices should be propagated along with orbital state, whether additional derivatives should be propagated along with orbital state, discrete events that should be triggered during propagation, a binding logic with the rest of the application, among others or any combination thereof.

In some embodiments, the propagation 2820 may include an underlying numerical integrator, which may also have its own configuration parameters. In some embodiments, configuration parameters for adaptive step-size integrators may include a minimum, maximum, a start step size, one or more absolute and/or relative errors thresholds, among others or any combination thereof.

Based on the data of each RSO, the propagation 2820 may output a series of state vectors and covariances (e.g., as represented in one or more covariance matrices) to generate the ephemerides for the propagation period that define position, trajectory and covariances at one or more propagation steps ("epochs"). In some embodiments, the propagated state vector(s) for each RSO may be applied to the heat map 2804 to populate the heat map with a most current view of a degree of traffic occurring each region of the space environment. Additionally, the covariances determined during propagation for each RSO may be stored with the RSO data (e.g., the state vector(s) 2802 and/or other RSO data) as covariance data 2807.

In some embodiments, to improve the conjunction assessment pipeline 2800 may use the heat map 2804, represented as data in the storage 2812 as a heat map object 2806. The heat map 3804 provides a mechanism or pre-filtering the conjunction assessment by identifying regions of a space environment having multiple RSOs or projected to have multiple RSOs, thus serving a data structure that identifies higher and lower risk regions based on the amount of RSO activity in each region. Thus, the heat map 2804 may facilitate exploiting both geospatial and temporal representations of the levels of RSO activity in specific regions of space to characterize "high traffic" or "hot" regions and "low traffic" or "cold" regions in a manner that defines a comprehensive assessment of activity that is beneficial for global space traffic management.

In some embodiments, the space environment may include one or more orbital regions around a celestial object, such as the Earth, Moon, Mars, or other planet or moon, or any other natural and/or artificial body. In some embodiments, the space environment may be divided into geospatial volume cells ("voxels") by three-dimensional partitioning of the space environment. Each voxel may be defined by an altitude delta having a start and end altitude relative to the celestial body, a latitude delta defined by a starting latitude and ending latitude relative to a sphere defined by the celestial body and/or space environment about the celestial body, and a longitude delta defined by a starting longitude and an ending longitude relative to the sphere defined by the celestial body and/or space environment about the celestial body. Herein, the term "latitude" refers to an angular distance of a region north or south of the earth's equator, or of a celestial object/region north or south of the celestial equator, and may be expressed in degrees and/or minutes. Herein, the term "longitude" refers to an angular distance of a place or region east or west of a point of reference (e.g., a meridian such as that of Greenwich, England), or west of a standard meridian of a celestial object, and may be expressed in degrees and/or minutes.

In some embodiments, the heat map 2804 may provide a tool to localize the conjunctions of RSOs as an indication of a quantity of RSOs in each region. The quantity may be represented as a numerical count, a categorization based on a set of ranges (e.g., high/medium/low, 1/2/3/4/5/etc. or other form of categorization or any combination thereof), or other indication of the degree of RSO activity in each voxel. In some embodiments, when presented graphically to a user, e.g., via the computing device 2880, the heat map 2804 may depict the count and/or categorization of each voxel as a color spectrum that varies in color and/or intensity and/or contrast to create a visual depiction of the amount of activity. For example, each voxel may be shaded in a particular color that varies in how light or dark the shading is based on the count and/or categorization. Other forms of visualization or any other combination may be employed.

In some embodiments, the heat map 2804 may be explorable in that a user may select a particular voxel to obtain additional detail, e.g., by visually magnifying and/or zooming in on the region to visually depict the states/trajectories of RSOs in the voxel and/or providing data representing the objects such as statistical information regarding the states and/or trajectories of the RSOs, a quantity of RSOs in the voxel, the identifiers and/or other RSO-specific data for some or all RSOs in the voxel, among other data or any combination thereof.

In some embodiments, a conjunction detection 2830 may use the heat map to localize those regions that are most likely to have conjunction risks between RSOs (e.g., according to a threshold level of activity, such as threshold number of RSOs in the voxel) and objects that pass through these regions. Accordingly, the conjunction detection 2830 may use the heat map 2804 to perform an initial filtering of the data. Indeed, the number of RSOs in orbit about the celestial object may exceed thousands, tens of thousands or even hundreds of thousands of RSOs. Thus, to perform conjunction assessment on every RSO at any given time is impractical and inefficient. Thus, processing resources can be budgeted to particular groups of RSOs based on the heat map 2804 and the associated regions of high activity. Accordingly, for any particular timestamp, the conjunction detection 2830 may identify the voxels having a "heat" indication (e.g., associated with the count and/or categorization detailed above) that indicates an elevated risk of conjunction between two or more RSOs in the associated regions.

In some embodiments, only voxels having a heat exceeding a predetermined threshold of the count and/or categorization may be selected. In some embodiments, the count and/or categorization of each voxel may be used to generate a prioritized ordering of the voxels such that, e.g., a defined number of the highest prioritized voxels may selected. The defined number may be preset, user configurable, or dynamically adjusted based on available processing resources and/or time for performing the assessments. For example, processing time may be scheduled in particular period of time to perform conjunction detection 2830 or to complete the conjunction assessment pipeline 2800 to produce the orbit risk object 2808. Thus, the conjunction detection 2830 may use the heat map 2804 to select a number of the voxels for conjunction assessment such that the conjunction detection 2830 and/or the conjunction assessment pipeline 2800 may complete for all selected voxels within the allotted period of time.

In some embodiments, the conjunction detection 2830 may also or alternatively determine an order for assessing RSOs based on the priority of the voxels within which the RSOs are observed. For example, voxels having a highest heat categorization indicated a greatest degree of RSO activity may be selected first, with subsequent voxels selected according to a descending level of activity as indicated by the count/categorization of activity.

In some embodiments, upon selecting voxels for conjunction detection 2830, the RSOs with each voxel may be screened for candidate conjunctions. To do so, the conjunction detection 2830 may identify the inclination of the orbit of each RSO in the selected voxel, e.g., based on the propagated states, to determine which pairs of RSOs are inclined towards each other and thus potentially at risk of conjunction. In some embodiments, inclination measures the tilt of an object's orbit around the celestial body and is expressed as the angle between a reference plane and the orbital plane or axis of direction of the orbiting object. Thus, the inclination of each RSO may be used to determine whether each RSO has an orbit tilted towards or away from another object. Accordingly, RSOs having orbits tilted towards each other may be identified as candidate pairs of RSOs at risk of conjunction. Such screening may enable the conjunction detection 2830 to reduce the data set of RSOs for which conjunction needs to be assessed, thus reducing the processing and memory demand and decreasing the time to complete the conjunction assessment pipeline 2800.

In some embodiments, upon determining the candidate pairs, the conjunction detection 2830 may further propagate the orbits of each RSO of each candidate pair. As detailed above, such propagation may include projected the state vector at each timestep for a series of future timesteps so as to project the orbit of the RSO into a future states. In some embodiments, the timestep for propagation during conjunction detection 2830 may be a length of time sufficient to identify a window of time during which such conjunction between a candidate pair of RSOs would occur. In some embodiments, a second propagation step may then be performed to determine a more precise time window during which conjunction may occur. In some embodiments, one or more steps of propagation may be performed for each candidate pair of RSO, with each additional step of propagation narrowing the period of the timestep until a defined precision is achieved. In some embodiments, the propagation steps may include two steps, a first coarse propagation, and then a second fine or precise propagation, the first coarse propagation being optimized for speed and efficiency, and the second propagation being optimized for precision within the defined precision.

In some embodiments, based on the fine propagation of the RSO states of each RSO in a candidate pair, the time-of-closest approach ("TCA") computation 2840 may be performed. In some embodiments, the propagated orbit of each RSO may include state vector(s) including a position vector and/or a velocity vector as detailed above. The TCA computation 2840 may include using the state vector(s) of each RSO in the candidate pair to determine a relative positive vector and relative velocity vector representing the vector connecting their centers of mass and the vector representing their relative motion, respectively. The TCA computation 2840 may determine the TCA as the time at which the relative position and velocity vectors are perpendicular. When the position and velocity vectors are perpendicular, the two RSOs are at their minimum distance. The timestep along each RSOs orbit according to the fine propagation step at which the minimum distance occurs is determined as the TCA for the candidate pair.

In some embodiments, based on the TCA, the distance-of-closest approach (DCA) computation 2850 may determine the distance between the RSOs in the candidate pair based on the propagated orbit of each RSO as the TCA. The DCA represents the minimum separation between the two RSOs. To compute the DCA, the DCA computation 2850 may use the propagated orbits of each of the RSOs in the candidate pair to determine a difference between the position vector of each of the RSOs states at the TCA based on the propagated orbit. In some embodiments, the DCA may be a Euclidian distance between the two RSO states at the TCA, or any other suitable distance measure or any combination thereof.

In some embodiments, based on the TCA and DCA, the conjunction assessment pipeline 2800 may perform the probability of collision computation 2860. The probability of collision computation 2860 may use the propagated orbits of each RSO in the candidate pair, including propagated covariance matrices of each RSO. In some embodiments, probability of collision may generally be determined by combining the covariance matrices of each RSO in the candidate pair, defining a hard-body radius (e.g., an estimate of sphere encapsulating the RSO such that contacting the hard-body radius may indicate collision with the RSO), projecting the covariance, miss distance, and hard-body radius into a "conjunction plane" perpendicular to the velocity vector (where any collision would occur), place the combined covariance at the origin in this plane, position the hard-body radius one miss distance away and calculate the probability of collision (Pc) is the portion of the combined covariance's probability density that falls within the projected hard-body radius sphere.

In some embodiments, the probability of collision may be a number ranging from zero to one which indicates how probable collision is to occur between a candidate pair of RSOs, and thus how critical the potential collision is. In some embodiments, the probability of collision may depend on the size of each RSO, the state vectors at the TCA, and the covariance matrices that defines the uncertainty of the state vectors. In an example, calculating a probability of collision may use information about the relative dynamics and associated error covariance data assuming a probability density function that has a Gaussian distribution using one or more approaches. One possible approach is reducing the three-dimensional integral in the probability equations to a two-dimensional one by eliminating the dimension parallel the relative velocity vector, confining the solution to a plane, and then modifying the two-dimensional function by changing a polar coordinate frame in that plane. Another possible approach is developing a one-dimensional line integral method by integrating around the rim of the circle rather than the 2D area. Another possible approach is calculating the probability numerically using error function and exponential terms, formulating a series expansion representation, and then determining the maximum collision probability by assessing the possible variables such as the orientation of the position vector with respect to the covariance axes in the encounter ellipse, minor axis standard deviation and the aspect ratio. This last approach may be enhanced by introducing iterative methods. Another possible approach may include converting the two-dimensional Gaussian integral to one-dimensional Rician integral and introducing the concept of equivalent areas. This resulted in developing analytical series expressions containing two exponential terms.

In some embodiments, any one or more of the four possible approaches may be used to perform calculations over a wide range of parameters (miss distance, standard deviations and collision cross-sectional area). Nevertheless, the 1D Rician integral method may be faster computationally than the other three possible approaches. Greater detail on each possible approach can be found in the following technical papers: Priya Rajasekar, Optimization of space debris collision avoidance maneuver, Master's thesis, Montreal, Canada: McGill University, 2017, and Shrouti Dutta, Optimization of collision avoidance maneuvers for a satellite in the presence of uncertainty, Doctoral thesis, Montreal, Canada, McGill University, 2023, each of which incorporated herein by reference in their entirety for all purposes.

In some embodiments, additional or alternative techniques may be employed to calculate probability of collision, such as NASA's Conjunction Analysis Risk Assessment (CARA), which may includes regular and extra-fast implementations of classical 2D methods, a Monte Carlo technique that propagates to the Time of Closest Approach (TCA), and a three-dimensional approach.

In some embodiments, the probability of collision computation 2860 may output a probability of the RSOs of a candidate pair colliding at the TCA. In some embodiments, based on the probability, orbit risk determination 2870 may use additional confidence factors to determine an indication of accuracy of the probability of collision, and thus a degree of seriousness of the potential conjunction of the two RSOs of the candidate pair. In some embodiments, each state vector 2802 may include covariance data 2807 associated with the quality of the observation giving rise to the state vector 2802. For example, as further detailed above, each observation may be associated with an image quality factor, orbit quality factor, pattern of life assessment, among others or any combination thereof. In some embodiments, the image quality factor may account for the variability in quality from one image to the next. For example, signal-to-noise ratio (SNR) can vary significantly from one image to the next based on changing environmental conditions and target response variability. A high SNR in the image yields better quality 2-D position information within the image frame, and thus produces more trustworthy data. In some embodiments, the orbit quality factor may use forward and backward trajectory propagation to determine whether the current orbit solution falls within an expected range. As detailed above, the pattern-of-life factor evaluates whether any observed behavior that is unexpected falls within historical patterns previously observed in the object in question. Each factor may be assessed to provide quantitative measures of the level of trust that should be applied to a given solution as distinct from an error covariance matrix. Rather, the factors provide data that defines that trust based on evaluating data quality over distinct time periods. The image factor operates at the measurement level on a very short time frame, e.g., within a period of observation, to evaluate whether the images that produced the observations are of high quality, or questionable quality. The orbit factor works over a time frame of hours to weeks to evaluate whether the current propagated orbit is consistent with the object's recent history. The pattern-of-life factor is derived by evaluating data over months or more to assess whether a change in behavior is expected based on past patterns. When combined, these factors provide insight into whether an object's predicted trajectory and associated error covariance, and hence the probability of conjunction, are trustworthy, or suspect.

In some embodiments, elements of this covariance data 2807 may be used to aid in determining the trust level or accuracy of the probability of collision. If a conjunction is estimated to occur in a high traffic region, then the likelihood that the orbit solution of the secondary object will be poor increases, and a method to account for the lower confidence level (e.g., introduction of some process noise) may be in order. As a result, a factor associated with the degree of RSO activity in the associated voxel may be formulated as an additional factor for determine trust and/or accuracy. In some embodiments, such heat map factor may be covariance data 2807 input from the heat map 2804.

In some embodiments, as the number of satellites injected into orbit increases, e.g., through the increased commercialization of space and space-based services, the number of potential conjunctions increases. In order to identify which potential conjunctions are most critical, the assessment of the trust level indicates not just the calculated probability of collision, but an assessment of likelihood that the probability is accurate, thus provide insight into which potential conjunctions are most critical for human attention. Indeed, in a group of tens of thousands of potential conjunctions, only between 1 and 10 may actually occur or be likely to occur. Thus, determining which of the potential conjunctions are most reliable and thus most actually likely to happen, may reduce resource use to independently assess the potential conjunctions.

In some embodiments, the trust level may be evaluated on a scale, such as from 1 to 3, 1 to 5, 1 to 10 or other scale. The scale may be represented numerically, by colors representing the scale such as a gradient or set of colors (red, green, yellow, etc.). Accordingly, in some embodiments, the orbit risk determination 2870 may produce the orbit risk object 2808 that represents the potential conjunction, the probability of collision, the TCA and/or DCA, an the trust level. In some embodiments, the orbit risk object 2808 may be in the form of a conjunction data message (CDM) or other message to the computing device 2880 so as to notify the entity associated with one or both of the RSOs of the candidate pair of the potential conjunction. In some embodiments, the orbit risk object 2808 may also be provided to the storage 2812 to archive the potential conjunction and data associated therewith, e.g., for later auditing, debugging, and/or analytics.

In some embodiments, the orbit risk object 2808 may be fed back into the heat map 2804 or into a separate heat map configured for risk assessment. In some embodiments, the heat map having the orbit risk object 2808, including the trust level, may be provided to mission planners and space insurance, among other parties or any combination thereof. In some embodiments, this instantiation of the heat map may include all the output of the conjunction assessment pipeline 2800 to not only show the traffic in each voxel, but also show the different types of risks and degree of criticality in each voxel. Indeed, the heat map with the orbit risk object 2808 may represent RSO activity along with a depiction of a probability of collision within the voxel, a trust level of the probability of collision within the voxel, among other data. In some embodiments, the probability of collision and/or trust level may be depicted for a particular RSO, e.g., upon "zooming" into the voxel as detailed above, or may be additional filter on the visualization that colors or other marks the voxel according to a probability of collision, a trust level, a risk combining the probability of collision with the trust level as a critical score, among other representations or any combination thereof.

Figure 29:
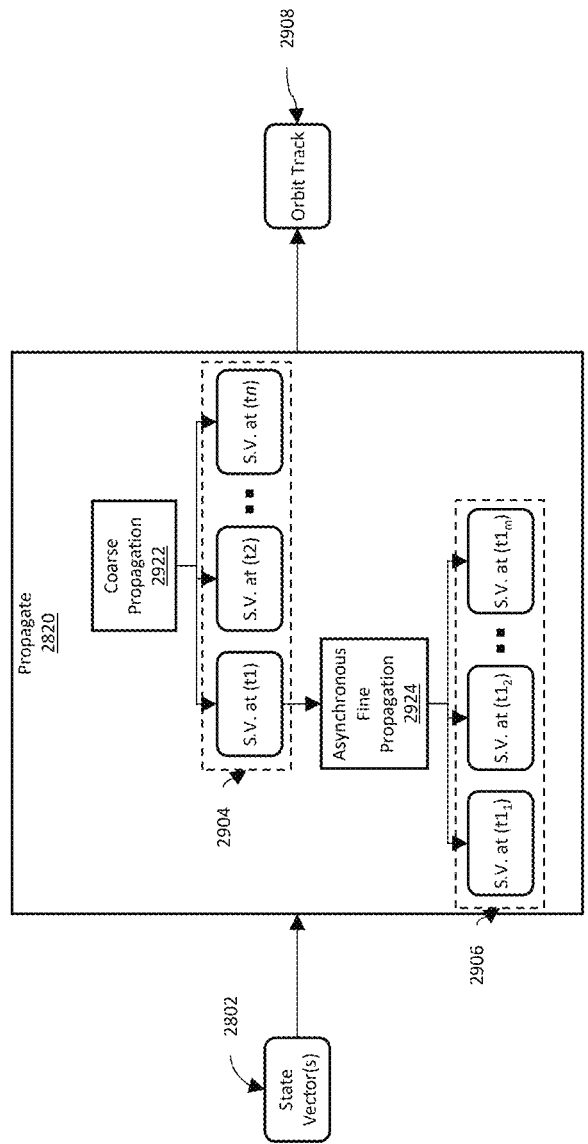

FIG. 29 depicts orbital propagation of the conjunction assessment system for at least one object, the orbital propagation being configured for coarse propagation with asynchronous fine propagation stemming from the coarsely propagated state vectors in accordance with aspects of one or more embodiments of the present disclosure.

In some embodiments, propagation 2820 for conjunction detection 2830 may include multiple stages for generating an orbit track 2908, e.g., an orbit track 2908 at the timestamp associated with TCA. In some embodiments, the stages may be performed using an initial coarse propagation 2922 and an asynchronous fine propagation 2924. To do so, in some embodiments, the coarse propagation 2922 and the fine propagation 2924 may be configured to perform propagation based on the state vector(s) 2802 using different time steps. The coarse propagation 2922 may use a first, relatively larger, time step while the fine propagation uses a second, relatively smaller, time step associated with a desired precision level sufficient to calculate the TCA and DCA upon propagation.

In some embodiments, the coarse propagation 2922 may produce, through propagation at the first time step, a set of coarsely propagated state vectors 2904 propagating the orbit of a particular RSO through a propagation period of times t1 through tn. The propagation period may be a period during which probability of collision can be accurately computed. Thus, the propagation period may be a function of the error covariance matrices of the state vector(s) 2802. In some embodiments, the propagation period may be a preconfigured value, such as, e.g., 1, 2, 3, 4, 5, 6, 7, 8, 9, 10 days or more. In some embodiments, the coarsely propagated state vectors 2904 may be used as an initial filter of potential conjunctions in order to identify the candidate pairs of RSOs.

In some embodiments, the asynchronous fine propagation 2924 may fill in the state vectors between the coarsely propagated state vectors 2904 to produce sets of finely propagated state vectors 2906. To enable the set of finely propagated state vectors 2906 to be generated asynchronously, each coarsely propagated state vector 2904 may be used as an initial state vector for the propagation via the asynchronous fine propagation 2924. For example, the state vector 2904 at t1 may serve as the initial condition for propagation via the asynchronous fine propagation 2924 to produce a first set of finely propagated state vectors 2906 for t1 of the first time step and $t1_1$ through $t1_m$ of the second time step. The sets of finely propagated state vectors 2906 for all coarsely propagated state vectors 2904 may span the propagation period from $t1_1$ through $tn_m$. Thus, each set of finely propagated state vectors 2906 may be generated independently of each other, reducing the computation time for generating an orbit track 2908 having the second time steps.

Figure 30:
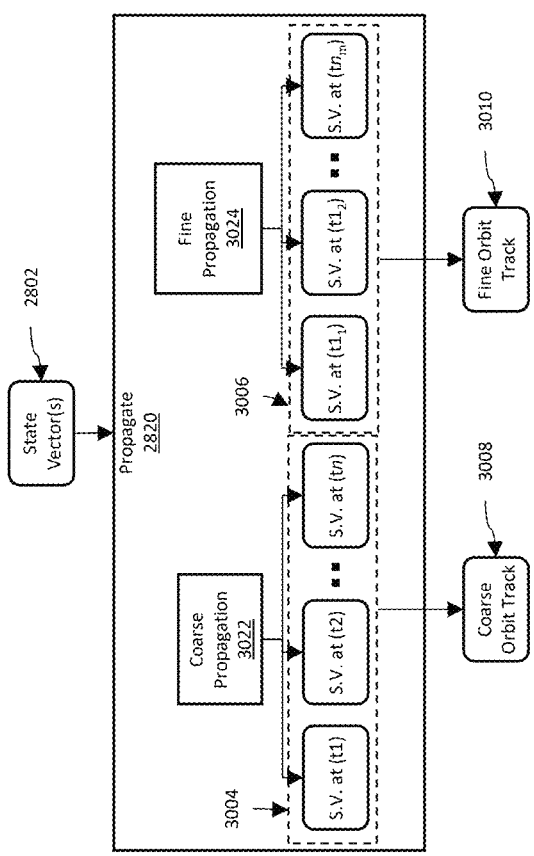

FIG. 30 depicts orbital propagation of the conjunction assessment system for at least one object, the orbital propagation being configured for separately computing coarse propagation and fine propagation in accordance with aspects of one or more embodiments of the present disclosure.

In some embodiments, propagation 2820 for conjunction detection 2830 may include multiple stages for generating a coarse orbit track 3008 (e.g., for initial coarse filtering of RSOs) and a fine orbit track 3010 (e.g., for fine filtering of RSOs to produce candidate pairs of RSOs). In some embodiments, the stages may be performed using the initial coarse propagation 3022 and a fine propagation 3024. To do so, in some embodiments, the coarse propagation 3022 and the fine propagation 3024 may be configured to perform propagation based on the state vector(s) 2802 using different time steps. The coarse propagation 3022 may use a first, relatively larger, time step while the fine propagation uses a second, relatively smaller, time step associated with a desired precision level sufficient to calculate the TCA and DCA upon propagation.

In some embodiments, the coarse propagation 3022 may produce, through propagation at the first time step, a set of coarsely propagated state vectors 3004 propagating the orbit of a particular RSO through a propagation period of times t1 through tn. The propagation period may be a period during which probability of collision can be accurately computed. Thus, the propagation period may be a function of the error covariance matrices of the state vector(s) 2802. In some embodiments, the propagation period may be a preconfigured value, such as, e.g., 1, 2, 3, 4, 5, 6, 7, 8, 9, 10 days or more. In some embodiments, the coarsely propagated state vectors 3004 may be used as an initial filter of potential conjunctions in order to identify the candidate pairs of RSOs.

In some embodiments, the fine propagation 3024 may re-propagate the orbit of the RSO using the second time step to produce a set of finely propagated state vectors 3006. The set of finely propagated state vectors 3006 may span the propagation period from $t1_1$ through $tn_m$. Thus, the set of finely propagated state vectors 3006 may be generated independently of the coarsely propagated state vectors 3004. Large time steps may compound the propagation of error. As a result, the coarse orbit track 3008 may have greater error between state vectors. Accordingly, by propagating the set of finely propagated state vectors 3006 independently from the coarsely propagated state vectors 3004, the accuracy of the fine orbit track 3010 may be increased by not relying on the coarse orbit track 3008.

Figure 31:
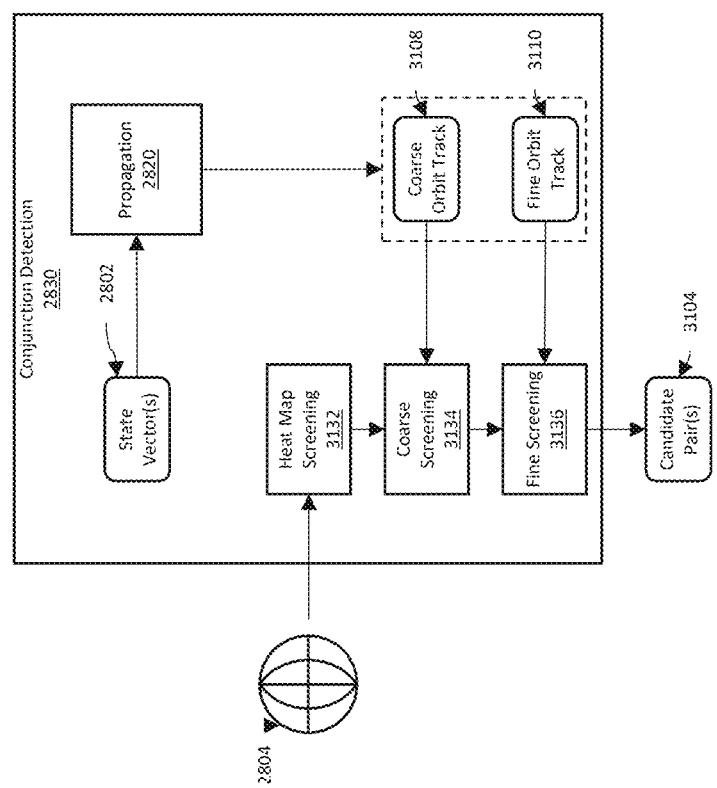

FIG. 31 depicts conjunction detection of the conjunction assessment system utilizing heat map-based screening, coarse screening (e.g., using coarsely propagated state vectors) and fine screening (e.g., using finely propagated state vectors) in accordance with aspects of one or more embodiments of the present disclosure.

In some embodiments, candidate pairs 3104 of RSOs may be identified by propagation 2820 and screening during conjunction detection 2830. In some embodiments, conjunction detection 2830 may employ three stages of screening RSOs to identify the candidate pairs 3104.

In some embodiments, in a first stage, conjunction detection 2830 uses the heat map 2804 to perform heat map screening 3132. The heat map 3804 provides a mechanism or pre-filtering the conjunction assessment by identifying regions of a space environment having multiple RSOs or projected to have multiple RSOs, thus serving as a data structure that identifies higher and lower risk regions based on the amount of RSO activity in each region. Thus, the heat map 2804 may facilitate exploiting both geospatial and temporal representations of the levels of RSO activity in specific regions of space to characterize "high traffic" or "hot" regions and "low traffic" or "cold" regions in a manner that defines a comprehensive assessment of activity that is beneficial for global space traffic management. The traffic may be represented as a categorization based on a set of ranges (e.g., high/medium/low, 1/2/3/4/5/etc. or other form of categorization or any combination thereof) indicative of the degree of RSO activity in each voxel.

In some embodiments, only voxels having a heat exceeding a predetermined threshold categorization may be selected. In some embodiments, the categorization of each voxel may be used to generate a prioritized ordering of the voxels such that, e.g., a defined number of the highest prioritized voxels may be selected. The defined number may be preset, user configurable, or dynamically adjusted based on available processing resources and/or time for performing the assessments. For example, processing time may be scheduled in particular period of time to perform conjunction detection 2830 or to complete the conjunction assessment pipeline 2800 to produce the orbit risk object 2808. Thus, the conjunction detection 2830 may use the heat map 2804 to select a number of the voxels for conjunction assessment such that the conjunction detection 2830 and/or the conjunction assessment pipeline 2800 may complete for all selected voxels within the allotted period of time.

In some embodiments, the voxels identified as having RSO traffic exceeding a predetermined categorization (e.g., a predetermined range of RSOs present within the voxel), may be selected. The selected voxel(s) may be associated with the RSOs present within the voxel, which may be specified in the storage 2812. Accordingly, conjunction detection 2830 may identify an initial set of RSOs for evaluation by conjunction detection based on the RSOs associated with the selected voxel(s).

The initial set may undergo additional screening to remove RSOs that are unlikely to be at risk of conjunction. In some embodiments, a coarse screening 3134 may be performed based on coarse orbit tracks 3108 of each RSO in the initial set. In some embodiments, the propagation 2820 may produce, through propagation at a first, relatively larger, time step, a set of coarsely propagated state vectors propagating the coarse orbit track 3108 of a particular RSO through a propagation period of times t1 through tn. The propagation period may be a period during which probability of collision can be accurately computed. Thus, the propagation period may be a function of the error covariance matrices of the state vector(s) 2802. In some embodiments, the propagation period may be a preconfigured value, such as, e.g., 1, 2, 3, 4, 5, 6, 7, 8, 9, 10 days or more. In some embodiments, the coarsely propagated state vectors of the coarse orbit track 3108 may be used as a coarse filter of potential conjunctions in order to identify the candidate pairs of RSOs.

The coarsely filtered set may then be filtered via fine screening 3136. In some embodiments, the fine screening 3136 may be performed based on fine orbit tracks 3110 of each RSO in the coarsely filtered set. In some embodiments, the propagation 2820 may produce, through propagation at a second, relatively shorter, time step, a set of finely propagated state vectors propagating the fine orbit track 3110 of a particular RSO through the propagation period of times $t1_1$ through $tn_m$.

In some embodiments, at both the coarse screening 3134 and the fine screening 3136, the conjunction detection 2830 may determine whether pairs of RSOs are expected to intersect during the propagation period. To do so, the conjunction detection 2830 may generate pairs, e.g., by selecting a primary object and pairing the primary object with each other RSO as secondary objects. Each pairing may be assessed based on the propagated orbit tracks of each RSO in each pair at the coarse screening 3134 stage. For example, the coarse orbit track 3108 of the primary object and the coarse orbit track 3108 of each secondary object may be used to generate relative position and velocity vectors for each pair. For the pairs that have relative velocity vectors that become perpendicular during the propagation period with the relative position vectors, a potential conjunction may be identified and the associated pairs may pass the coarse screening as the coarsely filtered set.

In some embodiments, the fine orbit tracks 3110, due to the smaller time step, may have more accurate and/or precise state vectors. Thus, the screening may be repeated via fine screening 3136 of the coarsely filtered set of RSOs. For example, for each pair of RSOs that passed the coarse screening 3134, the fine orbit track 3110 of the primary object and the fine orbit track 3110 of each secondary object may be used to generate fine relative position and velocity vectors for each pair. For the pairs that have fine relative velocity vectors that become perpendicular during the propagation period with the fine relative position vectors, a candidate conjunction may be identified and the associated pairs may pass the fine screening.

In some embodiments, the resulting pairs that pass the fine screening 3136 may be output as the candidate pairs 3104 for TCA computation 2840, DCA computation 2850, probability of collision computation 2860 and orbit risk determination 2870. Thus, RSOs unlikely to present a risk of conjunction during the propagation period may be removed from analysis, thus preserving computational resources.

Figure 32:
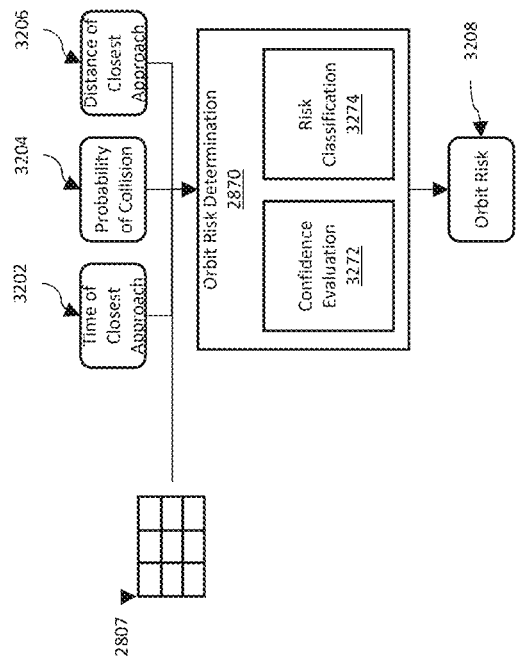

FIG. 32 depicts orbit risk determination of the conjunction assessment system configured to evaluate confidence of the conjunction determination and risk classification for notification to personnel in accordance with aspects of one or more embodiments of the present disclosure.

In some embodiments, the conjunction assessment pipeline 2800 may perform orbit risk determination 2870 to generate an orbit risk 3208 product based on the data associated with an RSO. In some embodiments, risk may include more than the probability of collision 3204 of the RSO with another object. As such, the orbit risk 3208 may be produced based on additional factors indicative of probability, accuracy and other risk-related factors among others or any combination thereof. Accordingly, in some embodiments, the orbit risk determination 2870 may obtain the TCA 3202, the DCA 3206, the probability of collision 3204 as well as trust factors associated with RSOs.

In some embodiments, the orbit risk determination 2870 may determine a confidence evaluation 3272 to determine the trust level of the probability of collision, and a risk classification 3274 to score the risk of the pair of RSOs based on the confidence evaluation 3272, the probability of collision 3204, the TCA 3202 and the DCA 3206. In some embodiments, the confidence evaluation 3272 may ingest each factor and produce quantitative measures of the level of trust that should be applied to a given solution. In some embodiments, the factors may be computed according to one or more confidence scoring algorithms. For example, the orbit quality and pattern of life factors, among others, can be multi-element vector forms, with individual measurands being position, velocity, orientation, magnitude, and the relative position of the streak compared to other RSO's observed in the image. In another example, the image quality factor may be calculated based on a measurement of SNR. In some embodiments, based on the probability, confidence evaluation 3272 may use additional confidence factors to determine an indication of accuracy of the probability of collision, and thus a degree of seriousness of the potential conjunction of the two RSOs of the candidate pair.

In some embodiments, each state vector 2802 may include covariance data 2807 associated with the quality of the observation giving rise to the state vector 2802. For example, as further detailed above, each observation may be associated with an image quality factor, orbit quality factor, pattern of life assessment, among others or any combination thereof. In some embodiments, the image quality factor may account for the variability in quality from one image to the next. For example, signal-to-noise ratio (SNR) can vary significantly from one image to the next based on changing environmental conditions and target response variability. A high SNR in the image yields better quality 2-D position information within the image frame, and thus produces more trustworthy data. In some embodiments, the orbit quality factor may use forward and backward trajectory propagation to determine whether the current orbit solution falls within an expected range. As detailed above, the pattern-of-life factor evaluates whether any observed behavior that is unexpected falls within historical patterns previously observed in the object in question.

In some embodiments, an example for calculating one or more of the confidence factors may include defining the confidence factor(s) as multi-element measurements is to construct an "expectation vector" that represents a vector defining the expected values of the measurements based on physical models, history data, among other sources or any combination thereof. Vector cross product and/or dot product operations may be implemented to produce the angle between the measurement vector and the expectation vector, where a small angle between the vectors indicates the measurement vector and the expectation vector are aligned in all components, and thus the confidence level is high. For example, an angle of zero correlates to perfect alignment and confidence factor of 1. The larger the angle, the lower the confidence factor. Such a confidence factor framework may be applied to the orbit quality factor (which can also be applied to tagging confidence).

In some embodiments, pattern of life matching may also be calculated with the above confidence factor framework, but with a different set of measurands/vector components that collectively can define a maneuver or other event, such as the magnitude of position/velocity delta, the timing of the event, the dynamic spacecraft behavior (e.g., evidence of attitude maneuvering) and others or any combination thereof, depending on the type of event.

In some embodiments, to calculate confidence for SNR, the SNR may be mapped to an image quality metric. For example, SNR is a logarithmic measure, and the mapping to quality may be exponential. Thus, after a sufficiently high SNR, the image quality approach a maximum. Threshold values may be defined to map the confidence levels to the measured SNR. In some embodiments, the confidence for SNR may also or alternatively include a matched filter operation (convolution) of image segments with the image performed across the entire image to determine if a suspected RSO creates a spike in the region associated with the RSO's expected, known or calculated location, where the nearer the spike to the expected, known or calculated location, the higher the confidence.

In some embodiments, elements of this covariance data 2807 may be used to aid in determining the trust level or accuracy of the probability of collision. If a conjunction is estimated to occur in a high traffic region, then the likelihood that the orbit solution of the secondary object will be poor increases, and a method to account for the lower confidence level (e.g., introduction of some process noise) may be in order. As a result, a factor associated with the degree of RSO activity in the associated voxel may be formulated as an additional factor for determine trust and/or accuracy. In some embodiments, such heat map factor may be covariance data 2807 input from the heat map 2804.

In some embodiments, the trust level may be evaluated on a scale, such as from 1 to 3, 1 to 5, 1 to 10 or other scale. The scale may be represented numerically, by colors representing the scale such as a gradient or set of colors (red, green, yellow, etc.). In some embodiments, the orbit risk 3208 may include a risk score or risk classification indicative of the risk for a given voxel in the heat map 2804 as a function of the accumulated conjunction information of RSOs with the voxel (e.g., at a particular time or across time), including, for each RSO and/or conjunction event, the probability of collision, the TCA and/or DCA, and the trust level. In some embodiments, the risk classification 3274 may include a rules-based assessment, such as thresholds for each of probability of collision, the TCA and/or DCA, and the trust level, such that a particular combination of thresholds is associated with a particular classification. Indeed, the orbit risk 3208 may represent an orbit risk assessment level based on all the measurables and observables that are collected and associated with a given "voxel", or volume pixel, including but not limited to the "traffic level" (how many RSO's traverse that segment of space), the quality of the orbit knowledge of all those RSO's (e.g., the confidence factors detailed above), and the conjunction history and frequency in that region. Additionally, in some embodiments, because the voxels are a segment of near-Earth space, the voxels themselves are moving and may be calculated for either an Earth-Centered Earth-Fixed frame, or an Earth-Centered Inertial frame. Thus, based on the voxel, the risk levels may be derived from an accumulated time history of these quantities that are continually updated with any new data that is observed as the voxel moves and as each RSO moves.

In some embodiments, the risk classification 3274 may include one or more machine learning models, e.g., trained based on the archive of orbit risk objects 2808. In some embodiments, the risk classification 3274 ingests a feature vector that encodes features representative of features including the probability of collision, TCA, DCA and trust level(s), traffic data, among other measurements of a particular voxel. In some embodiments, the risk classification 3274 processes the feature vector with parameters to produces a prediction of orbit risk 3208. In some embodiments, the parameters of the risk classification 3274 may be implemented in a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the risk classification 3274 may advantageously include a random forest classification model.

In some embodiments, the risk classification 3274 processes the features encoded in the feature vector by applying the parameters of the classifier machine learning model to produce a model output vector. In some embodiments, the model output vector may be decoded to generate one or more labels indicative of orbit risk 3208. In some embodiments, the model output vector may include or may be decoded to reveal a numerical output, e.g., one or more probability values between 0 and 1 where each probability value indicates a degree of probability that a particular label correctly classifies the features for the voxel. In some embodiments, the risk classification 3274 may test each probability value against a respective probability threshold. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the features associated with the voxel is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the risk classification 3274 may produce the orbit risk 3208 for a particular voxel based on the probability value(s) of the model output vector and the probability threshold(s).

In some embodiments, the parameters of the risk classification 3274 may be trained based on known outputs, e.g., from the aforementioned archive. For example, the features including the probability of collision, TCA, DCA and trust level(s), traffic data, etc. may be paired with a target classification or known classification to form a training pair, such as a historical features of orbit risk objects 2808 in the archive and an observed result and/or human annotated classification denoting whether the historical features is a score and/or class indicative of risk of conjunctions of RSOs in the voxel. In some embodiments, the features may be provided to the risk classification 3274, e.g., encoded in a feature vector, to produce a predicted label. In some embodiments, an optimization function associated with the risk classification 3274 may then compare the predicted label with the known output of a training pair including the historical features to determine an error of the predicted label. In some embodiments, the optimization function may employ a loss function, such as, e.g., Hinge Loss, Multiclass SVM Loss, Cross Entropy Loss, Negative Log Likelihood, or other suitable classification loss function to determine the error of the predicted label based on the known output.

In some embodiments, based on the error, the optimization function may update the parameters of the risk classification 3274 using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimization function may update the parameters of the risk classification 3274 based on the error of predicted labels in order to train the risk classification 3274 to model the correlation between features and orbit risk 3208 in order to produce more accurate labels indicative of the risk associated with a particular voxel.

Figure 33:
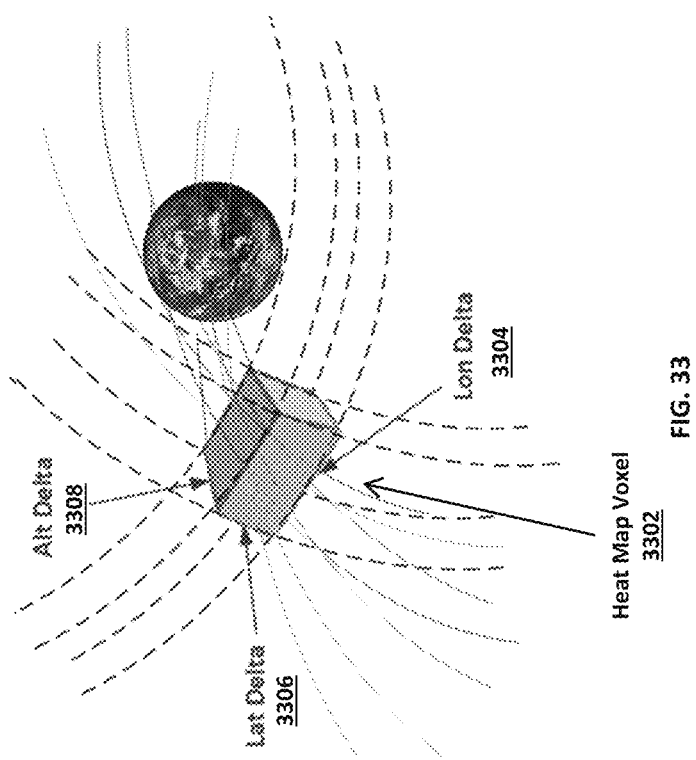

FIG. 33 illustrates a voxel 3302 of orbital heat map (e.g., the heat map 104 of the conjunction assessment system) defined by an altitude delta 3308, latitude delta 3306 and longitude delta 3304 to define a region in a space environment in accordance with aspects of one or more embodiments of the present disclosure. In some embodiments, the space environment may include one or more orbital regions around a celestial object, such as the Earth, Moon, Mars, or other planet or moon, or any other natural and/or artificial body. In some embodiments, the space environment may be divided into the voxels 3302 by three-dimensional partitioning of the space environment. Each voxel 3302 may be defined by an altitude delta 3308 having a start and end altitude relative to the celestial body, a latitude delta 3306 defined by a starting latitude and ending latitude relative to a sphere defined by the celestial body and/or space environment about the celestial body, and a longitude delta 3304 defined by a starting longitude and an ending longitude relative to the sphere defined by the celestial body and/or space environment about the celestial body. Herein, the term "latitude" refers to an angular distance of a region north or south of the earth's equator, or of a celestial object/region north or south of the celestial equator, and may be expressed in degrees and/or minutes. Herein, the term "longitude" refers to an angular distance of a place or region east or west of a point of reference (e.g., a meridian such as that of Greenwich, England), or west of a standard meridian of a celestial object, and may be expressed in degrees and/or minutes.

In some embodiments, because the voxels are a segment of near-Earth space, the voxels themselves may be moving and may be calculated for either an Earth-Centered Earth-Fixed frame, or an Earth-Centered Inertial frame.

In some embodiments, the disclosure describes propagation and conjunction assessment in a space environment about a celestial object using an orbital heat map. The propagation and conjunction assessment includes accessing an orbital heat map, where the orbital heat map includes: a mapping of space around Earth, where the mapping includes voxels representing geospatial volume cells defined by three-dimensional coordinate frames; receive a target RSO orbit for a target RSO including target RSO ephemeris representing a trajectory of the target RSO through space; and where the target RSO ephemeris is derived from an image of the target RSO. The propagation and conjunction assessment includes mapping the target RSO orbit to at least one voxel of the orbital heat map based on the target RSO ephemeris, determining a level of activity associated with the at least one voxel of the orbital heat map based at least in part on a number of RSOs mapped to the at least one voxel and filtering secondary RSOs based on distance from the target RSO using the orbital heat map based on the at least one voxel associated with the target RSO. The propagation and conjunction assessment includes generating RSO pairs including combinations of pairing the target RSO with at least one secondary RSO of the secondary RSOs based on the filtering, propagating, based on the target RSO ephemeris, the trajectory of the target RSO, and propagating, based on secondary RSO ephemeris of the at least one secondary RSO, the trajectory of the at least one secondary RSO. The propagation and conjunction assessment includes calculating, based on the trajectory of the target RSO and the trajectory of the at least one secondary RSO, at least one conjunction product representing at least one risk of conjunction between the target RSO and the at least one secondary RSO. The propagation and conjunction assessment includes determining an error compensation based at least in part on the activity level of the at least one voxel of the target RSO. The propagation and conjunction assessment includes modifying the at least one conjunction product by applying the error compensation. The propagation and conjunction assessment includes determining, for the target RSO, a target RSO image factor confidence based at least in part on a measure of a quality of an image of the target RSO. The propagation and conjunction assessment includes determining, for the target RSO, a target RSO orbit factor confidence based at least in part on a measure of consistency of the target RSO ephemeris with at least one prior state of the target RSO. The propagation and conjunction assessment includes determining, for the target RSO, a target RSO pattern of life confidence based at least in part on a pattern of maneuvers of the target RSO ephemeris representing a measure of a likelihood of the target RSO engaging in an unexpected maneuver. The propagation and conjunction assessment includes determining, for the at least one secondary RSO, a secondary RSO image factor confidence based at least in part on a measure of a quality of an image of the at least one secondary RSO. The propagation and conjunction assessment includes determining, for the at least one secondary RSO, a secondary RSO orbit factor confidence based at least in part on a measure of consistency of the at least one secondary RSO ephemeris with at least one prior state of the at least one secondary RSO. The propagation and conjunction assessment includes determining, for the at least one secondary RSO, a secondary RSO pattern of life confidence based at least in part on a pattern of maneuvers of the at least one secondary RSO ephemeris representing a measure of a likelihood of the at least one secondary RSO engaging in an unexpected maneuver. The propagation and conjunction assessment includes determining a conjunction confidence representing a degree of trust in the at least one conjunction product based at least in part on an aggregation of: the target RSO orbit factor confidence, the target RSO image factor confidence, the target RSO pattern of life confidence, the secondary RSO orbit factor confidence, the secondary RSO image factor confidence, and the secondary RSO pattern of life confidence. The propagation and conjunction assessment includes transmitting, to a user, a conjunction data message carrying the at least one conjunction product and the conjunction confidence.

Throughout the specification and claims, the following terms take the meanings explicitly associated herein, unless the context clearly dictates otherwise. The phrases "in one embodiment," "in an embodiment," and "in some embodiments"" as used herein do not necessarily refer to the same embodiment(s), though they may. Furthermore, the phrases "in another embodiment" and "in some other embodiments" as used herein do not necessarily refer to a different embodiment, although they may. Thus, as described herein, various embodiments of the disclosure may be readily combined, without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

While a number of embodiments of the present disclosure have been described, it is understood that these embodiments are illustrative only, and not restrictive, and that many modifications may become apparent to those of ordinary skill in the art. For example, any dimensions discussed herein are provided as examples only, and are intended to be illustrative and not restrictive.

The invention claimed is:

1. A method, comprising:
   receiving, by at least one centralized computer processor of at least one centralized computer of a central computing processing arrangement, image data from a plurality of images, acquired by a plurality of imaging satellites;
   determining, by the at least one centralized computer processor, a presence or an absence of at least one known object in a series of images from the plurality of images, based at least in part on a temporal behavior of a first plurality of dynamic characteristic image features associated with the at least one known object;
      wherein the at least one known object is at least one known RSO, at least one known celestial body, or both; and
   determining, by the at least one centralized computer processor, a presence or an absence of at least one unknown object in the series of images, based at least in part on the temporal behavior of a second plurality of dynamic characteristic image features associated with the at least one unknown object by inputting the image data of the series of images into at least one machine learning model that is trained to at least:
      group the second plurality of dynamic characteristic image features in the series of images into at least one track, and
      determine a likelihood of the at least one track being associated with each of a plurality of registered known objects;
      wherein the at least one unknown object is at least one unknown RSO, at least one unknown celestial body, or both;
      wherein the plurality of registered known objects comprises a plurality of:
         at least one registered known RSOs,
         at least one registered known celestial body, or both; and
      modify a data repository based on the presence or the absence of the at least one unknown object in the series of images.

2. The method according to claim 1, wherein the receiving of the image data of each image comprises decrypting, decompressing, or both, of raw image data of each image to generate the image data and associated metadata of each image.

3. The method according to claim 2, wherein the associated metadata comprises at least one of:
   a camera shutter open duration data,
   satellite system data,
   a sensor integration time data, or
   an acquisition timestamp data.

4. The method according to claim 2, further comprising inputting, by the at least one centralized computer processor, the raw image data of each image into a find events software pipeline to determine, based at least in part on RSO data stored in the repository, at least one RSO identification (ID) tag data and at least one timing data of object features in each image associated with the at least one known object;
   inputting, by the at least one centralized computer processor, the at least one RSO ID tag data, the at least one timing data, the raw image data, the associated metadata for each image into a calibration software pipeline that generates calibrated image data for each image for input into a pre-processing pipeline;
      wherein the calibration software pipeline applies a plurality of calibration data sets to each image to adjust for a plurality of image-capturing impairments associated with a plurality of image-capturing devices;
      wherein the raw image data of each image from the plurality of images comprises a plurality of pixel values for a respective plurality of pixels in a sensor array for each imaging device from the plurality of image-capturing devices;
      wherein each pixel value is a digital count level; and
      wherein the calibration software pipeline is configured to generate the calibrated image data for each image by applying the plurality of calibration data sets to each image to adjust for the plurality of image-capturing impairments.

5. The method according to claim 4, wherein the calibration software pipeline applies the plurality of calibration data sets to each image on a pixel-by-pixel basis.

6. The method according to claim 4, wherein applying the plurality of calibration data sets to each image comprises that converting the digital count level to a photonic irradiance value for each pixel in the sensor array.

7. The method according to claim 4, wherein the at least one RSO ID tag data comprises at least one of:
   at least one RSO tag of the at least one known object,
   at least one state vector of the at least one known object, or
   at least one photometric characteristic, at least one dynamic characteristic, or any combination thereof of the at least one known object.

8. The method according to claim 4, wherein the plurality of calibration data sets comprises:
   an equalization calibration data set,
   a radiometry calibration data set,
   a point-spread function calibration data set, or
   a distortion calibration data set.

9. The method according to claim 1, wherein the determining the absence of the at least one known object in the series of images from the plurality of images comprises determining an absence of an association of the temporal behavior of the first plurality of dynamic characteristic image features with the at least one known object.

10. The method according to claim 1, wherein the determining the absence of the at least one unknown object in the series of images from the plurality of images comprises determining an absence of an association of the temporal behavior of the second plurality of dynamic characteristic image features with the at least one unknown object.

11. The method according to claim 1, wherein the at least one centralized computer is a base station computer.

12. The method according to claim 1, wherein the at least one centralized computer is at least one designated processor of at least one designated imaging satellite from the plurality of imaging satellites.

13. A system, comprising:
at least one centralized computer processor of at least one centralized computer of a central computing processing arrangement; and
at least one non-transitory memory for storing computer code;
wherein the at least one centralized computer processor is configured to execute the computer code that causes the at least one centralized computer processor to:
receive image data from a plurality of images, acquired by a plurality of imaging satellites;
determine a presence or an absence of at least one known object in a series of images from the plurality of images, based at least in part on a temporal behavior of a first plurality of dynamic characteristic image features associated with the at least one known object;
wherein the at least one known object is at least one known RSO, at least one known celestial body, or both; and
determine a presence or an absence of at least one unknown object in the series of images, based at least in part on the temporal behavior of a second plurality of dynamic characteristic image features associated with the at least one unknown object by inputting the image data of the series of images into at least one machine learning model that is trained to at least:
group the second plurality of dynamic characteristic image features in the series of images into at least one track,
determine a likelihood of the at least one track being associated with each of a plurality of registered known objects;
wherein the at least one unknown object is at least one unknown RSO, at least one unknown celestial body, or both;
wherein the plurality of registered known objects comprises a plurality of:
at least one registered known RSOs,
at least one registered known celestial body, or both; and
modify a repository based on the presence or the absence of the at least one unknown object in the series of images.

14. The system according to claim 13, wherein the at least one centralized computer processor is configured to receive the image data of each image by decrypting, decompressing, or both, of raw image data of each image to generate the image data and associated metadata of each image.

15. The system according to claim 14, wherein the associated metadata comprises at least one of:
a camera shutter open duration data,
satellite system data,
a sensor integration time data, or
an acquisition timestamp data.

16. The system according to claim 14, wherein the at least one centralized computer processor is further configured to input the raw image data of each image into a find events software pipeline to determine, based at least in part on RSO data stored in the repository, at least one RSO identification (ID) tag data and at least one timing data of object features in each image associated with the at least one known object and to input the at least one RSO ID tag data, the at least one timing data, the raw image data, the associated metadata for each image into a calibration software pipeline that generates calibrated image data for each image for input into a pre-processing pipeline;
wherein the calibration software pipeline applies a plurality of calibration data sets to each image to adjust for a plurality of image-capturing impairments associated with a plurality of image-capturing devices;
wherein the raw image data of each image from the plurality of images comprises a plurality of pixel values for a respective plurality of pixels in a sensor array for each imaging device from the plurality of image-capturing devices;
wherein each pixel value is a digital count level; and
wherein the calibration software pipeline is configured to generate the calibrated image data for each image by applying the plurality of calibration data sets to each image to adjust for the plurality of image-capturing impairments.

17. The system according to claim 16, wherein the calibration software pipeline applies the plurality of calibration data sets to each image on a pixel-by-pixel basis.

18. The system according to claim 16, wherein applying the plurality of calibration data sets to each image comprises that converting the digital count level to a photonic irradiance value for each pixel in the sensor array.

19. The system according to claim 16, wherein the at least one RSO ID tag data comprises at least one of:
at least one RSO tag of the at least one known object,
at least one state vector of the at least one known object, or
at least one photometric characteristic, at least one dynamic characteristic, or any combination thereof of the at least one known object.

20. The system according to claim 16, wherein the plurality of calibration data sets comprises:
an equalization calibration data set,
a radiometry calibration data set,
a point-spread function calibration data set, or
a distortion calibration data set.

21. The system according to claim 13, wherein the at least one centralized computer processor is configured to determine the absence of the at least one known object in the series of images from the plurality of images by determining an absence of an association of the temporal behavior of the first plurality of dynamic characteristic image features with the at least one known object.

22. The system according to claim 13, wherein the at least one centralized computer processor is configured to determine the absence of the at least one unknown object in the series of images from the plurality of images by determining an absence of an association of the temporal behavior of the second plurality of dynamic characteristic image features with the at least one unknown object.

23. The system according to claim 13, wherein the at least one centralized computer is a base station computer.

24. The system according to claim 13, wherein the at least one centralized computer is at least one designated processor of at least one designated imaging satellite from the plurality of imaging satellites.

* * * * *